(12) United States Patent
Maxted

(10) Patent No.: US 6,340,967 B1
(45) Date of Patent: Jan. 22, 2002

(54) PEN BASED EDIT CORRECTION INTERFACE METHOD AND APPARATUS

(75) Inventor: Sean Kenneth Maxted, Toronto (CA)

(73) Assignee: Natural Input Solutions Inc., Toronto (CA)

( * ) Notice: Subject to any disclaimer, the term of this patent is extended or adjusted under 35 U.S.C. 154(b) by 0 days.

(21) Appl. No.: 09/296,401

(22) Filed: Apr. 23, 1999

Related U.S. Application Data

(60) Provisional application No. 60/082,946, filed on Apr. 24, 1998, and provisional application No. 60/113,352, filed on Dec. 21, 1998.

(51) Int. Cl.$^7$ ................................................. G09G 5/00
(52) U.S. Cl. ........................ 345/179; 345/156; 345/173
(58) Field of Search ................................ 345/173–174, 345/179–182, 156; 178/19.01, 18.01

(56) References Cited

U.S. PATENT DOCUMENTS

| | | | | |
|---|---|---|---|---|
| 5,502,803 A | * | 3/1996 | Yoshida et al. | 395/146 |
| 5,528,743 A | * | 6/1996 | Tou et al. | 345/179 |
| 5,570,113 A | * | 10/1996 | Zetts | 345/173 |
| 5,671,438 A | * | 9/1997 | Capps et al. | 345/156 |
| 5,778,404 A | * | 7/1998 | Capps et al. | 345/179 |
| 6,104,317 A | * | 8/2000 | Panagrossi | 345/173 |

* cited by examiner

Primary Examiner—Richard Hjerpe
Assistant Examiner—Duc Q. Dinh
(74) Attorney, Agent, or Firm—Nancy E. Hill; Hill & Schumacher

(57) ABSTRACT

A correction method for use with a pen based computer system includes the steps of receiving a insertion point coordinate; receiving an initial pen down coordinate corresponding to an initial pen down; receiving a present pen down coordinate corresponding to a present position of a pen; receiving a pen up coordinate corresponding to a pen up; defining an ordered set of points between and including the initial pen down coordinate and the pen up coordinate; determining a first time interval between the pen up and the initial pen down; determining a second time interval between the initial pen down and the present pen down; determining if the relative position of at least two of the initial pen down coordinate, the present pen down coordinate, the pen up coordinate, the first time interval, the second time interval and the ordered set of points corresponds to a set of pre-selected parameters which correspond to activation of one or a plurality of modes; and activating the mode. The different modes include input mode, punctuation mode, correction mode, edit mode and selection mode. A stroke or path drawn in a mode will be compared with a pre-selected groups of characters used in association with that mode. By dividing functions into different modes the reliability of recognition of the stroke will be increased.

32 Claims, 39 Drawing Sheets

FIG. 9

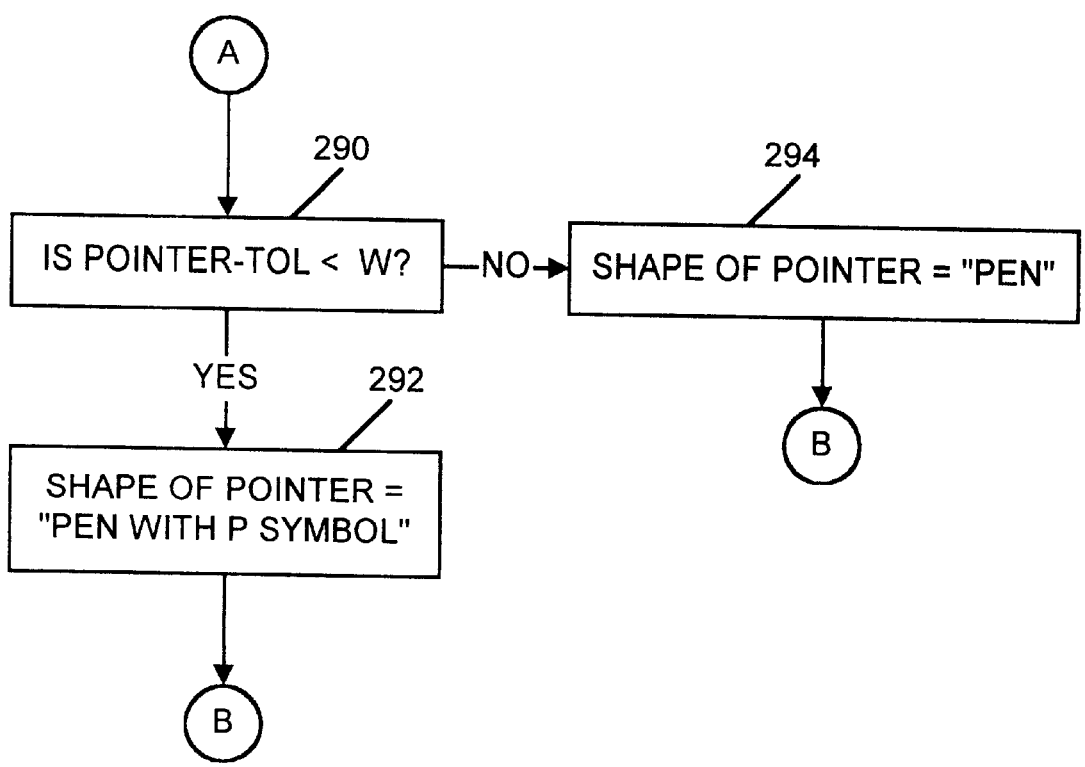

PEN BASED EDIT CORRECTION INTERFACE METHOD AND APPARATUS

CROSS REFERENCE TO RELATED PATENT APPLICATION

This patent application relates to U.S. Provisional Patent Application Ser. No. 60/082,946 filed on Apr. 24, 1998, entitled PEN BASED EDIT CORRECTION INTERFACE METHOD AND APPARATUS and U.S. Provisional Patent Application Ser. No. 60/113,352 filed Dec. 21, 1998 entitled PEN BASED EDIT CORRECTION INTERFACE METHOD AND APPARATUS.

FIELD OF THE INVENTION

This invention relates to pen based computer systems and in particular to a pen based edit correction interface method and apparatus which uses handwritten symbols to delete, rearrange or modify existing text.

BACKGROUND OF THE INVENTION

Pen based computer systems are becoming increasingly popular. Pen-based systems allow the user to easily use a computer without first learning to keyboard. In addition, continuous speech recognition systems are also becoming increasingly popular. Speech recognition systems allow a user to dictate directly into their computer. As the accuracy and speed of each of these systems increases the appeal to a general computer user increases.

It is generally recognised that in order to obtain acceptance in the marketplace these systems need to resemble existing practices as much as possible. Accordingly, the computer system developers are trying to develop systems that are modelled on existing practice. However, there are still problems with regard to speed, accuracy and ease of use when considering many of these systems.

Before considering some of the existing systems it is important to define some common terminology used in association with computer based systems in general and pen based systems in particular. Specifically a Digitizer is an Electromagnetic Tablet capable of receiving radio frequency signals from the tip of an Electronic Pen. Note that Software Drivers provided with the Tablet when installed, are capable of determining the (X,Y) coordinate position of the tip of the Electronic Pen on the Tablet, by analysing the signals received by the Tablet from the tip of the Electronic Pen. Proximity sensing refers to the ability of an Electromagnetic Tablet to sense the position of the tip of the Electronic Pen that is within a given distance of the planar surface of the Tablet. A pointer is a visual icon displayed on the computer screen to indicate the absolute or relative (X,Y) coordinate position of the tip of the Electronic Pen with respect to the planar surface of the Digitizer. Typically, the shape of the pointer is used to indicate whether the Electronic Pen is in selecting or writing mode. The pointer is in selecting mode (ie: user can select a block of text) if it is shaped like an arrow. The pointer is in writing mode (ie: user can generate Electronic Ink) if it is shaped like a pen.

The movement of the Electronic Pen relative to the Digitizer determines the information that is processed. A pen down incident is equivalent to pressing down (but not releasing) the left button on a computer mouse device. A pen up incident is equivalent to releasing the left button on a computer mouse device (after it has been pressed down). A single-click or tap is a pen down followed by a pen up within a pre-selected interval of time, where the absolute distance between the initial pen down coordinate and all subsequent present pen down coordinates stays within a stroke tolerance value. A double-click consists of two consecutive single-clicks, where the absolute distance between the (X,Y) pen up coordinate of the first single-click and the initial pen down coordinate of the second single-click falls within a double click tolerance value and the pen down event of the second single click follows the pen up event of the first single-click within a pre-selected interval of time.

A point is defined as (X,Y) coordinate which represents the absolute position of the tip of the Electronic Pen during a pen down event at a given instance of time. A stroke consists of a set of ordered points generated by a pen down event followed by a pen up event, where the absolute distance between the initial pen down coordinate and one or more of the subsequent present pen down coordinates is greater than a pre-set tolerance value within a pre-selected interval of time. Electronic Ink is used to describe the process of displaying one or more strokes on the computer screen by connecting the points which represent the strokes with solid visible line(s). Note that Electronic Ink is only displayed, after the absolute distance between the initial pen down coordinate and one or more of the subsequent present pen down coordinates becomes greater than a pre-set tolerance value within a pre-selected interval of time. ASCII is the American Standard Code of Information Interchange.

Handwriting time-out refers to a logic sequence wherein after each stroke is completed (ie: the user pens up after drawing the stroke) a timer is activated: IF "a pre-set interval of time elapses before the user pens-down to draw the next stroke"; THEN "all ordered set of strokes (displayed on the computer screen as Electronic Ink) are recognized by handwriting recognition software as ASCII, the timer is de-activated and reset back to zero and all Electronic Ink is erased from the computer screen" ELSE "the timer is de-activated and reset back to zero and all Electronic Ink continues to be displayed on the computer screen".

Handwriting recognition is the process of interpreting handwritten symbols based upon the context of the Window with Focus. Handwriting recognition systems have a terminology to describe the symbols used therein. Particularly, shape of a symbol refers to the geometric shape of a symbol (eg: the letter o has a circular shape). The orientation of a symbol refers to the way in which the symbol was drawn. For example, a circle can be drawn either clockwise or counter-clockwise in direction. The way in which a circle is drawn does not affect its geometric shape, however the orientation of a circle drawn clockwise is fundamentally different from the orientation of a circle drawn counter-clockwise. Context refers to one or more sets of pre-defined symbols (eg: digits, letters, punctuation, edit symbols, etc . . . ) that can be recognized within a given Window. Note that typically each Window has only one unique context associated with it at a time. The Window with Focus is the Window that is designated for receiving input (eg: The Window with Focus is usually indicated by the insertion point). The insertion point is the location where text will be inserted into the Window with Focus, usually indicated by a flashing cursor, Edit Symbols are symbols which represent an action (eg: Cut, Copy, Paste, Delete, etc . . . ) executed after Handwriting Recognition Software interprets the symbol.

Theoretically, the greater the number of symbols in a given context the greater the chance that any individual symbol will be mis-interpreted. Further, the greater the number of symbols in a given context that are similar in orientation and/or shape, the greater the probability that similarly orientated and/or shaped symbols will be misinterpreted for one another. Therefore a number of methods have been suggested to overcome some of the problems associated with accuracy. One method that has been suggested to overcome some of these problems is to provide a palette of buttons for Punctuation Symbols, wherein each button represents a Punctuation Symbol. Another method that has been suggested is a drop down menu. There are inherent problems or inefficiencies associated with each of these methods which will be described in more detail below.

SUMMARY OF THE INVENTION

The present invention is directed to a correction method for use with a pen based computer system. The correction method includes the steps of receiving a insertion point coordinate; receiving an inital pen down coordinate corresponding to an initial pen down; receiving a present pen down coordinate corresponding to a present position of a pen; receiving a pen up coordinate corresponding to a pen up; defining an ordered set of points between and including the initial pen down coordinate and the pen up coordinate; determining a first time interval between the pen up and the initial pen down; determining a second time interval between the initial pen down and the present pen down; determining if the relative position of at least two of the initial pen down coordinate, the present pen down coordinate, the pen up coordinate, the first time interval, the second time interval and the ordered set of points corresponds to a set of pre-selected parameters which correspond to activation of one or a plurality of modes; and activating the mode. The different modes include input mode, punctuation mode, correction mode, edit mode and selection mode. A stroke or path drawn in a mode will be compared with a preselected groups of characters used in association with that mode. By dividing functions into different modes the reliability of recognition of the stroke will be increased.

Further features of the invention will be described or will become apparent in the course of the following detailed description.

BRIEF DESCRIPTION OF THE DRAWINGS

The invention will now be described by way of example only, with reference to the accompanying drawings, in which:

FIG. 9 is a First Stroke Look-Up Table;

DETAILED DESCRIPTION OF THE INVENTION

The present invention is a pen based edit correction interface method which may be used in association with handwriting based systems and voice or dictation systems. The present invention facilities correcting a document using a pen based system and switching to a voice system. In addition, the present invention could be used in association with a keyboard based system, but for the purposes of the application herein a keyboard system will not be discussed since they are well known in the art.

Figure 1:
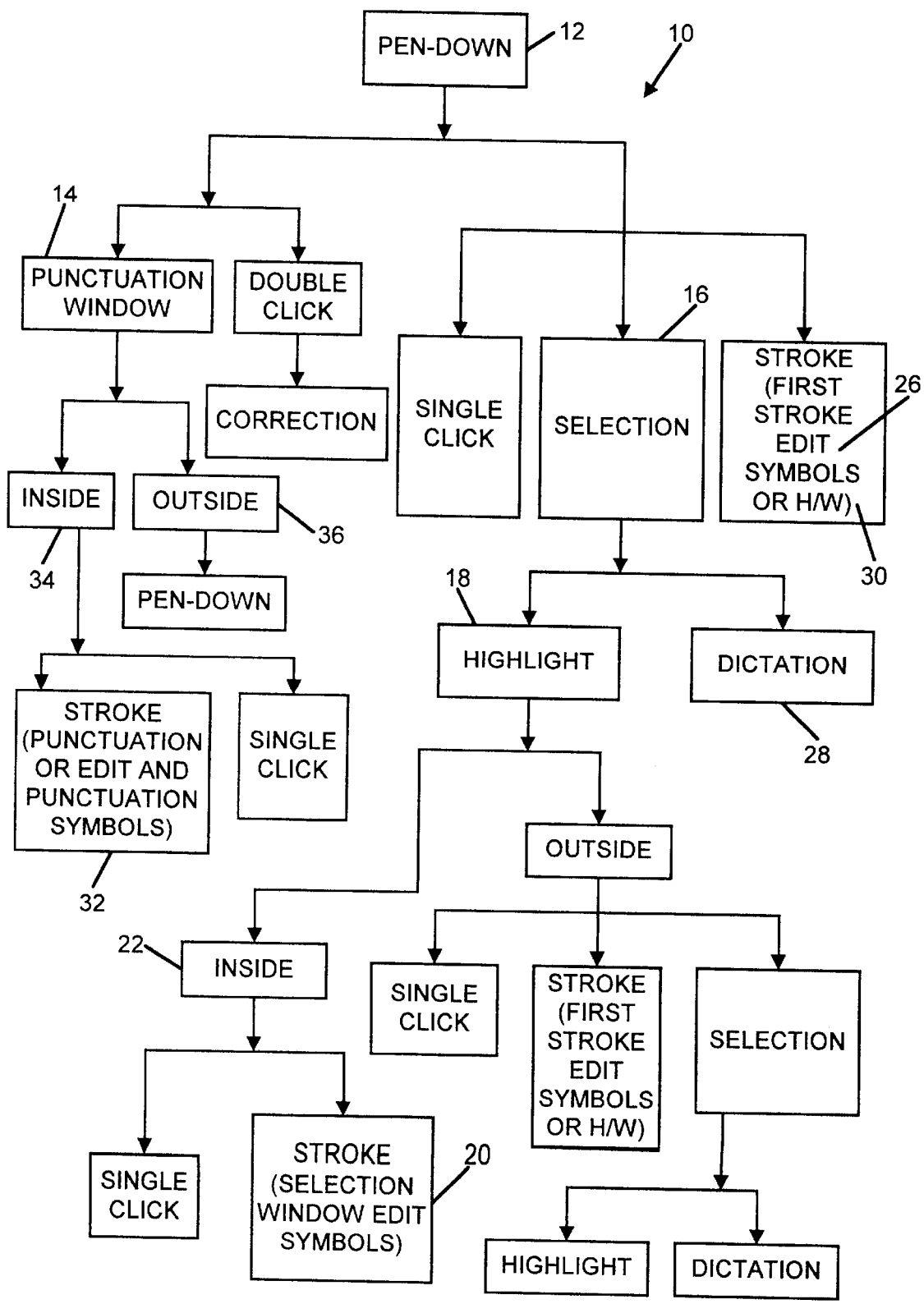
FIG. 1 is a flow diagram illustrating the pen based edit correction interface method of the present invention.

Referring to FIG. 1, the pen based edit correction interface method of the present invention is shown generally at 10. The method of the present invention includes five modes, namely punctuation mode, selection mode, edit mode, input mode and correction mode. The selection process with regard to a mode is initiated with an initial pen down 12.

In the punctuation mode, the user can insert one or more Punctuation Symbols by drawing Punctuation Symbols starting from within the boundaries of a Punctuation Window 14.

In the selection mode, the user can perform common editing functions or change common attributes of a selected block of text 16. The selected block of text 16 is highlighted 18 and a stroke 20, one of several Uni-Stroke Edit Symbols, is drawn starting from inside 22 the boundaries of a Selection Window 24, described below and shown in FIG. 5.

In the edit mode, the user can draw First Stroke Edit Symbols 26 which perform common editing functions. The Edit Symbols are uni-stroke symbols which allow the user to quickly and easily perform certain limited functions. A First Stroke Analysis is conducted to determine if a First Stroke Edit Symbol 26 was drawn. The First Stroke Edit Symbols 26 are a letter case change, a plurality of letter case change, a backspace, a paste and an undo.

The input mode is where the user inputs text by way of dictation 28 or by way of handwriting 30. The dictation or the handwriting inputs are similar to those found in generally available systems.

In the correction mode, the user may correct speech and handwriting recognition errors. The correction mode is similar to correction strategies used in many generally available systems.

These different modes will first be discussed generally and then more specifically wherein the details of the logic are discussed.

The pointer is used as an indicator to provide a visual indicator of the active mode. The default shape of the pointer is a pen. The shape of the pointer to indicate that the punctuation mode has been activated is a pen with a "p". The shape of the pointer to indicate that the selection process has been activated is an arrow. Optionally when the selection window has been activated the shape of the pointer could change to a pen with an "s". It will be appreciated by those skilled in the art that the shape of the pointer chosen to indicate the different modes can be set by the user and could be chosen from a wide range of symbols.

To activate the punctuation mode the user pens down within a pre-selected distance of the present position of the cursor, after a user commits to drawing a stroke 32 (eg: Edit or Punctuation Symbols), a Punctuation Window 14 opens up, preferably centred on the position of the cursor. The user has the option of drawing multiple Punctuation Symbols inside the Punctuation Window 14. The Punctuation Window 14 is closed down and the Punctuation Symbol(s) drawn in the Punctuation Window 14 are interpreted by Handwriting Recognition Software (based upon the Punctuation Look-Up Table) after one of the following events occurs: a single-click inside 34 the boundaries of the Punctuation Window 14; a pen down outside 36 the boundaries of the Punctuation Window 14 and then proceeding as if this was an initial pen down 12; or if there is no pen down within a pre-selected interval of time after the last stroke was drawn within the Punctuation Window 14.

Figure 10:
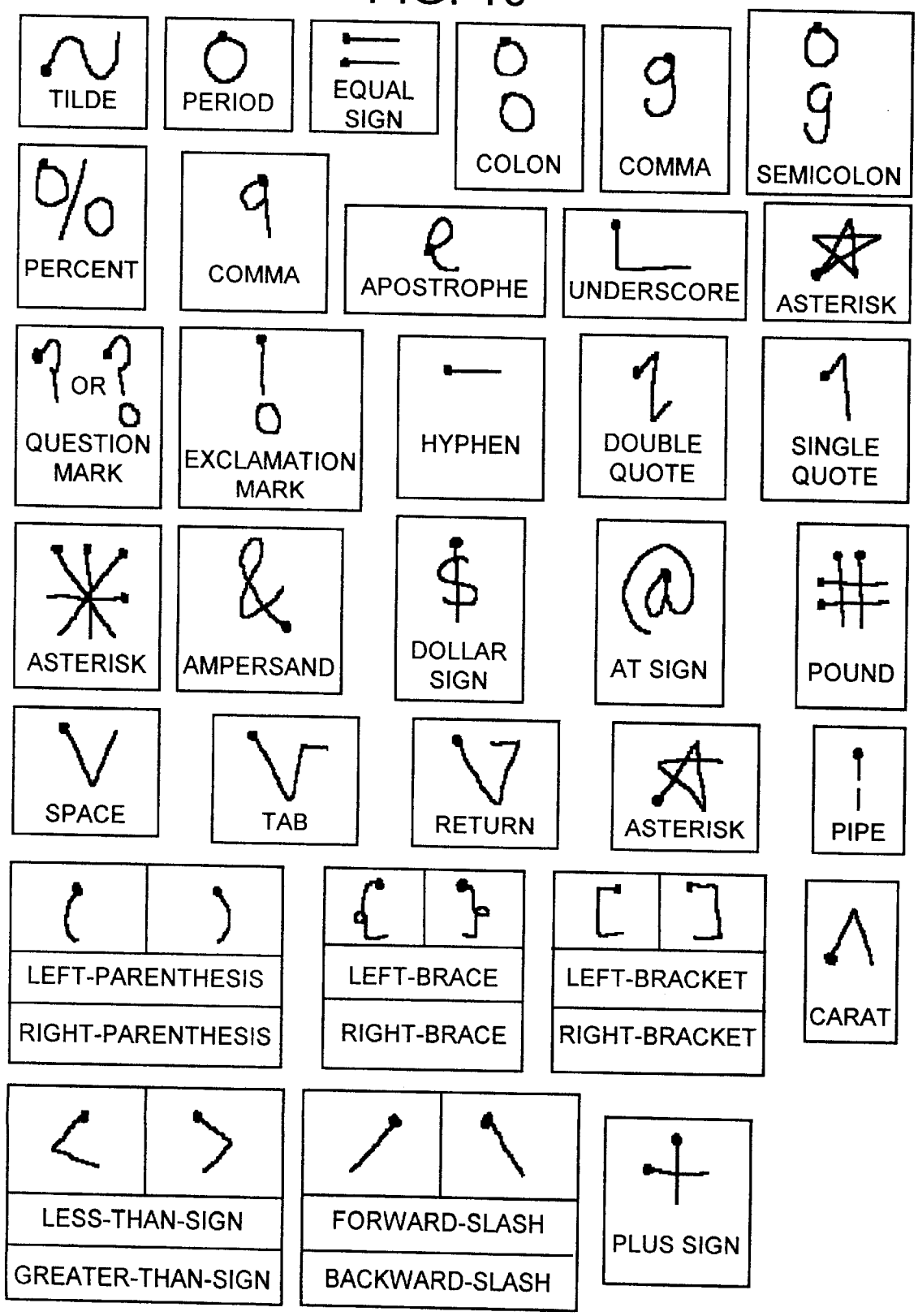
FIG. 10 is a Punctuation Look-Up Table.

It is important to note that all strokes 32 (eg: Punctuation or Edit Symbols) must start within the Punctuation Window 14. Further, it will be appreciated by those skilled in the art that the Punctuation Mode of the present invention has a number of advantages over the prior art. Specifically, after drawing Punctuation Symbols in the Punctuation Window 14, a user need not wait for a time-out before continuing to input text or perform other functions. However, note that even in the method of the present invention, since some of the Punctuation Symbols are multi-stroke symbols, there is a need to initiate a time-out after each stroke is drawn, in order to determine whether a multi-stroke symbol or a uni-stroke symbol was drawn. Further, the likelihood of correctly identifying punctuation is increased, because when the user is in punctuation mode the Handwriting Recognition Software is only comparing the stroke(s) 32 with the Punctuation Look-Up Table shown generally at 33 in FIG. 10, rather than all of the alpha-numeric characters and punctuation. Thus a "." or the like is more likely to be correctly interpreted. The suggested Punctuation and Edit Look-Up Table is shown generally at 38 in FIG. 2.

Figure 2:
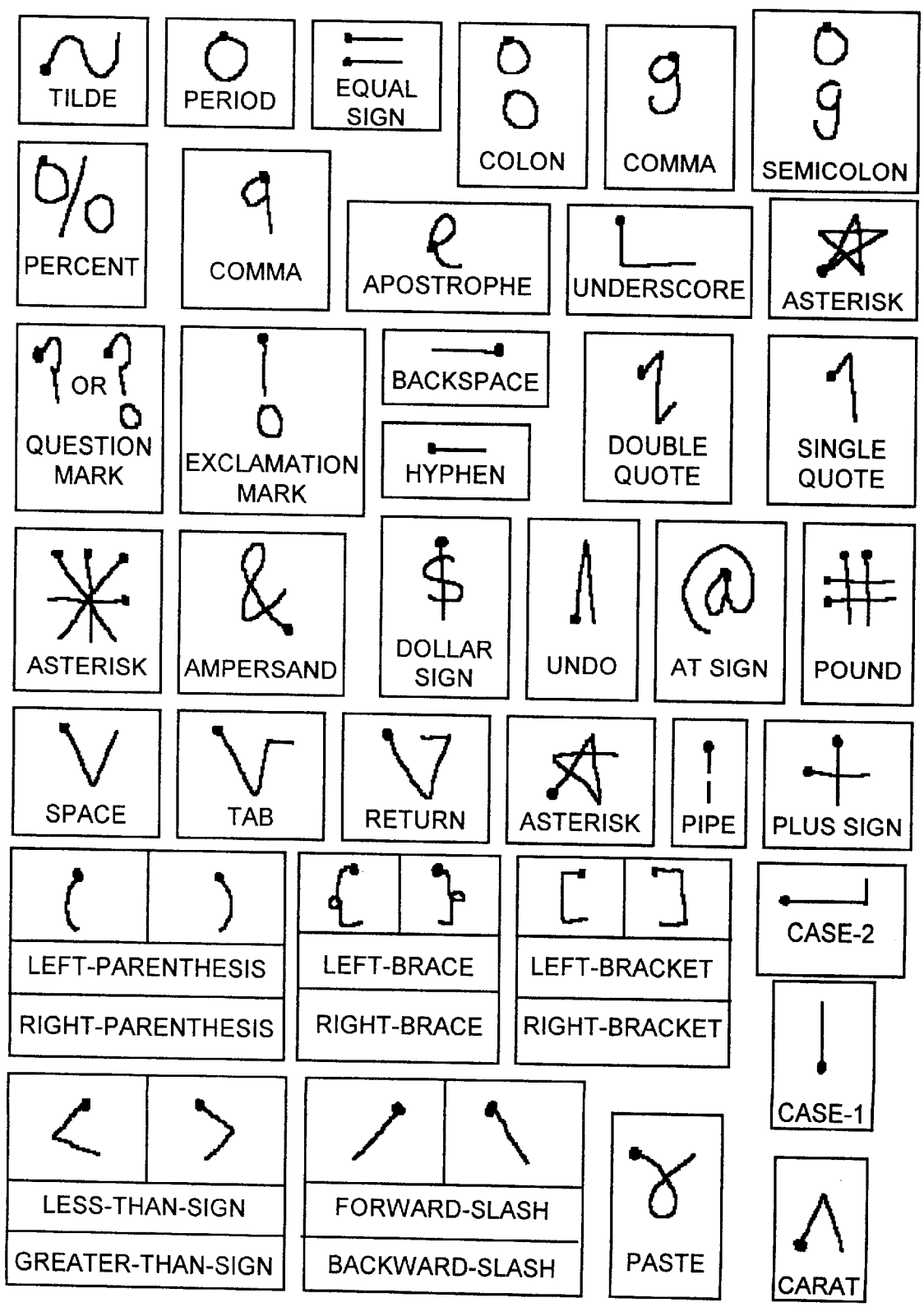
FIG. 2 is a Punctuation and Edit Look-Up Table.

Referring to FIG. 2, the Punctuation and Edit Look-Up Table 38 of the present invention includes Punctuation Symbols that are adapted for interpretation by a pen-based system and Punctuation Symbols that are drawn as they normally would be drawn in the English alphabet. In FIG. 2 the large dot indicates the starting point of the stroke. In addition to the adapted punctuation and the English-based punctuation, the Punctuation and Edit Look-Up Table 38 also includes the five First Stroke Edit Symbols 26. The five First Stroke Edit Symbols 26 will be described in more detail below.

Figure 3A:
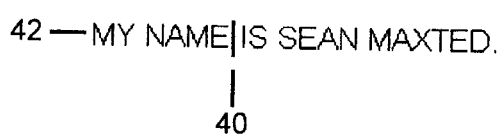
FIG. 3a is a line of text showing the position of a cursor and a pointer.
Figure 3B:
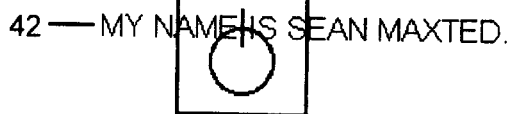
FIG. 3b is the line of text shown in FIG. 3a with a transparent Punctuation Window 14 superimposed thereon.
Figure 4:
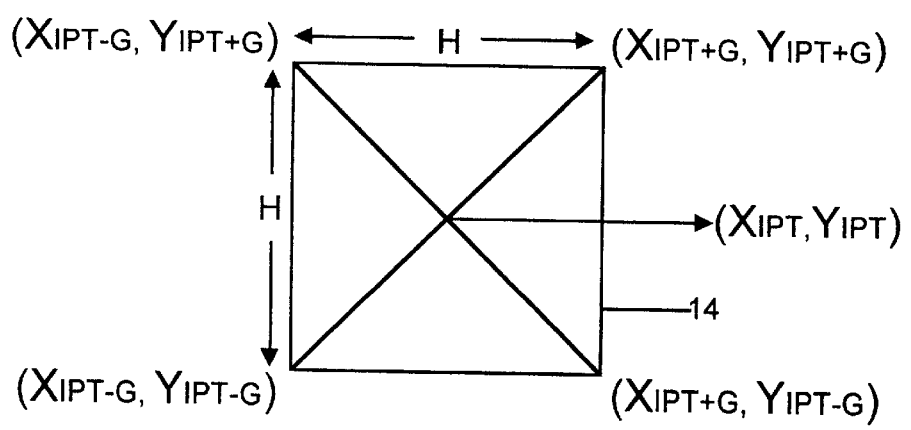
FIG. 4 is a front view of the Punctuation Window 14 of the present invention.

Referring to FIG. 3a and FIG. 3b, the pen down 12 is positioned at the cursor 40 in a block of text 42. After the user commits to drawing a stroke 32 (eg: punctuation or edit symbols), a Punctuation Window 14 which is transparent opens as shown in FIG. 3b. FIG. 4 shows the X and Y co-ordinates of the Punctuation Window 14.

It will be appreciated by those skilled in the art that generally available prior art systems typically interpret Punctuation Symbols within a broad context, which includes not only Punctuation Symbols, but also letters, digits, and Edit Symbols. The more characters that can be recognized within a given context, the greater the probability that any given character will be mis-recognized. In addition, some Punctuation Symbols are similar in shape and/or orientation to other symbols (eg: Letters, Digits, Edit Symbols) that are recognized within the same context. It is more difficult for Handwriting Recognition Software to differentiate between characters with similar shape and orientation. Accordingly, Punctuation Symbols are often mis-interpreted.

Conversely, it is less difficult for Handwriting Recognition Software to differentiate between characters with unique shape and orientation. Therefore, limiting the Punctuation Window 14 to a context defined by a pre-defined set of 32 uniquely shaped and oriented Punctuation Symbols, increases the probability that any given Punctuation Symbol will not be misinterpreted.

The punctuation mode of the present invention allows a user to insert one or more punctuation characters at a time. The punctuation mode character set consists of a combination of uni-stroke (e.g., {, }, ^, @, /, \, [, ]) and multi-stroke (eg: +,=, $, ;, :, %, !) punctuation characters. Multi-stroke punctuation characters must be completed prior to interpretation in order to be correctly interpreted. For example, if a user failed to cross the plus sign prior to interpretation, the unfinished plus sign consisting of just a vertical stroke, would most likely be interpreted as a lower-case letter I. Therefore, a time-out is a necessary feature of a context which includes multi-stroke punctuation characters, because it gives a user the opportunity to complete a multi-stroke punctuation character prior to interpretation. Therefore, the punctuation time-out which affords a user the opportunity to complete a multi-stroke punctuation character prior to interpretation, also affords a user the opportunity to complete two or more punctuation characters at a time.

Note that in the method of the present invention the user does not have to perform any additional steps, to activate the Punctuation Window 14. Further, the method of the present invention does not require the user to visually isolate a button (eg: that represents a punctuation character the user wants to insert) from a palette of buttons. The method of the present invention does not force the user to move the tip of the Electronic Pen any substantial distance in order to insert one or more punctuation characters. For example, to insert a period using the method of the present invention: the user, after positioning the cursor, pens down within a pre-selected distance of the present position of the cursor, and then draws a counter-clockwise circle.

A user can use the Punctuation Window 14 to insert all 32 existing punctuation characters along with three delimiter characters (eg: Space, Tab, and Return) by simply drawing the punctuation characters starting from inside the Punctuation Window 14. However, a user can only insert less than half the existing punctuation characters using generally available Punctuation Palettes.

Typically in prior art a user must wait for a time-out to occur, before drawn punctuation characters are interpreted. However, a user of the present invention does not necessarily have to wait for a time-out to occur, before drawn punctuation characters are interpreted. A user using the present invention can initiate the recognition process, which interprets punctuation characters that are drawn starting from inside the Punctuation Window 14, by either waiting for a punctuation time-out to occur, or by single-clicking inside the boundary of the Punctuation Window 14 or by penning down outside the boundary of the Punctuation Window 14.

Two-thirds of the punctuation characters used in the punctuation character set of the present invention, have the same shape and orientation as punctuation characters that are used in the English alphabet. The remaining one-third of punctuation characters used in the punctuation character set of the present invention, are modified versions of the punctuation characters used in the English alphabet. The modified punctuation symbols are also easy to remember, because each modified punctuation symbol contains a visual element (eg: o represents a period, g represents a comma, etc . . . ) that helps the user associate it back to its original counterpart.

There are a number of alternate methods of activating the Punctuation Window 14. The default method of activating the Punctuation Window 14 as described above is to position the pointer within a pre-selected distance of the present position of the cursor (eg: indicated by the Punctuation Window Flag). pen down and then commit to drawing a stroke. Alternatively the user could single-click on the present position of the cursor, select "Activate Punctuation Window" submenu; single-click on "Activate Punctuation Window" Toolbar Button; single-click on "Activate Punctuation Window" icon from Taskbar; or draw the "Activate Punctuation Window" Edit Symbol.

The Punctuation Window Flag is a visual indicator, that tells the user when they can activate the Punctuation Window 14, by penning-down and drawing a stroke. The default flag is a pointer shaped like a pen with NO flag. Alternatively, the Punctuation Window flag is a pointer shaped like a pen with P symbol flag; the tip of the pointer shaped like a pen changes to a colour other than black; the pointer shaped like a pen changes to a colour other than black; cursor changes to a colour other than black; blink-rate of a Cursor is reduced by at least 75%; or taskbar displays a pen icon with Punctuation Symbols.

Figure 5:
FIG. 5 is a line of text showing a transparent Selection Window 24 thereon.
Figure 6:
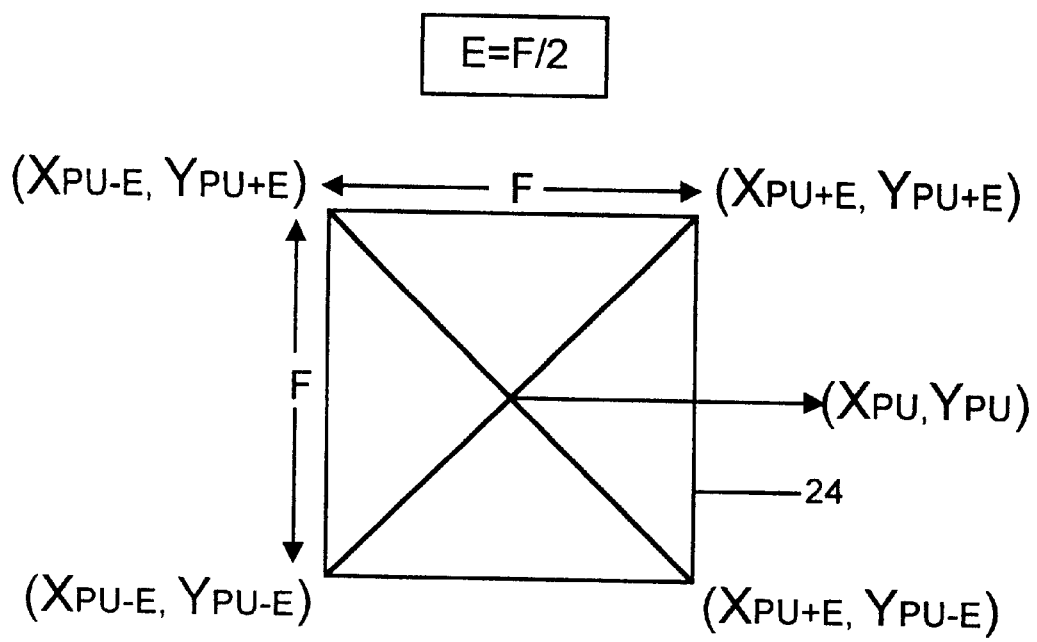
FIG. 6 is a front view of the Selection Window 24 of the present invention.
Figure 8A:
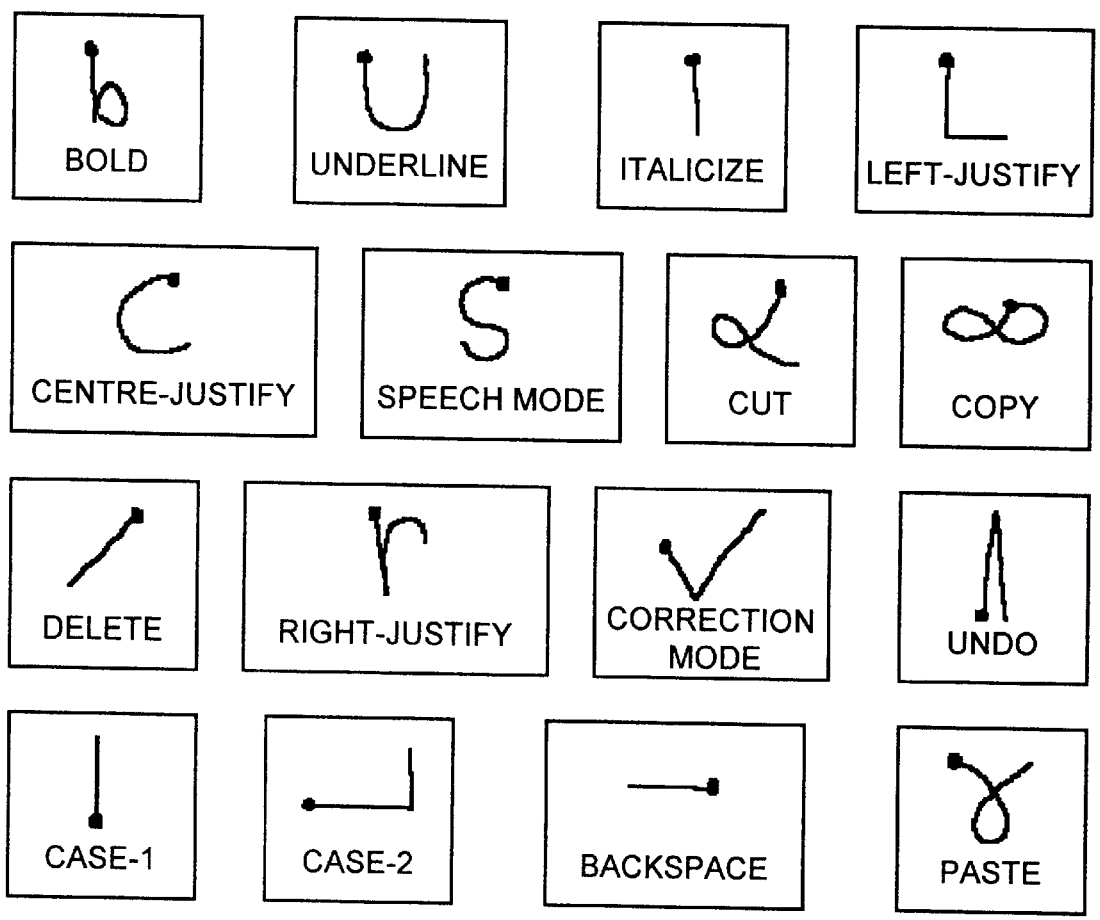
FIG. 8a is a Selection Look-Up Table.
Figure 8B:
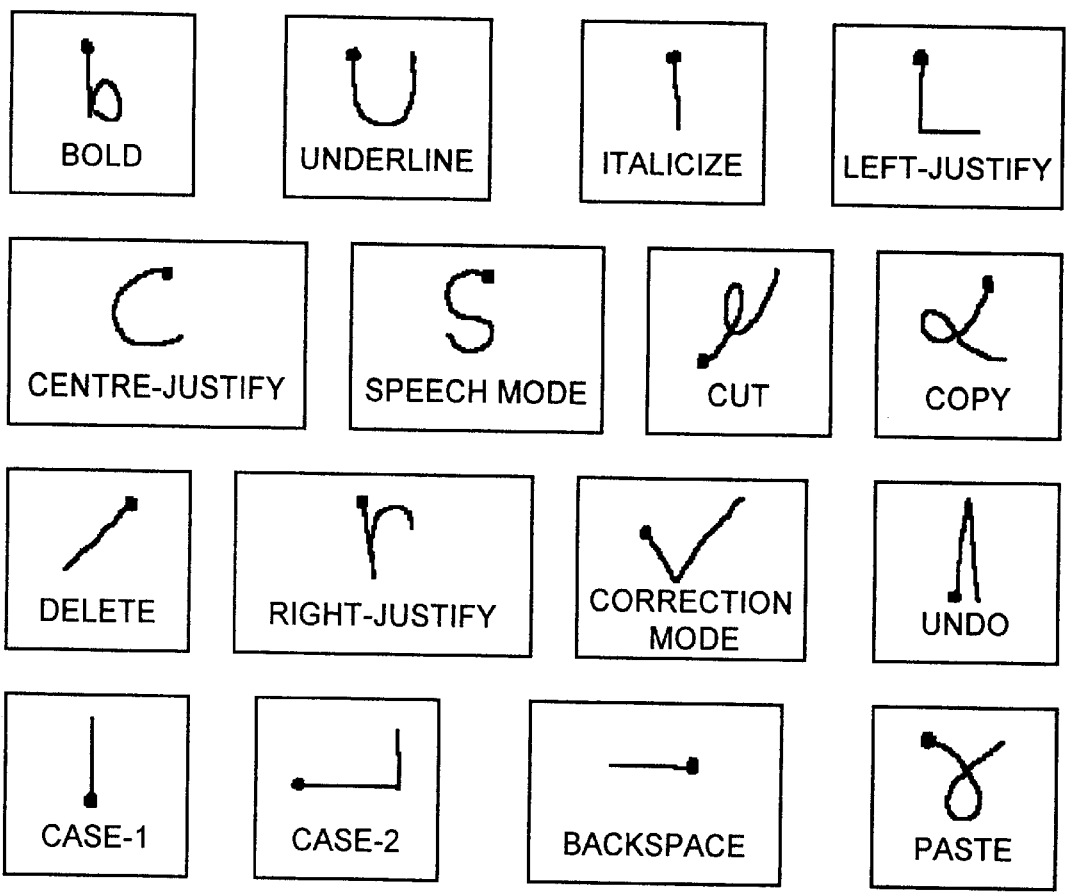
FIG. 8b is an alternate Selection Look-Up Table with different cut and copy symbols.

To activate the selection mode the user pens down 12 (shown in FIG. 1) at the location which represents the starting point of the block of text the user intends to select. The user must then maintain the present position of the tip of the Electronic Pen, within an absolute pre-selected distance of the original position of the tip of the Electronic Pen, until the pointer changes from a pen to an arrow to indicate that the selection mode 16 has been activated. After the selection mode has been activated, the user drags the tip of the Electronic Pen to the location which represents the end point of the block of text that the user wants to select. After the user pens-up from the surface of the Digitizer, the block of text is highlighted 18 and a Selection Window 24 (shown in FIGS. 5 and 6) is opened. Preferably the Selection Window 24 appears on the computer screen centred around the position of the pen up, as shown in FIG. 5. The user then draws one of the set of sixteen Selection Window Edit Symbols 43, shown in FIG. 8*a,* starting within the boundaries of the Selection Window 24. An alternate set of sixteen Selection Window Edit Symbols 45 is shown in FIG. 8*b* wherein the cut and copy symbol are different from those shown in FIG. 8*a.*

Figure 7:
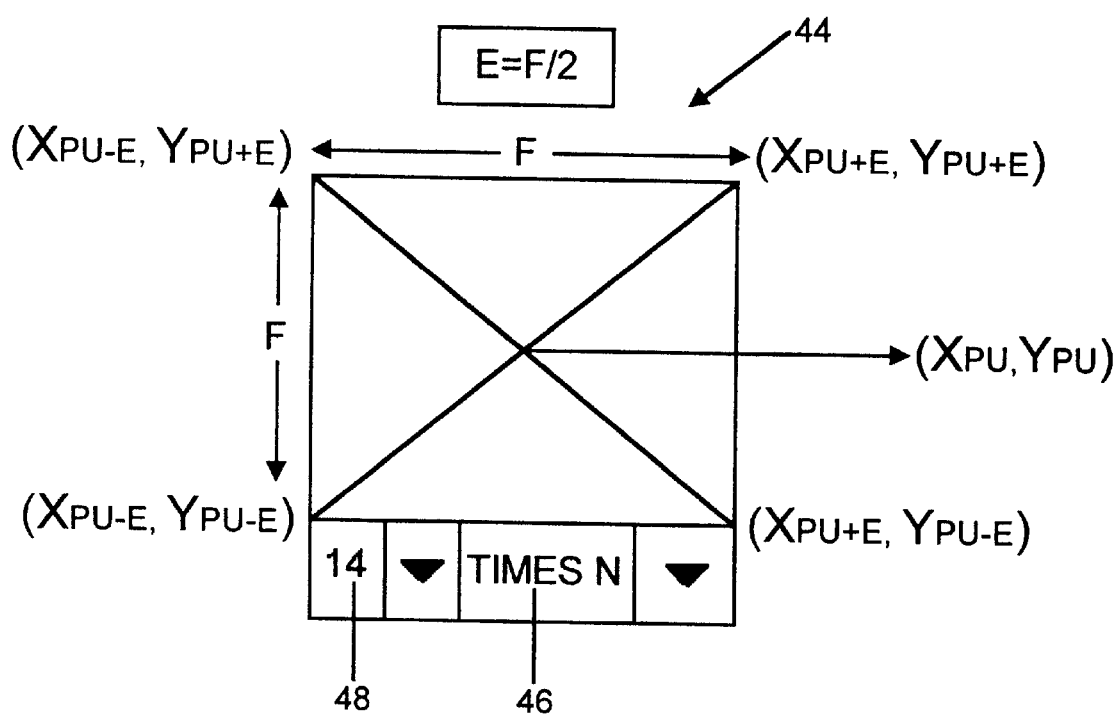
FIG. 7 is a front view of an alternate Selection Window 44.

An alternate Selection Window 44 is shown in FIG. 7. The alternate Selection Window 44 includes a font type drop-down menu 46 and a font size drop-down menu 48 that may be included in the Selection Window 24 and thereafter activated at the users discretion.

There are a number of alternate methods of activating the Selection Window 24. The default method as described above is where the Selection Window 24 is automatically displayed after the user selects a block of text and pens up. Alternatively the user could select "Activate Selection Window" from the submenu; single-click on "Activate Selection Window" Toolbar Button; single-click on "Activate Selection Window" icon from Taskbar; or draw the "Activate Selection Window" edit symbol.

The method of the present invention provides an increased reliability with regard to interpreting the Edit Symbols drawn starting from inside a Selection Window 24 (ie: a transparent Window with a solid border), by interpreting the Edit Symbols based upon a context limited to a pre-defined set of 16 uniquely shaped and oriented Uni-Stroke Edit Symbols. Typically prior art methods interpret Edit Symbols within a broad context, which includes not only Edit Symbols, but also Letters, Digits, and Punctuation Symbols. As discussed above in the context of the Punctuation Window 14 or punctuation mode, the more characters that can be recognized within a given context, the greater the probability that any given character will be mis-recognized. In addition, some Edit Symbols are similar in shape and/or orientation to other symbols (ie: letters, digits, Punctuation Symbols) that are recognized within the same context. It is more difficult for Handwriting Recognition Software to differentiate between characters with similar shape and orientation. Accordingly, Edit Symbols are often misinterpreted.

Conversely, it is less difficult for Handwriting Recognition Software to differentiate between characters with unique shape and orientation. Therefore, limiting the Selection Window 24 to a context defined by a pre-defined set of 16 uniquely shaped and oriented Edit Symbols, increases the probability that any given Edit Symbol will not be misinterpreted.

In addition, the Edit Symbols are easy to remember, because each Edit Symbols consists of either a mnemonic acronym (eg: b for bold, u for underline, c for centre, etc . . . ) or contains a visual element (eg: checkmark represents correction, forward-slash represents deletion, symmetrical infinity symbol represents copy, etc . . . ), that helps a user remember the editing function associated to the Edit Symbol.

The edit mode is a method for the user to quickly and easily perform limited editing functions on the text. The Edit Symbols are uni-stroke symbols which allow the user to quickly and easily perform certain limited functions. A First Stroke Analysis is conducted to determine if a First Stroke Edit Symbol 26 was drawn. The five First Stroke Edit Symbols 26 are as follows:

Undo symbol (/)—Cancels the previous actioned performed.

Backspace symbol (——•)—The character closest to the starting point of the Backspace symbol will be deleted.

Case-1 symbol (|)—The case of the letter closest to the starting point of the Case-1 symbol will be changed (eg: lower-case becomes upper-case).

Case-2 symbol (•——|)—The case of the letter(s) defined by (Xstart, Ystart) and (Xend, Ystart) coordinates of the Case-2 symbol will be changed (eg: upper-case becomes lower-case).

Paste symbol ( ⤴ )—the starting point of the paste symbol indicates the location where the contents of the clipboard will be inserted. *Note* The heavy dot indicates where the user should start to draw the symbol.

Note that these five First Stroke Edit Symbols 26 are interpreted just after they are drawn (ie: No time-out occurs after an user draws one of the five First Stroke Edit Symbols 26). To activate the edit mode the user merely draws one of the five First Stroke Edit Symbols 26 within the Window with Focus.

First Stroke Analysis involves analysing the first stroke drawn, based upon a pre-defined set of characters consisting of a number of First Stroke Handwriting Symbols, and several uniquely shaped and oriented uni-stroke edit symbols. The first stroke drawn refers to the first stroke drawn starting from inside the Window with Focus, either before the first handwriting time-out of the present session or after the most recent handwriting time-out of the present session.

A First Stroke Handwriting Symbol refers to any potential first stroke of a cursively written word or any potential first stroke of a uni-stroke or multi-stroke digit, and/or Upper/Lower Case Letter, and/or Punctuation Symbol. If the first stroke drawn is interpreted as a First Stroke Edit Symbol 26, the method of the present invention executes the editing function associated with the First Stroke Edit Symbol 26. However, if the first stroke drawn is interpreted as a First Stroke Handwriting Symbol, the method of the present invention will wait until a handwriting time-out occurs, to interpret all strokes drawn (eg: which include the first stroke drawn) as handwriting (ie: upper-case letters, lower-case letters, digits, and punctuation).

Figure 9:
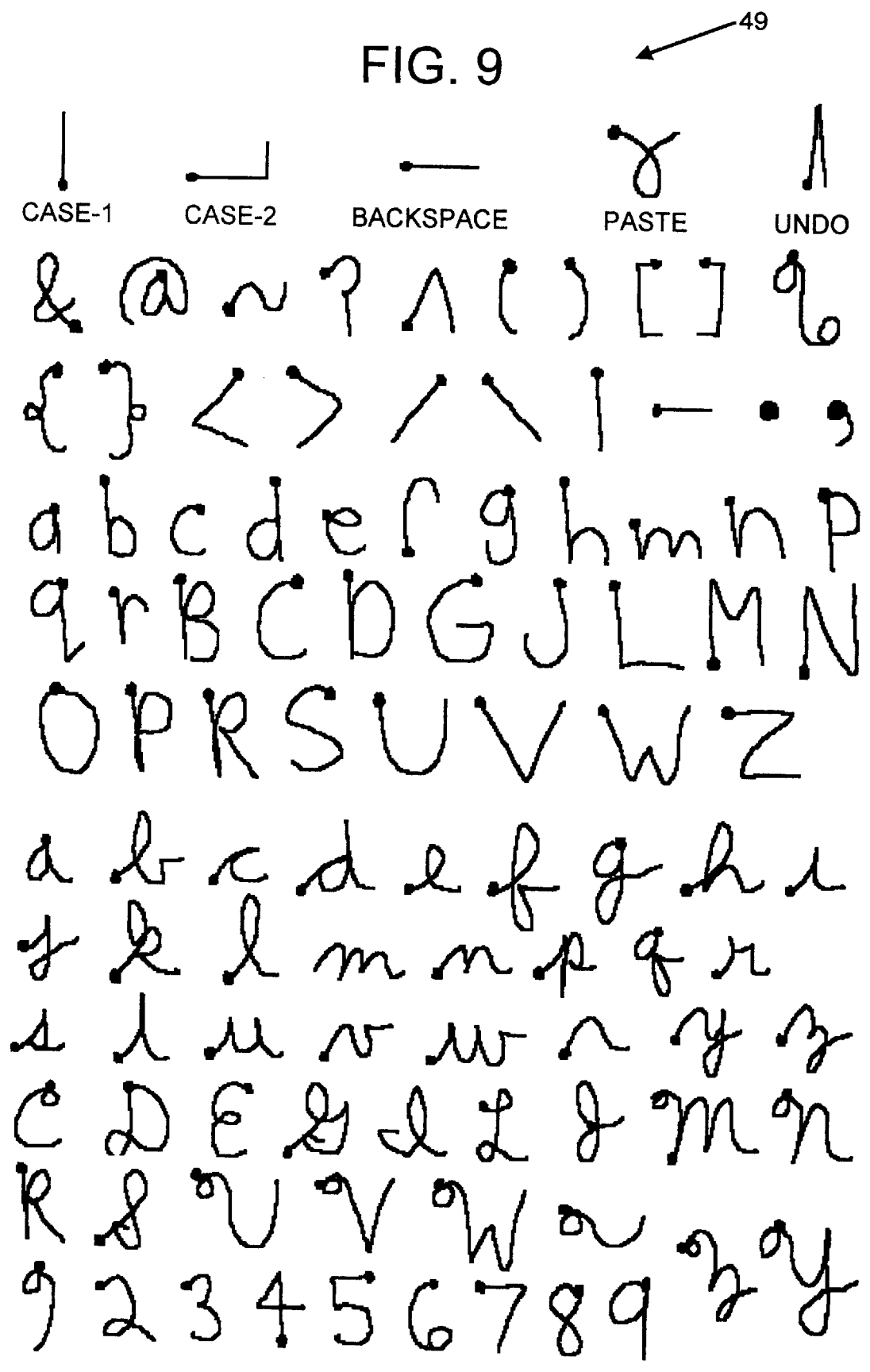

A stroke consists of an order set of points which are stored in a buffer (ie: a place in memory used to store one or more strokes waiting to be interpreted). Just after a user draws a stroke, the contents of the buffer is analysed by the Handwriting Recognition Software based upon the First Stroke Look-up Table shown in FIG. 9.

Handwriting Recognition Software compares the shape and orientation of each handwritten character against the shape and orientation of each pre-defined character, found within a pre-defined set of characters that is associated with the Window with Focus. Each comparison yields a confidence level, which is a percentage estimate of the probability that a given handwritten character represents a given pre-defined character, found within a pre-defined set of characters associated with the Window with Focus. After all the comparisons are completed, the pre-defined character with the highest level of confidence is chosen, provided the confidence level of the chosen pre-defined character exceeds the minimum pre-selected level of confidence required for a character to be recognized.

Typically prior art systems that use First Stroke Analysis for Edit Symbols compare the First Stroke against only the Edit Symbols. However, this approach may lead to problems, since there is a probability that if a user draws a First Stroke Handwriting Symbol it will be mis-interpreted as a First Stroke Edit Symbol, because its level of confidence just manages to exceed the minimum pre-selected level of confidence required for a symbol to be recognized. The method of the present invention solves the above problem by analysing the first stroke drawn by a user against a pre-defined set of characters consisting of both First Stroke Edit Symbols 26 and First Stroke Handwriting Symbols. Therefore, if a user draws a First Stroke Handwriting Symbol, it will be compared against each First Stroke Edit Symbol and First Stroke Handwriting Symbol, found within the pre-defined character set that is associated with the Window with Focus. Each First Stroke Handwriting Symbol and First Stroke Edit Symbol 26 compared against the first stroke drawn is assigned a level of confidence. The highest level of confidence will most likely be assigned to a First Stroke Handwriting Symbol, due to the higher probability that the First Stroke Handwriting Symbol drawn by the user, when compared against both First Stroke Handwriting Symbols and First Stroke Edit Symbols 26, will be more similar in shape and orientation with respect to a First Stroke Handwriting Symbol than a First Stroke Edit Symbol 26. Since the symbol with the highest level of confidence is chosen, the stroke drawn by a user will be interpreted as a First Stroke Handwriting Symbol.

Further, with regard to editing a document, the method of the present invention is an improvement over the prior art since it interprets Edit Symbols without having to wait for a time-out. Note that a time-out is an essential feature of a context which consists of multi-stroke symbols, because it gives a user an opportunity to complete a multi-stroke symbol prior to interpretation. The method of the present invention uses two methods to eliminate the need to wait for a time-out to occur before an edit symbol is interpreted. The first method involves using a Selection Window 24 that can only recognize uni-stroke edit symbols. Since the context of the Selection Window 24 is limited to one stroke symbols, there is no need to wait for a time-out to occur before the symbol drawn inside the Selection Window 24 is interpreted. The second method involves using First Stroke Analysis, which analyses the first stroke drawn prior to a timeout, in order to determine if the stroke represents an First Stroke Edit Symbol 26.

The method of the present invention provides the user with two options with regard to common editing functions, such as cut, copy, paste, delete and case change. The first is in the Selection Mode and the second is in the Edit Mode. In the Selection Mode, the user selects a block of text, then draws a uni-stroke edit symbol (starting from inside a Selection Window 24) that is interpreted without having to wait for a time-out to occur. Alternatively, in the Edit Mode, the user merely draws one of the five First Stroke Edit Symbols 26 which are interpreted by First Stroke Analysis. In the Edit Mode there is no need for the user to position the cursor before drawing the symbol.

The case changing method of the present invention provides a simple and easy method for the user to change the case of one or more letter(s) and/or word(s). In addition, the case changing method is flexible enough to allow the user to change the case of one letter or a portion of a word. Thus changing wordperfect to WordPerfect™ is readily possible with the case changing method of the present invention. Similarly the user may easily change a portion of a word, thus changing sundial to SUNdial or exclusive to exCLUsive. Accordingly, the user can change the case of any letter no matter where the letter is located in the word, or change the case of one or more consecutive letters, no matter where the subset of letters is located in the word. The First Stroke Edit Symbols 26 are positional in nature, so the user does not have to position the cursor before drawing the symbol. Also the user does not have to wait for a time-out to occur before First Stroke Analysis interprets the First Stroke Edit Symbols 26.

As discussed above there are two input modes, namely dictation and handwriting. To activate dictation the user pens down (at the location where the user wants to insert text using dictation) and maintains the present pen down coordinate within an absolute distance of the initial pen down coordinate, until the pointer changes shape from a pen to an arrow. Then the user pens up (without selecting a block of text) and after the user hears "Begin Dictation", the user can start to dictate into the microphone. To de-activate dictation the user pens down and maintains the present pen down coordinate within an absolute distance of the initial pen down coordinate, until the pointer changes shape from a pen to an arrow. After the user pens up (without selecting a block of text), the user will hear "Stop Dictation". In addition, preferably there is an icon located in the taskbar that indicates whether dictation is enabled or disabled.

To activate the handwriting portion of the input mode, the user simply writes or prints on the active surface of the Digitizer, and after a handwriting time-out occurs, the ordered set of strokes (displayed on the computer screen as Electronic Ink) will be interpreted by Handwriting Recognition Software as ASCII. Alternatively, the user first single-clicks on the Digitizer to position the cursor. Thereafter the user writes or prints on the Digitizer as above.

Note that only one method of input (eg: speech or handwriting) is possible at one time. Therefore, dictation mode if activated, is temporarily de-activated, while the user switches to any of the other available modes (eg: Correction, Punctuation, Selection, Edit, and Handwriting Input mode).

Alternatively, there could be five types of input, namely: Speech, Handwriting, OCR(Optical Character Recognition), Ink Annotation, or Keyboarding. The speech and the handwriting input would be as described above. Ink Annotation refers to Electronic Ink that is permanently attached to a word processing document, where the user marked up the word processing document with Electronic Ink, as opposed to being interpreted by Handwriting Recognition Software as ASCII.

The Correction Mode allows the user to correct the text. In order to differentiate between text created by keyboarding, speech or handwriting, the text may be assigned different colours. There are two methods to correct handwritten text, namely: correcting writing or printing using the Input Window 52; and correcting writing or printing using the Alternative Word List 56.

Figure 11:
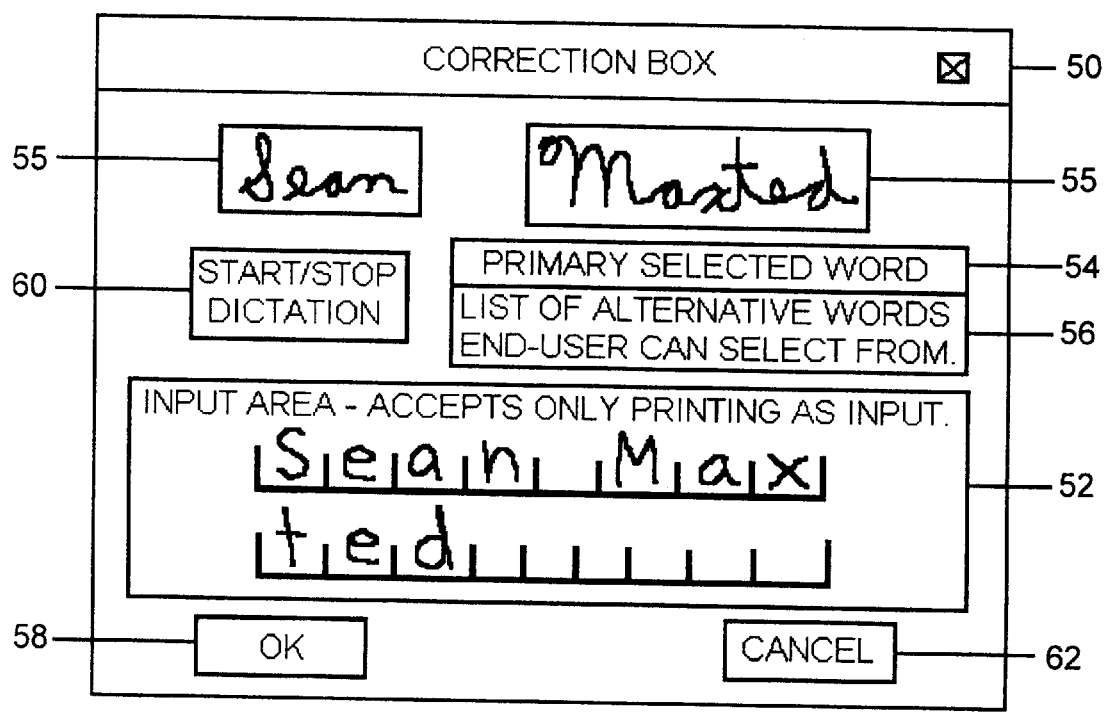
FIG. 11 is a Correction Box for correcting handwritten text.

To correct writing or printing using the Input Window 52, the user double-clicks on the word which represents the handwriting recognition error. A Correction Box 50, as shown in FIG. 11, appears on the computer screen. The user then writes or prints the word that was mis-recognized again in the Input Window (Input Area) 52. After a pre-selected time-out, the Handwriting Recognition Software will interpret the writing or printing found inside the Input Window 52. Both the Primary Selected Word 54 and the Alternative Word List 56 will be updated. If the Primary Selected Word 54 as shown represents the correct word, the user simply clicks on the OK button 58 to substitute the mis-recognized word with the Primary Selected Word 54. The Correction Box 50 also includes Bitmap(s) of Handwritten Word(s) 55, a Start/Stop Dictation Command Button 60 and a Cancel Command Button 62.

To correct writing or printing using the Alternative Word List 56, the user double-clicks on the word which represents the handwriting recognition error. The Correction Box 50 appears on the computer screen. The user single-clicks on the correct word in the Alternate Word List 56 to select it. Both the Primary Selected Word 54 and the Alternative Word List 56 will be updated. The user then clicks on the OK Command Button 58 to substitute the mis-recognized word with the word selected from the Alternate Word List 56.

Figure 12:
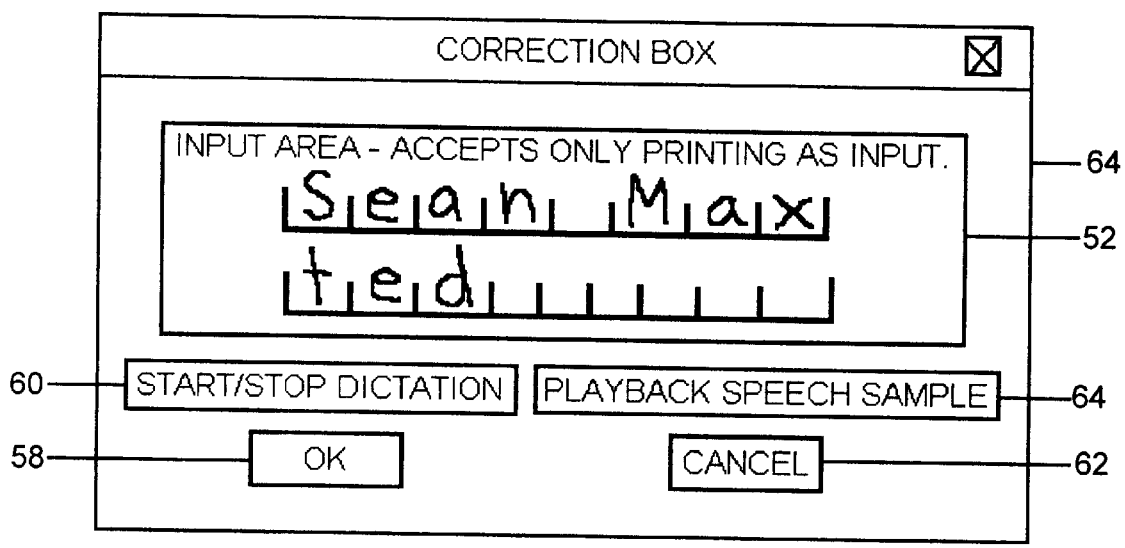
FIG. 12 is a Correction Box for correcting dictated text.

A Speech Correction Box 64 is shown in FIG. 12. It is similar to the Correction Box 50. It includes an Input Window (Input Area) 52, an OK Command Button 58, a Start/Stop Dictation Command Button 60 and a Cancel Command Button 62, as discussed above. In addition, it includes a Playback Speech Sample Command Button 64.

Figure 13:
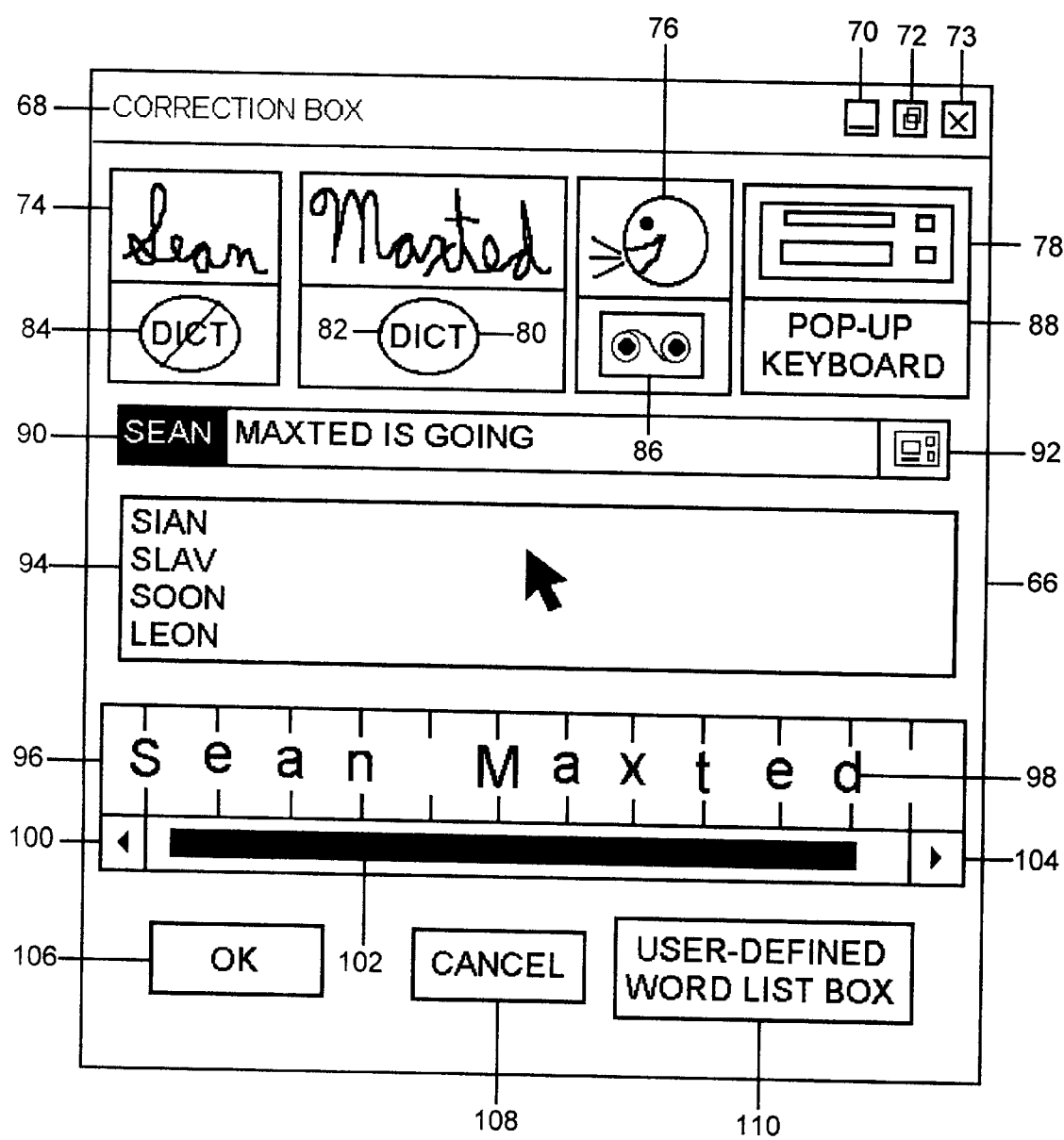
FIG. 13 is an alternate embodiment of a Correction Box for correcting both handwritten, dictated and keyboard text.

Referring to FIG. 13, an alternate embodiment of the Correction Box is shown generally at 66. Correction Box 66 combines the features of Correction Box 50 and Speech Correction Box 64. Correction box 66 includes a number of features including the following features:

Correction Box Title Bar 68: The horizontal bar across the top of the window that contains the name of the window (ie: Correction Box 66), the Minimize Button 70, the Restore Button 72, and the Close Button 73.

Minimize Button 70: A button used to shrink an application window or document window to an icon.

Restore Button 72: A button that returns the window to the size and position it was prior to being either maximized or minimized.

Close Button 73: A button used to close the window.

Handwriting Bitmap Icon 74: Indicates the word was generated by handwriting and shows the bitmap of the word.

Speech Icon 76: Indicates the word was generated by dictation.

Keyboard Icon 78: Indicates the word was generated by method other than handwriting or dictation, such as keyboarding, OCR (Optical Character Recognition), etc.

Dictionary Icon 80: Used to indicate the dictionary status of a handwritten word.

Grayed out Dictionary Icon (not shown)—indicates the word belongs to the Default Dictionary Word List.

Dictionary Icon without a slash through it 82—indicates the word belongs to the present Default User-Defined Dictionary.

Dictionary Icon with a slash through it 84—indicates the word does not belong to the present Default User-Defined Dictionary.

Playback Icon 86: Single-clicking twice on the same Playback Icon 86 or single-clicking on two Playback Icons 86 having Playback Icons 86 contiguously therebetween, results in the playback of the speech segments on and between the two Playback Icons 86 clicked on Pop-up Keyboard Command Button 88: A Pop-Up Keyboard Dialog Box 176, that allows a user to input text into the Primary Word List 90 by single-clicking on the virtual keys (ie: command buttons which insert individual alpha-numeric character or punctuation or perform a specific action when single-clicked on) of the Pop-Up Keyboard Dialog Box 176, is displayed by single-clicking on the Pop-up Keyboard Command Button 88.

Primary Word List 90: Displays the word(s) selected for correction.

Pop-up Keyboard Icon 92: A Pop-Up Keyboard Dialog Box 176, that allows a user to input text into the Primary Word List 90 by single-clicking on the virtual keys (ie: command buttons which insert individual alpha-numeric character or punctuation or perform a specific action when single-clicked on) of the Pop-Up Keyboard Dialog Box 176, is displayed by single-clicking on the Pop-up Keyboard Icon 92.

Alternative Word List 94: Displays the alternative list of words (ie: generated by either handwriting or dictation) that is associated with the presently selected word.

Correction Box Writing Window 96: A Window that is capable of receiving input in the form of Electronic Ink, which is interpreted by Handwriting Recognition Software into ASCII, after a handwriting time-out occurs.

Correction Box Writing Cell 98: The area of the Correction Box Writing Window 96 which contains an individual character (lower-case letter, upper-case letter, digit, punctuation mark, or delimiter).

Writing Window Left Scroll Arrow 100: Scrolls the text in the Correction Box Writing Window 96 one word to the left each time the user single-clicks on it. Scrolls the text in the Primary Word List 90 one word to the left each time the user single-clicks on it, provided the Primary Word List 90 is full. Scrolls the icons located above the Primary Word List 90 one icon to the left, each time the user single-clicks on it.

Writing Window Horizontal Scroll Bar 102: Scrolls the text in the Correction Box Writing Window 96, wherever the Writing Window Horizontal Scroll Bar 102 is dragged to by the user. Scrolls the text in the Primary Word List 90, wherever the Writing Window Horizontal Scroll Bar 102 is dragged to by the user, provided the Primary Word List 90 is full. Scrolls the icons located above the Primary Word List 90, wherever the Writing Window Horizontal Scroll Bar 102 is dragged to by the user.

Writing Window Right Scroll Arrow 104: Sc rolls the text in the Correction Box Writing Window 96 one word to the right each time the user single-clicks on it. Scrolls the text in the Primary Word List 90 one word to the right each time the user single-clicks on it, provided the Primary Word List 90 is full. Scrolls the icons located above the Primary Word List 90 one icon to the right, each time the user single-clicks on it.

Correction Box OK Command Button 106: Closes down the Correction Box 66 and replaces the word(s) originally selected for correction with the contents of the Correction Box Writing Window 96.

Correction Box Cancel Command Button 108: Closes down the Correction Box 66 and does not replaces the word(s) originally selected for correction with the contents of the Correction Box Writing Window 96.

User-Defined Word List Box Command Button 110: Opens up the User-Defined Word List Box 112 shown in FIG. 14, which allows a user to add, delete, or modify existing words in the Default User-Defined Dictionary.

Figure 14:
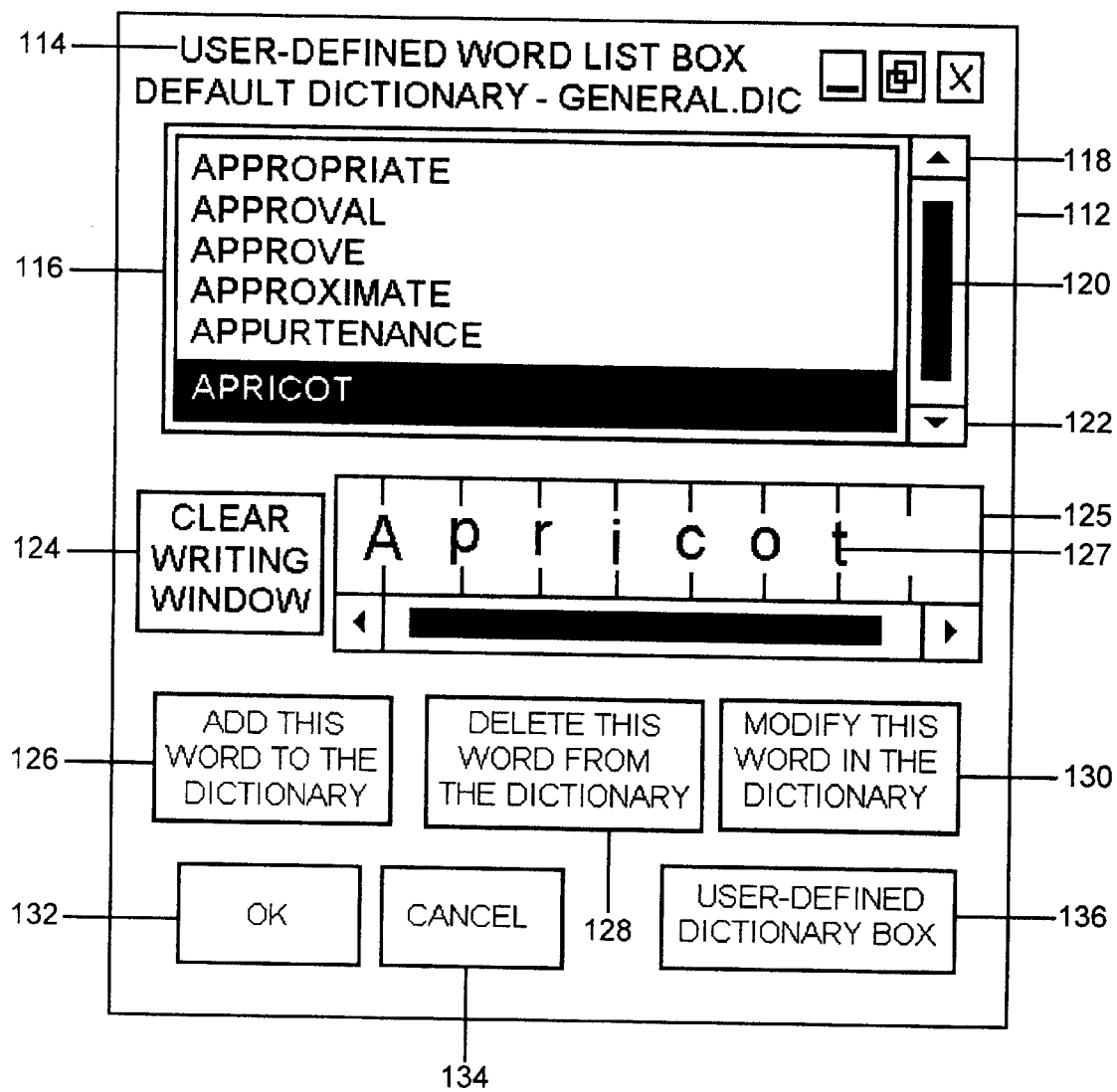
FIG. 14 is a User-Defined Word List Box.

The User-Defined Word List Box 112 shown in FIG. 14 includes the following features:

User-Defined Word List Box Title Bar 114: The horizontal bar across the topof the window that contains the name of the window (ie: User-Defined Word List Box), the Minimize Button 70, the Restore Button 72, and the Close Button 73.

User-Defined Word List Window 116: Window which displays the list of words associated with the Default (ie: presently loaded) User-Defined Dictionary.

Word List Upper Scroll Arrow 118: Scrolls the word(s) located in the User-Defined Word List Window 116 one word up, each time the user single-clicks on it.

Word List Vertical Scroll Bar 120: Scrolls the word(s) located in the User-Defined Word List Window 116 wherever the Word List Vertical Scroll Bar 120 is dragged to by the user.

Word List Lower Scroll Arrow 122: Scrolls the word(s) located in the User-Defined Word List Window 116 one word down, each time the user single-clicks on it.

Clear Writing Window Command Button 124: Erases the contents of the Word List Writing Window 125, each time the user single-clicks on it.

Word List Writing Window 125: A Window that is capable of receiving input in the form of Electronic Ink, which is interpreted by Handwriting Recognition Software into ASCII, after a handwriting time-out occurs.

Add this word to the dictionary Command Button 126: Used in conjunction with the Clear Writing Window Command Button 124 to add the word presently displayed by the Word List Writing Window 125 to the Default User-Defined Dictionary.

Word List Writing Cell 127: The area of the Word List Writing Window 125 which contains an individual character (lower-case letter, upper-case letter, digit, punctuation mark, or delimiter).

Delete this word from the dictionary Command Button 128: Used to delete the word presently highlighted in the User-Defined Word List Window 116 from the Default User-Defined Dictionary.

Modify this word in the dictionary Command Button 130: Used to modify the word presently highlighted in the User-Defined Word List Window 116 in the Default User-Defined Dictionary.

Word List OK Command Button 132: User-Defined Word List Box 112 is closed down after a user single-clicks on it.

Word List Cancel Command Button 134: Same function as Word List OK Command Button 132.

User-Defined Dictionary Box Command Button 136: Displays User-Defined Dictionary Box 138 shown in FIG. 15, which allows a user to delete an existing dictionary, or to save a new dictionary, or to reset the default dictionary.

Figure 15:
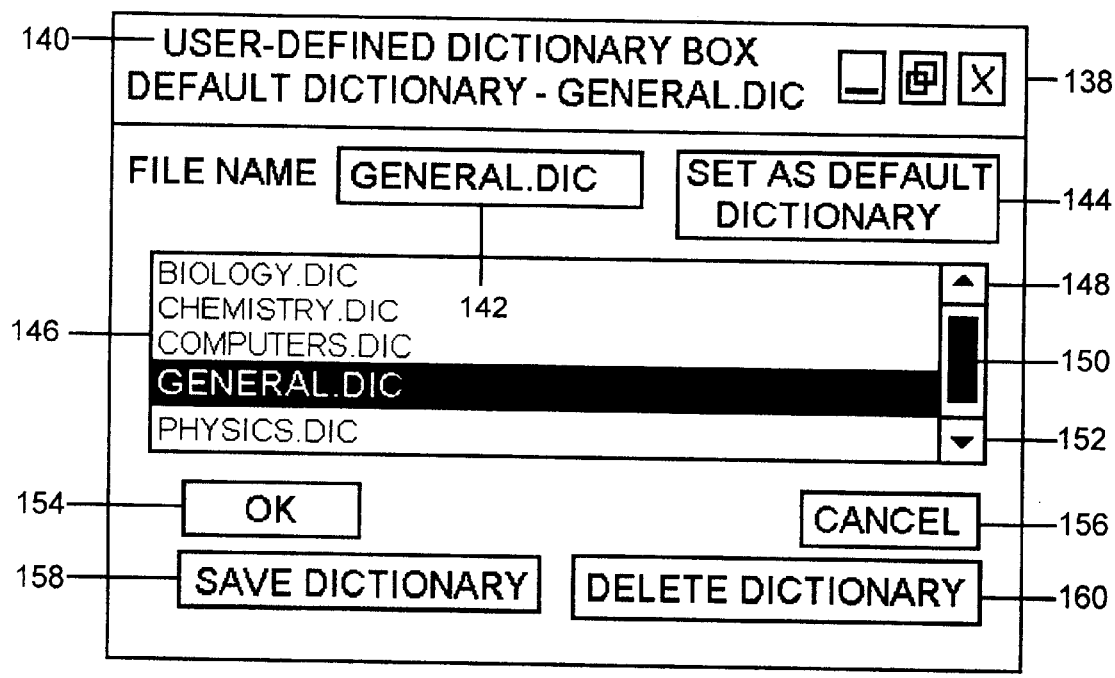
FIG. 15 is a User-Defined Dictionary Box.

The User-Defined Dictionary Box 138 shown in FIG. 15 includes the following features:

User-Defined Dictionary Box Title Bar 140: The horizontal bar across the top of the window that contains the name of the window (ie: User-Defined Dictionary Box), the Minimize Button 70, the Restore Button 72, and the Close Button 73.

Dictionary Name Text Box 142: Initially displays the name of the presently highlighted User-Defined Dictionary.

Set as Default Dictionary Command Button 144: Makes the presently highlighted User-Defined Dictionary, the new Default User-Defined Dictionary.

User-Defined Dictionary Window 146: The Window which displays the list of available User-Defined Dictionaries.

Dictionary Box Upper Scroll Arrow 148: Scrolls the dictionary filename(s) located in the User-Defined Dictionary Window 146 one filename up, each time the user single-clicks on it.

Dictionary Box Vertical Scroll Bar 150: Scrolls the dictionary filename(s) located in the User-Defined Dictionary Window 146, wherever the Dictionary Box Vertical Scroll Bar 150 is dragged to by the user.

Dictionary Box Lower Scroll Arrow 152: Scrolls the dictionary filename(s) located in the User-Defined Dictionary Window 146 one filename down, each time the user single-clicks on it.

Dictionary Box OK Command Button 154: User-Defined Dictionary Box 138 is closed down after user single-clicks on it.

Dictionary Box Cancel Command Button 156: User-Defined Dictionary Box 138 is closed down after user single-clicks on it.

Save Dictionary Command Button 158: Creates a new dictionary and saves it under the name displayed in the Dictionary Name Text Box 142.

Delete Dictionary Command Button 160: Deletes the dictionary presently highlighted in the User-Defined Dictionary Window 146.

Figure 16:
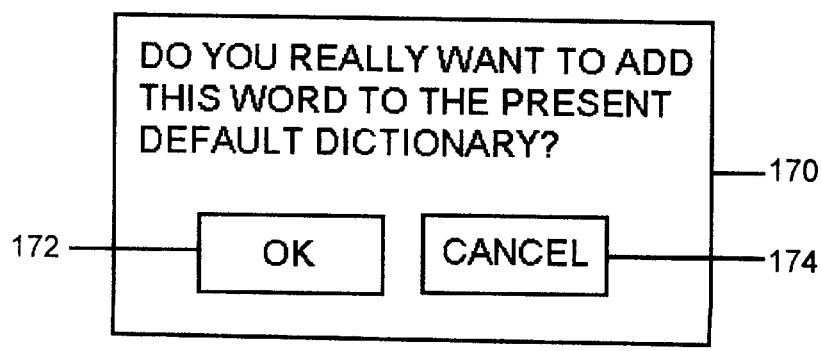
FIG. 16 is an Add word to default dictionary Dialog Box.

The Add word to default dictionary Dialog Box 170 shown in FIG. 16 includes the following features:

Add word to default dictionary Dialog Box 170: Gives a user the choice to add a word (associated to the Dictionary Icon with a slash through it 84 as shown in FIG. 13) to the present Default Dictionary.

Add word to default dictionary OK Command Button 172: Allows the user to add a word (associated to the Dictionary Icon with a slash through it 84) to the present Default Dictionary, by single-clicking on the Add word to default dictionary OK Command Button 172.

Add word to default dictionary Cancel Command Button 174: Allows the user to avoid adding a word (associated to the Dictionary Icon with a slash through it 84) to the present Default Dictionary, by single-clicking on the Add word to default dictionary Cancel Command Button 174.

Figure 17:
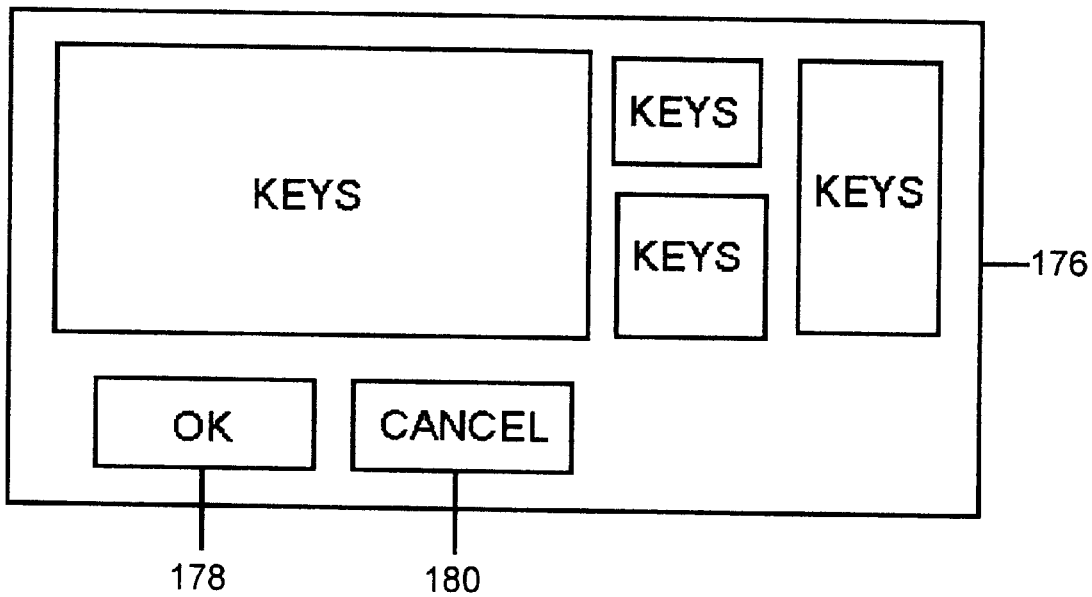
FIG. 17 is a Pop-Up Keyboard Dialog Box.

The Pop-Up Keyboard Dialog Box 176 shown in FIG. 17 includes the following features:

Pop-Up Keyboard Dialog Box 176: A dialog box that contains a Pop-Up Keyboard, that allows a user to input text into the Primary Word List 90 by single-clicking on the virtual keys (ie: command buttons which insert individual alpha-numeric character or punctuation or perform a specific action when single-clicked on) of the Pop-Up Keyboard Dialog Box 176.

Pop-Up Keyboard OK Command Button 178: The Pop-Up Keyboard Dialog Box 176 is closed down, if the user single-clicks on the Pop-Up Keyboard OK Command Button 178.

Pop-Up Keyboard Cancel Command Button 180: The Pop-Up Keyboard Dialog Box 176 is closed down, if the user single-clicks on the Pop-Up Keyboard Cancel Command Button 180.

Figure 18:
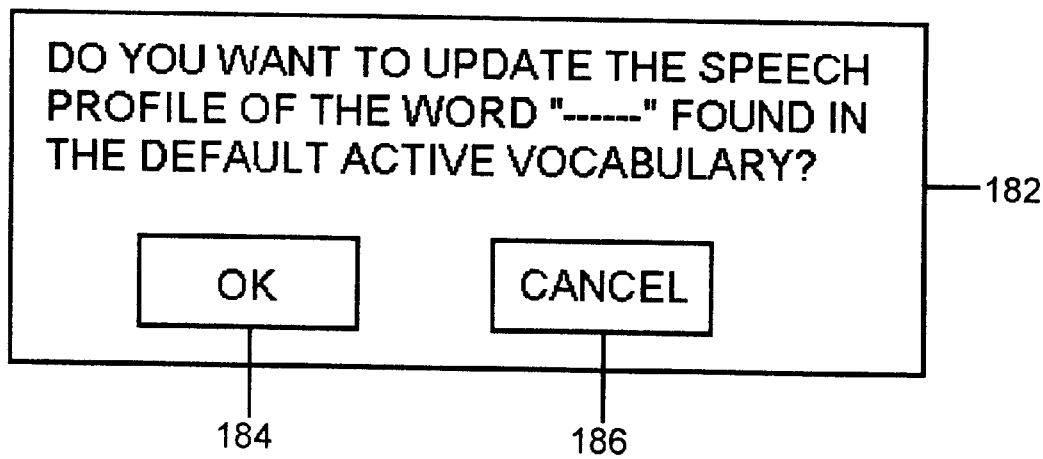
FIG. 18 is an Update speech profile Dialog Box.

The Update speech profile Dialog Box 182 shown in FIG. 18 includes the following features:

Update speech profile Dialog Box 182: Gives the user the choice to update the speech profile of a given word created by speech that was corrected.

Update speech profile OK Command Button 184: The user can update the speech profile of a given word (created by speech that was corrected), by single-clicking on the Update speech profile OK Command Button 184.

Update speech profile Cancel Command Button 186: The user can avoid updating the speech profile of a given word (created by speech that was corrected), by single-clicking on the Update speech profile Cancel Command Button 186.

Figure 19:
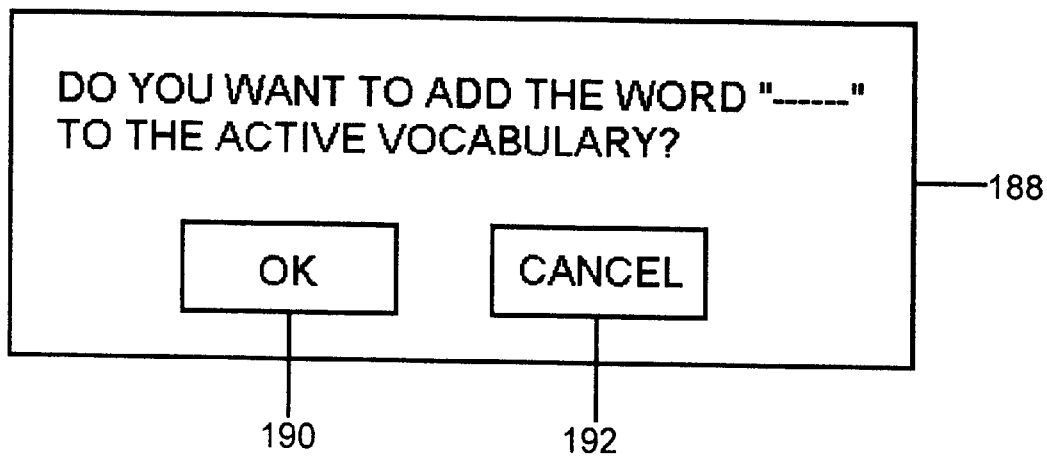
FIG. 19 is an Add word to active vocabulary Dialog Box.

The Add word to active vocabulary Dialog Box 188 shown in FIG. 19 includes the following features:

Add word to active vocabulary Dialog Box 188: Gives a user the choice to add a given word (created by speech that was corrected) to the Default Active Vocabulary.

Add word to active vocabulary OK Command Button 190: The user can add a given word (created by speech that was corrected) to the Default Active Vocabulary, by single-clicking on the Add word to active vocabulary OK Command Button 190.

Add word to active vocabulary Cancel Command Button 192: The user avoid adding a given word (created by speech that was corrected) to the Default Active Vocabulary, by single-clicking on the Add word to active vocabulary Cancel Command Button 192.

Figure 20:
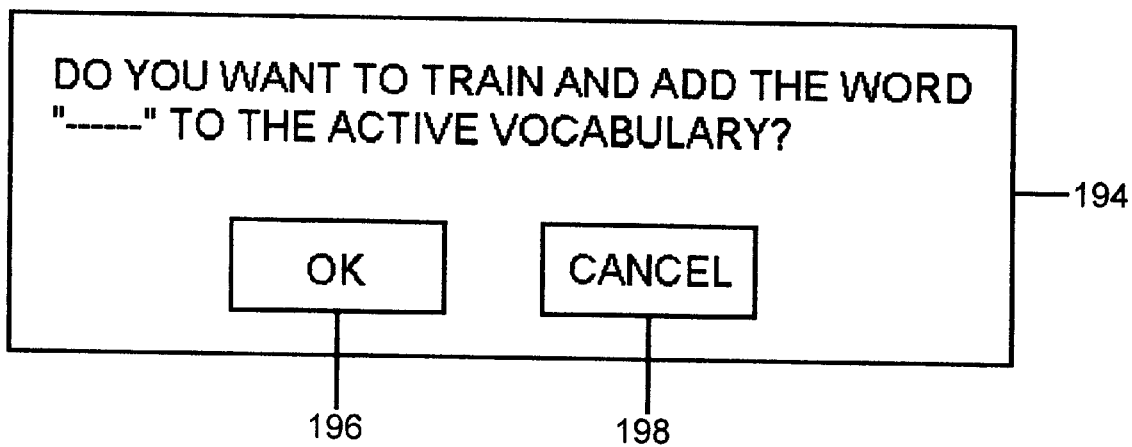
FIG. 20 is a Train and add word to active vocabulary Dialog Box.

The Train and add word to active vocabulary Dialog Box 194 shown in FIG. 20 includes the following features:

Train and add word to active vocabulary Dialog Box 194: Gives a user the choice to train and add a given word (created by speech that was corrected) to the Default Active Vocabulary.

Train and add word to active vocabulary OK Command Button 196: The user can train and add a given word (created by speech that was corrected) to the Default Active Vocabulary, by single-clicking on the Train and add word to active vocabulary OK Command Button 196.

Train and add word to active vocabulary Cancel Command Button 198: The user can avoid training and adding a given word (created by speech that was corrected) to the Default Active Vocabulary, by single-clicking on the Train and add word to active vocabulary Cancel Command Button 198.

*Note* The colour of a selected Handwriting Bitmap Icon 74 or a Speech Icon 76 or a Keyboard Icon 78 is red, while the colour of the non-selected Handwriting Bitmap Icon 74 or a Speech Icon 76 or a Keyboard Icon 78 is black.

In use wherein a user wants to use speech to replace one or more words selected for Correction, the user would perform the following steps:

1) Activate the Correction Mode by double-clicking on an individual word or by selecting a block of text and then drawing the Correction Symbol starting from inside the Selection Window 24.

2) Pen down on the Icon (ie: Handwriting Bit-map Icon 74 or Speech Icon 76 or Keyboard Icon 78) associated with the first word of the contiguous segment of text the user wants to replace using dictation. *Note* Maintain the present pen down coordinate within an absolute distance of the initial pen down coordinate, until the pointer changes shape from a pen to an arrow.

3) Pen up, after the pointer changes shape from an arrow to a microphone.

4) After the user hears "Begin Dictation", start to dictate into the microphone.

5) Pen down on the Icon (ie: Handwriting Bit-map Icon 74 or Speech Icon 76 or Keyboard Icon 78) associated with the last word of the contiguous segment of text the user wants to replace using dictation. *Note* Maintain the present pen down coordinate within an absolute distance of the initial pen down coordinate, until the pointer changes shape from a pen to an arrow.

6) Pen up, after the pointer changes shape from an arrow to a microphone. *Note* The user will then hear "Stop Dictation", which indicates that dictation has been de-activated.

Result: The contiguous segment of text (ie: defined by the icon used to activate dictation and by the icon used to de-activate dictation) is replaced with the text dictated into the microphone. As a result the Primary Word list 90, and the Correction Box Writing Window 96 are updated to reflect the above substitution.

In use, wherein the user wishes to select a word generated by speech and/or playback the segment of speech associated with a word in the Primary Word List 90, the user would perform the following steps:

1) Activate the Correction Mode by double-clicking on an individual word or by selecting a block of text and then drawing the Correction Symbol starting from inside the Selection Window 24.
2) Single-click on the Speech Icon 76 related to the segment of speech which is associated with the word the user wants played back.

Result: The word that is associated with the Speech Icon 76 that was single-clicked on, gets highlighted in the Primary Word List 90. The segment of speech associated to the word that is related to the Speech Icon 76 that was single-clicked on, gets played back through the speakers of the computer or a headset worn by the user. The word related with the Speech Icon 76 that was single-clicked on, gets shifted to the left margin of the Correction Box Writing Window 96. In addition, a list of alternative words that is associated with the selected word in the Primary Word List 90 is displayed in the Alternative Word List 94.

In use, where the user wishes to playback a contiguous segment of speech associated with two or more words, the user would perform the following steps:

1) Activate the Correction Mode by double-clicking on an individual word or by selecting a block of text and then drawing the Correction Symbol starting from inside the Selection Window 24.
2) Single-click on the Playback Icon 86 related to the first word of the contiguous segment of speech the user wants played back.
3) Single-click on the Playback Icon 86 related to the last word of the contiguous segment of speech the user wants played back.

Result: The contiguous segment of speech associated with the contiguous set of words defined by the first and last Playback Icon 86 that was single-clicked on, gets highlighted in the Primary Word List 90 and played back through the speakers of the computer or a headset worn by the user. The word associated with the last Playback Icon 86 that was single-clicked on, gets shifted to the left margin of the Correction Box Writing Window 96. In addition, word associated with the last Playback Icon 86 that was single-clicked on, is selected in the Primary Word List 90 and a list of alternative words that is associated with the selected word in the Primary Word List 90 is displayed in the Alternative Word List 94.

In use, where the user wishes to select a word generated by handwriting, the user would perform the following steps:

1) Activate the Correction Mode by double-clicking on an individual word or by selecting a block of text and then drawing the Correction Symbol starting from inside the Selection Window 24.
2) Single-click on the Handwriting Bit-map Icon 74 associated with the word in the Primary Word List 90 that the user wants to select.

Result: The selected word gets highlighted in the Primary Word List 90. A list of alternative words that is associated with the selected word in the Primary Word List 90 is displayed in the Alternative Word List 94. The word associated with the Handwriting Bit-map Icon 74 that was selected, gets shifted to the left margin of the Correction Box Writing Window 96.

In use, where the user wishes to select a word generated by keyboarding, the user would perform the following steps:

1) Activate the Correction Mode by double-clicking on an individual word or by selecting a block of text and then drawing the Correction Symbol starting from inside the Selection Window 24.
2) Single-click on the Keyboard Icon 78 associated with the word in the Primary Word List 90 that the user wants to select.

Result: The selected word gets highlighted in the Primary Word List 90. The word associated with the Keyboard Icon 78 that was selected, gets shifted to the left margin of the Correction Box Writing Window 96.

In use, where the user wishes to add a word (associated with a Handwriting Bit-map Icon 74 that is related to a Dictionary Icon with a slash through it 84) to the default User-Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the Dictionary Icon with a slash through it 84 that is related to the Handwriting Bit-map Icon 74, which is associated with the word in the Primary Word List 90 the user wants to add to the default User-Defined Handwriting Dictionary.
3) An Add word to default dictionary Dialog Box 170 pops up that prompts you with the following message: "Do you really want to add this word to the present Default Dictionary?".
4) To add the above mentioned word to the default User-Defined Handwriting Dictionary, single-click on the Add word to default dictionary OK Command Button 172 OR
5) To abort the process of adding the above mentioned word to the default User-Defined Handwriting Dictionary, single-click on the Add word to default dictionary Cancel Command Button 174.

Result: The Dialog Box is removed from the screen after the user single-clicks on either the Add word to default dictionary OK Command Button 172 or Add word to default dictionary Cancel Command Button 174. The Dictionary Icon with a slash through it 84 that was single-clicked on gets replaced with the Dictionary Icon without a slash through it 82.

In use, where the user wishes to change the default User Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the Dictionary Icon without a slash through it 82 that is associated with a Handwriting Bit-map Icon 74, to open up the User-Defined Dictionary Box 138 OR
3) Single-click on the User-Defined Word List Box Command Button 110 located in the Correction Box 66, to open up the User-Defined Word List Box 112.
4) Then single-click on the User-Defined Dictionary Box Command Button 136 located in the User-Defined Word List Box 112, to open up the User-Defined Dictionary Box 138.
5) Single-click on the filename (located in the User-Defined Dictionary Window 146) which represents the new default dictionary the user wants to select.

Result: The name of the new default dictionary the user wants to select is now displayed in the Dictionary Name text Box 142 and is highlighted in the User-Defined Dictionary Window 146. *Note* A list of all the User-Defined Dictionaries are displayed in the User-Defined Dictionary Window 146. *Note* You can use the Dictionary Box Vertical Scroll Bar 150 and/or the Dictionary Box Upper Scroll Arrow 148 or the Dictionary Box Lower Scroll Arrow 152 to display any portion of the User-Defined Dictionary List.

6) Single-click on the Set as Default Dictionary Command Button 144.

Result: The dictionary displayed in the Dictionary Name Text Box 142 and highlighted in the User-Defined Dictionary Window 146, becomes the new default dictionary. In addition, the portion of the User-Defined Dictionary Box Title Bar 140 which displays the name of the default dictionary is updated to reflect the above change.

7) User-Defined Dictionary Box 138 is closed down after user single-clicks on either the Dictionary Box OK Command Button 154 or Dictionary Box Cancel Command Button 156.

In use, where the user wishes to join two separate Handwriting Bitmaps together, the user would perform the following steps:

1) Activate the Correction Mode by double-clicking on an individual word or by selecting a block of text and then drawing the Correction Symbol starting from inside the Selection Window 24.

2) Pen down on the Handwriting Bitmap Icon 74, which will represents the first portion of the soon to be fused Handwriting Bitmap Icon 74.

3) Draw a horizontal stroke from left to right, that connects the first and last portion of the soon to be fused Handwriting Bitmap Icon 74.

4) Pen up on the Handwriting Bitmap Icon 74, which will represents the last portion of the soon to be fused Handwriting Bitmap Icon 74.

Result: The Correction Box 66 now displays the fused Handwriting Bitmap Icon 74, formed by joining the two previously separate Handwriting Bit-map Icons 74. The strokes that make up the fused Handwriting Bitmap Icon 74, are interpreted into ASCII by Handwriting Recognition Software. The resulting interpretation of the fused Handwriting Bitmap Icon 74, replaces the words originally displayed in the Primary Word List 90 that were associated with the previously separate Handwriting Bit-map Icons 74. In addition, the Alternative Word List 94 and the Correction Box Writing Window 96 are updated to reflect the resulting interpretation of the fused Handwriting Bitmap Icon 74.

In use, to separate an individual Handwriting Bitmap Icon 74 into two separate Handwriting Bitmap Icons 74, the user would perform the following steps:

1) Activate the Correction Mode by double-clicking on an individual word or by selecting a block of text and then drawing the Correction Symbol starting from inside the Selection Window 24.

2) Pen down on the individual Handwriting Bitmap Icon 74, at the point where the user wants to divide the individual Handwriting Bitmap Icon 74 into two separate Handwriting Bitmap Icons 74.

3) Draw a vertical stroke from top to bottom, at the point where the user wants to divide the individual Handwriting Bitmap Icon 74 into two separate Handwriting Bitmap Icons 74.

4) Pen up on the Handwriting Bitmap Icon 74, after you have drawn the vertical stroke.

Result: The Correction Box 66 now displays the two separate Handwriting Bitmap Icons 74, formed by splitting the originally individual Handwriting Bit-map Icon 74. The strokes that make up the two separate Handwriting Bitmap Icons 74, are interpreted by Handwriting Recognition Software into ASCII. The resulting interpretation of the two separate Handwriting Bitmap Icons 74, replaces the word originally displayed in the Primary Word List 90 that was associated with the previously individual Handwriting Bit-map Icon 74. In addition, the Alternative Word List 94 and the Correction Box Writing Window 96 are updated to reflect the resulting interpretation of the two separate Handwriting Bitmap Icons 74.

In use, to correct word(s) by using the manual keyboard, the user would perform the following steps:

1) Activate the Correction Mode by double-clicking on an individual word or by selecting a block of text and then drawing the Correction Symbol starting from inside the Selection Window 24.

2) Single-click on the Primary Word List 90 at the desired location the user wants to place the insertion point.

3) Use the manual keyboard to type in the text that will replace the text located in the Primary Word List 90, starting from the location of the insertion point.

Result: The Primary Word List 90 and the Correction Box Writing Window 96 are updated to reflect the text that was typed in by the user.

In use, to correct word(s) by using the Pop-up Keyboard Dialog Box 176, the user would perform the following steps:

1) Activate the Correction Mode by double-clicking on an individual word or by selecting a block of text and then drawing the Correction Symbol starting from inside the Selection Window 24.

2) Single-click on the Primary Word List 90 at the desired location the user wants to place the insertion point.

3) To display the Pop-up Keyboard Dialog Box 176, single-click on the Pop-up Keyboard Icon 92 or the Pop-up Keyboard Command Button 88.

4) Single-click on the virtual keys of the Pop-up Keyboard Dialog Box 176, to replace the text located in the Primary Word List 90, starting from the location of the insertion point.

5) Then single-click on the Pop-Up Keyboard OK Command Button 178 of the Pop-up Keyboard Dialog Box 176.

Result: The Primary Word List 90 and the Correction Box Writing Window 96 are updated to reflect the text that was typed in. OR 6) Single-click on the Pop-Up Keyboard Cancel Command Button 180 of the Pop-up Keyboard Dialog Box 176.

Result: The Primary Word List 90 and the Correction Box writing Window 96 are not updated to reflect the text that was typed in.

In use, to select a word from the Alternative Word List 94, the user would perform the following steps:

1) Activate the Correction Mode by double-clicking on an individual word or by selecting a block of text and then drawing the Correction Symbol starting from inside the Selection Window 24.

2) Single-Click on the word in the Alternative Word List 94 the user wants to select.

Result: The Primary Word List 90 and the Correction Box Writing Window 96 are updated to reflect the newly selected word from the Alternative Word List 94. *Note* Double-clicking on a word in the Alternative Word List 94 is equivalent to selecting a word by single-clicking on it and then single-clicking on the Correction Box OK Command Button 106.

In use, to correct a word by cursively writing and/or printing on the Correction Box Writing Window 96, the user would perform the following steps:

1) Activate the Correction Mode by double-clicking on an individual word or by selecting a block of text and then drawing the Correction Symbol starting from inside the Selection Window 24.
2) Cursively write and/or print the correct character(s) and/or word(s) over the incorrect character(s) and/or word(s) located in the Correction Box Writing Window 96.

Result: After a handwriting time-out occurs, the ordered set of strokes (displayed on the Correction Box Writing Window 96 as Electronic Ink) are interpreted by Handwriting Recognition Software into ASCII. The contents of the Correction Box Writing Cell 98 closest to the pen down position of the first stroke written, is replaced with the ASCII interpretation of the first character of the first word interpreted by Handwriting Recognition Software. The content of the next several consecutive Writing Cells are replaced by the remaining ASCII character(s) interpreted by Handwriting Recognition Software. In addition, the Primary Word List 90 and the Correction Box Writing Window 96 are updated.

In use, to insert a space to the right of a character in the Correction Box Writing Window 96, the user would perform the following steps:

1) Activate the Correction Mode by double-clicking on an individual word or by selecting a block of text and then drawing the Correction Symbol starting from inside the Selection Window 24.
2) To insert a space character to the right of a given character located in a given Correction Box Writing Cell 98, simply single-click the right portion of the Correction Box Writing Cell 98.

Result: A space gets inserted to the right of the Correction Box Writing Cell 98 that was single-clicked on. In addition, the Primary Word List 90 and the Correction Box Writing Window 96 get updated to reflect the inserted space.

In use, to insert a space to the left of a character in the Correction Box Writing Window 96, the user would perform the following steps:

1) Activate the Correction Mode by double-clicking on an individual word or by selecting a block of text and then drawing the Correction Symbol starting from inside the Selection Window 24.
2) To insert a space character to the left of a given character located in a given Correction Box Writing Cell 98, simply single-click the left portion of the Correction Box Writing Cell 98.

Result: A space gets inserted to the left of the Correction Box Writing Cell 98 that was single-clicked on. In addition, the Primary Word List 90 and the Correction Box Writing Window 96 get updated to reflect the inserted space.

In use, to change the case of an individual letter in the Correction Box Writing Window 96, the user would perform the following steps:

1) Activate the Correction Mode by double-clicking on an individual word or by selecting a block of text and then drawing the Correction Symbol starting from inside the Selection Window 24.
2) Pen down on the Correction Box Writing Cell 98 that contains the letter whose case the user wants to change (ie: from lower-case to upper-case or vice-versa).
3) Draw the Case-1 symbol (ie: a vertical line drawn from bottom to top).

Result: The case of letter (located in the Correction Box Writing Cell 98 that was penned down upon in step number two) will be shifted from lower-case to upper-case or from upper-case to lower-case. The Primary Word List 90 and the Correction Box Writing Window 96 will be updated to reflect the shift in the case of the above letter.

In use, to change the case of one or more letter(s) in the Correction Box Writing Window 96, the user would perform the following steps:

1) Activate the Correction Mode by double-clicking on an individual word or by selecting a block of text and then drawing the Correction Symbol starting from inside the Selection Window 24.
2) Pen down on the Correction Box Writing Cell 98 that contains the first letter whose case the user wants to change (ie: from lower-case to upper-case or vice-versa).
3) Draw the Case-2 symbol (ie: an individual stroke composed of a horizontal line drawn from left to right, followed by a vertical line drawn from bottom to top), where the (Xstart,Ystart) and (Xend,Ystart) coordinates of the horizontal component of the Case-2 symbol, define the letter(s) whose case will be changed.

Result: The case of letter(s) defined by the (Xstart,Ystart) and (Xend,Ystart) coordinates of the horizontal component of the Case-2 symbol will be shifted from lower-case to upper-case or from upper-case to lower-case. The Primary Word List 90 and the Correction Box Writing Window 96 will be updated to reflect the shift in the case of the above letter(s).

In use, to delete one character from the Correction Box Writing Window 96, the user would perform the following steps:

1) Activate the Correction Mode by double-clicking on an individual word or by selecting a block of text and then drawing the Correction Symbol starting from inside the Selection Window 24.
2) Pen down on the Correction Box Writing Cell 98 that contains the character the user wants to delete.
3) Draw the backspace symbol (ie: a horizontal line drawn from right to left).

Result: The character (located in the Correction Box Writing Cell 98 that was penned down upon in step number two) will be deleted. In addition, the Primary Word List 90 and the Correction Box Writing Window 96 will be updated to reflect the deleted character.

In use, to undo the last procedure you executed in the Correction Box Writing Window 96, the user would perform the following steps:

1) Activate the Correction Mode by double-clicking on an individual word or by selecting a block of text and then drawing the Correction Symbol starting from inside the Selection Window 24.
2) Draw the Undo Symbol (ie: an individual stroke composed of vertical line drawn from bottom to top, followed by drawing another vertical line from top to bottom, which re-traces the initial vertical line drawn).

Result: The last procedure executed in the Correction Box Writing Window 96 will be undone (eg: if a user deleted a character using a backspace symbol, the deleted character will be re-inserted). In addition, the Primary Word List 90 and/or the Alternative Word List 94 and/or Handwriting Bitmap Icon(s) 74 and/or Speech Icon(s) 76 and/or Keyboard Icon(s) 78 and/or the Correction Box Writing Window 96 will be updated to reflect the prior state of the Correction Box 66.

In use, to add a word to the default User-Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the User-Defined Word List Box Command Button 110 located in the Correction Box 66, to open up the User-Defined Word List Box 112.
3) Single-click on the Clear Writing Window Command Button 124 located in the User-Defined Word List Box 112.

Result: The content of each Word List Writing Cell 127 located in the Word List Writing Window 125 is replaced with a blank space character.

4) Write or Print the word the user wants to add to the default User-Defined Handwriting Dictionary within the Word List Writing Window 125.

Result: After a handwriting time-out occurs, the printing and/or cursive writing is interpreted by Handwriting Recognition Software into ASCII and inserted (as described previously) into the Word List Writing Window 125.

5) Single-Click on the Add this word to the dictionary Command Button 126.

Result: The newly added word is displayed in the Word List Writing Window 125, along with several other words in alphabetical order.

6) User-Defined Word List Box 112 is closed down after user single-clicks on either the Word List OK Command Button 132 or Word List Cancel Command Button 134. *Note* You can use the Word List Vertical Scroll Bar 120 and/or the Word List Upper Scroll Arrow 118 and/or the Word List Lower Scroll Arrow 122 to display any portion of the User-Defined Word List Window 116.

In use, to delete a word from the default User-Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the User-Defined Word List Box Command Button 110 located in the Correction Box 66, to open up the User-Defined Word List Box 112.
3) Single-click on the word the user wants to delete, that is located in the User-Defined Word List Window 116. *Note* You can use the Word List Vertical Scroll Bar 120 and/or the Word List Upper Scroll Arrow 118 and/or the Word List Lower Scroll Arrow 122 to display any portion of the User-Defined Word List Window 116.

Result: The word that was single-clicked on is highlighted in the User-Defined Word List Window 116 and is displayed in the Word List Writing Window 125.

4) Single-Click on the Delete this word from the dictionary Command Button 128.

Result: The newly deleted word is no longer displayed in the User-Defined Word List Window 116. In addition, the word that was originally displayed above the newly deleted word, is now highlighted in the User-Defined Word List Window 116 and is displayed in the Word List Writing Window 125.

5) User-Defined Word List box 112 is closed down after the user single-clicks on either the Word List OK Command Button 132 or Word List Cancel Command Button 134.

In use, to modify a word in the default User-Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the User-Defined Word List Box Command Button 110 located in the Correction Box 66, to open up the User-Defined Word List Box 112.
3) Single-click on the word the user wants to modify, that is located in the User-Defined Word List Window 116. *Note* You can use the Word List Vertical Scroll Bar 120 and/or the Word List Upper Scroll Arrow 118 and/or the Word List Lower Scroll Arrow 122 to display any portion of the User-Defined Word List Window 116.

Result: The word that was single-clicked on is highlighted in the User-Defined Word List Window 116 and is displayed in the Word List Writing Window 125.

4) Write or Print over parts of the character(s) and/or word(s) located in the Word List Writing Window 125 that the user wants to modify.

Result: After a handwriting time-out occurs, the printing and/or cursive writing is interpreted by Handwriting Recognition Software into ASCII and inserted (as described previously) into the Word List Writing Window 125. *Note* In addition, you can single-click on the Word List Writing Window 125 to insert a space to the left or right of a character and you can also use the Case-1, Case-2, Undo, and Backspace Edit Symbols to modify one or more character(s) and/or word(s) in the Word List Writing Window 125.

5) Single-Click on the Modify this word in the dictionary Command Button 130.

Result: The newly modified word is now highlighted in the User-Defined Word List Window 116 and is displayed in the Word List Writing Window 125.

6) User-Defined Word List Box 112 is closed down after the user single-clicks on either the Word List OK Command Button 132 or Word List Cancel Command Button 134.

In use, to save a new Default User-Defined Handwriting Dictionary, the user would perform the following steps:

1) Activate the Correction Mode by double-clicking on an individual word or by selecting a block of text and then drawing the Correction Symbol starting from inside the Selection Window 24.
2) Single-click on the User-Defined Word List Box Command Button 110 located in the Correction Box 66, to open up the User-Defined Word List Box 112.
3) Then single-click on the User-Defined Dictionary Box Command Button 136 located in the User-Defined Word List Box 112, to open up the User-Defined Dictionary Box 138.
4) Pen down at the location which represents the starting point of the dictionary name that is presently displayed in the Dictionary Name Text Box 142.
5) Maintain the present pen down coordinate within an absolute distance of the initial pen down coordinate (otherwise the movement of the tip of the Electronic Pen will be interpreted as a stroke), until the shape of the pointer changes from a pen to an arrow (indicating the Selection Mode has been activated).
6) After the Selection Mode has been activated, drag the tip of the Electronic Pen to the location which represents the end point of the dictionary name that is presently displayed in the Dictionary Name Text Box 142.

Result: The dictionary name that is presently displayed in the Dictionary Name Text Box 142 is highlighted.

8) Pen up from the surface of the Digitizer.

9) Write and/or print the replacement dictionary name.

Result: After a handwriting time-out occurs, the writing and/or printing is interpreted by the Handwriting Recognition Software into ASCII, which is used to replace the highlighted dictionary name that is presently displayed in the Dictionary Name Text Box 142.

10) Single-Click on the Save Dictionary Command Button 158 located in the User-Defined Dictionary Box 138.

Result: The name of the newly saved dictionary is displayed in the Dictionary Name Text Box 142 and is highlighted in the User-Defined Dictionary Window 146.

11) User-Defined Dictionary Box 138 is closed down after user single-clicks on either the Dictionary Box OK Command Button 154 or Dictionary Box Cancel Command Button 156.

12) User-Defined Word List Box 112 is closed down after user single-clicks on either the Word List OK Command Button 132 or Word List Cancel Command Button 134.

In use, to delete a default User-Defined Handwriting Dictionary, the user would perform the following steps:

1) Activate the Correction Mode by double-clicking on an individual word or by selecting a block of text and then drawing the Correction Symbol starting from inside the Selection Window 24.

2) Single-click on the User-Defined Word List Box Command Button 110 located in the Correction Box 66, to open up the User-Defined Word List Box 112.

3) Then single-click on the User-Defined Dictionary Box Command Button 136 located in the User-Defined Word List Box 112, to open up the User-Defined Dictionary Box 138.

4) Single-click on the name of the dictionary located in the User-Defined Dictionary Window 146 that the user wants to delete. *Note* You can use the Dictionary Box Vertical Scroll Bar 150 and/or the Dictionary Box Upper Scroll Arrow 148 and/or Dictionary Box Lower Scroll Arrow 152 to display any portion of the User-Defined Dictionary Window 146.

Result: The word that was single-clicked on is displayed in the Dictionary Name Text Box 142 and is highlighted in the User-Defined Dictionary Window 146.

5) Single-click on the Delete Dictionary Command Button 160.

Result: The newly deleted User-Defined Dictionary is no longer displayed in the User-Defined Dictionary Window 146. In addition, the User-Defined Dictionary that was originally displayed above the newly deleted User-Defined Dictionary, is now highlighted in the User-Defined Dictionary Window 146 and is displayed in the Dictionary Name Text Box 142.

6) User-Defined Dictionary Box 138 is closed down after user single-clicks on either the Dictionary Box OK Command Button 154 or Dictionary Box Cancel Command Button 156.

7) User-Defined Word List Box 112 is closed down after user single-clicks on either the Word List OK Command Button 132 or Word List Cancel Command Button 134.

When a user uses the Correction Box 66 to correct one or more words originally created by dictation, the speech profile associated with the corrected word(s) must be updated or added to the Default Active Vocabulary, if the user wants to improve future speech recognition accuracy.

Speech Profile: A set of stored attributes (ie: pitch, frequency, word probability, etc . . . ) associated with a given word, that allows speech recognition software to analyse segments of speech, in order to determine what was dictated by the user.

Default Active Vocabulary: Defines a set of words along with their associated speech profiles that can be recognized in a given context by speech recognition software.

Backup Dictionary: Contains additional words along with their associated speech profiles, that are not part of the Active Vocabulary.

Three distinct methods that are used to update or add speech profiles to the Default Active Vocabulary are described below.

The user may update the speech profile of a word found in the Active Vocabulary by the following:

IF "The resulting corrected word was found in the Default Active Vocabulary" THEN "An Update speech profile Dialog Box 182 is displayed: Which asks the user if they want to update the speech profile of the word (found in the Default Active Vocabulary) that was corrected"

IF "The user single-clicks on the Update speech profile OK Command Button 184" THEN "The speech profile of the corrected word (found in the Default Active Vocabulary) is updated."

ELSE

IF "The user single-clicks on the Update speech profile Cancel Command Button 186" THEN "The speech profile of the corrected word (found in the Default Active Vocabulary) is not updated."

ENDIF

ENDIF

ENDIF

Alternatively the user may add a word found in the Backup Dictionary to the Active Vocabulary by the following:

IF "The resulting corrected word was found in the Back-up Dictionary" THEN "An Add word to active vocabulary Dialog Box 188 is displayed: Which asks the user if they want to add the corrected word (found in the Back-up Dictionary) to the Default Active Vocabulary"

IF "The user single-clicks on the Add word to active vocabulary OK Command Button 190" THEN "The corrected word (found in the Back-up Dictionary) is added to the Default Active Vocabulary"

ELSE

IF "The user single-clicks on the Add word to active vocabulary Cancel Command Button 192" THEN "Then the corrected word (found in the Back-up Dictionary) is not added to the Default Active Vocabulary"

ENDIF

ENDIF

ENDIF

As a further alternative, the user may train a new word and add it to the Default Active Vocabulary by the following:

IF "The resulting corrected word is not found in either the Active Vocabulary or the Back-up Dictionary" THEN "A Train and add word to active vocabulary Dialog Box 194 is displayed: Which asks the user if they want to train the corrected word and add it to the Default Active Vocabulary"

IF "The user single-clicks on the Train and add word to active vocabulary OK Command Button 196" THEN "The training utility associated with the speech recognition software is activated, after which a user can train and add the corrected word (not found in either the Active Vocabulary or the Back-up Dictionary) to the Default Active Vocabulary"

ELSE

IF "The user single-clicks on the Train and add word to active vocabulary Cancel Command Button 198" THEN "The training utility associated with the speech recognition software is not activated"

ENDIF

ENDIF

ENDIF

Referring to FIGS. 21a–21u, 22 and 23 the flow diagrams show the detailed logic of the pen based edit correction interface method of the present invention. To fully understand the flow diagrams some terminology used in the flow diagrams needs to be defined. Following is a list of some terms used in the flow diagrams.

Sel-Timer (ie: Selection time-out=a)—A timer which records the interval of time which must elapse after a pen down event occurs, while maintaining the present pen down coordinate within an absolute pre-selected distance of the initial pen down coordinate, until the pointer changes from a pen to an arrow to indicate that selection mode has been activated, P-Timer (le: Punctuation time-out=b)—After each stroke is completed (ie: the user pens up after drawing the stroke) the P-Timer is activated: IF "a pre-set interval of time elapses before the user pens-down to draw the next stroke"; THEN "all ordered set of strokes (displayed on the computer screen as Electronic Ink) are recognized as Punctuation Symbols, the P-Timer is de-activated and reset back to zero and all Electronic Ink along with the Punctuation Window 14 is erased from the computer screen"; ELSE "P-Timer is de-activated and reset back to zero and all Electronic Ink along with the Punctuation Window 14 continues to be displayed on the computer screen".

HW-Timer (ie: Handwriting timeout=c)—After each stroke is completed (ie: the user pens up after drawing the stroke) a HW-Timer is activated: IF "a pre-set interval of time elapses before the user pens-down to draw the next stroke"; THEN "all ordered set of strokes (displayed on the computer screen as Electronic Ink) are recognized by handwriting recognition software as ASCII, the HW-Timer is de-activated and reset back to zero and all Electronic Ink is erased from the computer screen" ELSE "the HW-Timer is de-activated and reset back to zero and all Electronic Ink continues to be displayed on the computer screen".

DC-Timer (ie: Double-click mode time-out=d)—A Timer which records the maximum interval of time which can elapse, between the pen up of the first single-click and the pen down of the second single-click of two consecutive single-clicks, while the absolute distance (ie: DC-Tol) between the (X,Y) pen up coordinate of the first single click and the initial pen down coordinate of the second single-click falls within a double click tolerance, in order for a double click to be initiated.

Dictation-Flag (True or False)—A variable used to indicate whether the dictation mode is activated or de-activated.

PW-Stroke-Flag (True or False)—A variable used to indicate whether the user single-clicked or draw a stroke inside the Punctuation Window 14.

DC-Tol—Absolute distance between the insertion point coordinate and the initial pen down coordinate: Note: One of the parameters used to determine if a user initiated a double-click.

$DC-Tol=SQRT((SQR(Xipd-Xipt))+(SQR(Yipd-Yipt)))$

Pointer-Tol—Absolute distance between the insertion point coordinate and the present pointer coordinate: Note: The Punctuation Window Flag (optional) will be activated, when the present pointer coordinate is within an absolute pre-selected distance (ie: Pointer-Tol) of the cursor.

$Pointer-Tol=SQRT((SQR(Xppt-Xipt))+(SQR(Yppt-Yipt)))$

PW-Tol—Absolute distance between the insertion point coordinate and the initial pen down coordinate: Note: The Punctuation Window 14 will be activated, if a user pens down within an absolute pre-selected distance of the insertion point coordinate and commits to drawing a stroke.

$PW-Tol=SQRT((SQR(Xipd-Xipt))+(SQR(Yipd-Yipt)))$

Stroke-Tol—Absolute distance between the initial pen down coordinate and the present pen down coordinate: Note: Maximum distance that the present pen down coordinate can deviate from the initial pen down coordinate, before being recognized as a stroke.

$Stroke-Tol=SQRT((SQR(Xipd-Xppd))+(SQR(Yipd-Yppd)))$

Sel-Tol—Absolute distance between the initial pen down coordinate and the pen up coordinate: Note: Used to determine, if a block of text is still selected after a user pens up.

$Sel-Tol=SQRT((SQR(Xipd=Xpu))+(SQR(Yipd-Ypu)))$

In addition, there are a number of coordinates which are also used in the flow charts. Following is a list of definitions of coordinates used in calculations:

(Xppt,Yppt)=Present pointer coordinate (Xipd,Yipd)=Initial pen down coordinate;

or (Xstart,Ystart)=Initial pen down coordinate;

(Xppd,Yppd)=Present pen down coordinate;

(Xipt,Yipt)=Insertion point coordinate;

(Xpu,Ypu)=Pen up coordinate;

or (Xend,Yend)=Pen up coordinate.

Accordingly, a series of equations can be established to determine a number of conditions regarding the pointer. For example the above definitions are used when determining if the present pointer coordinates (Xppt,Yppt) are inside or outside the Punctuation Window 14. Accordingly, the following four conditions must all be true in order for the present pointer coordinate (Xppt,Yppt) to be inside the Punctuation Window 14, IF any one of them is False, THEN (Xppt,Yppt) lies outside the Punctuation Window 14. Where "g" is half the width or height of the Punctuation Window 14.

1) Is Xppt<Xipt+g?
2) Is Xppt>Xipt−g?
3) Is Yppt<Yipt+g?
4) Is Yppt>Yipt−g?

The following four conditions must all be true in order for the initial pen down coordinate (Xipd,Yipd) to be inside the Punctuation Window 14, IF any one of them is False, THEN (Xipd,Yipd) lies outside the Punctuation Window 14. Where "g" is half the width or height of the Punctuation Window 14.

1) Is Xipd<Xipt+g?
2) Is Xipd>Xipt−g?
3) Is Yipd<Yipt+g?
4) Is Yipd>Yipt−g?

The following four conditions must all be true in order for the present pointer coordinate (Xppt,Yppt) to be inside the Selection Window 24, IF any one of them is False, THEN (Xppt,Yppt) lies outside the Selection Window 24: Where "e" is half the width or height of the Selection Window 24.

1) Is Xppt<Xpu+e?
2) Is Xppt>Xpu−e?
3) Is Yppt<Ypu+e?
4) Is Yppt>Ypu−e?

The following four conditions must all be true in order for the initial pen down coordinate (Xipd,Yipd) to be inside the Selection Window 24, IF any one of them is False, THEN (Xipd,Yipd) lies outside the Selection Window 24: Where "e" is half the width or height of the Selection Window 24.

1) Is Xipd<Xpu+e?
2) Is Xipd>Xpu−e?
3) Is Yipd<Ypu+e?
4) Is Yipd>Ypu−e?

There are a plurality of variables that are used in the different modes. Preferably a default value is set for each of these variables, but in addition the user can adjust these variables to meet their own personal needs. The following is a list of at least some of the variables that the user can adjust wherein the preferred default value is also indicated:

Handwriting time-out (default value="1.0 seconds")—Interval of time which must elapse, while a pen down event is not occurring, before handwriting drawn in the Document Window will be recognized.

Punctuation time-out (default value="1.0 seconds")—Interval of time which must elapse, while a pen down event is not occurring, before Punctuation Symbols drawn in the Punctuation Window 14 will be recognized.

Writing Window time-out (default value="1.0 seconds")—Interval of time which must elapse, while a pen down event is not occurring, before handwriting drawn in the Writing Window will be recognized.

Selection time-out (default value="0.5 seconds")—Preselected interval of time which must elapse after a pen down event occurs, while maintaining the present pen down coordinate within an absolute pre-selected distance of the initial pen down coordinate, until the pointer changes from a pen to an arrow to indicate that selection mode has been activated.

Document Window Ink Colour (default value= "Black")—Ability to adjust the colour of the Electronic Ink that is displayed while you write within the Document Window.

Punctuation Window Ink Colour (default value= "Black")—Ability to adjust the colour of the Electronic Ink that is displayed while you write within the Punctuation Window 14.

Selection Window Ink Colour (default value="Green")—Ability to adjust the colour of the Electronic Ink that is displayed while you write within the Selection Window 24.

Writing Window Ink Colour (default value="Black")—Ability to adjust the colour of the Electronic Ink that is displayed while you write within the Writing Window.

Document Window Ink Width (default value="2 pixels")—Ability to adjust the width of the Electronic Ink that is displayed on the Document Window as you write.

Punctuation Window Ink Width (default value="2 pixels")—Ability to adjust the width of the Electronic Ink that is displayed on the Punctuation Window 14 as you write.

Selection Window Ink Width (default value="2 pixels")—Ability to adjust the width of the Electronic Ink that is displayed on the Selection Window 24 as you write.

Writing Window Ink Width (default value="2 pixels")—Ability to adjust the width of the Electronic Ink that is displayed on the Writing Window as you write.

Punctuation Window Size (default height and width=100 pixels)—Ability to adjust the height and width of the Punctuation Window 14.

Selection Window Size (default height="100 pixels" and default width="120 pixels")—Ability to adjust the height and width of the Selection Window 24.

Writing Cell Size (default height=70 pixels and default width="50 pixels")—Ability to adjust the height and width of the Writing Cell.

Stroke Tolerance Value (default value="6 pixels")—Maximum distance that the present pen down coordinate can deviate from the initial pen down coordinate, before being recognized as a stroke.

Intelligent Space Insertion (default value="Yes")—Ability to determine when to insert one or more space(s), before or after handwriting is recognized.

Pop-up Keyboard (default value="Yes")—Displays a Pop-Up Keyboard Dialog Box 176, that allows a user to input text into the Primary Word List 90 by single-clicking on the virtual keys (ie: command buttons which insert individual alpha-numeric character or punctuation or perform a specific action when single-clicked on) of the Pop-Up Keyboard Dialog Box 176.

Space Interval (default value="10 pixels")—Ability to adjust the minimum distance between consecutively drawn characters which defines a space.

Writing Window Style (default value="Open Box")—Ability to adjust the style of the writing box from "Open Box" to "Closed Box".

Correction vector size (default value="5 words")—Allows the user to select the number of interpreted word(s) returned by the Handwriting Recognition Software (ie: in order of the highest to lowest confidence) that represent the best estimate of the word(s) the user wrote.

Single-tap speed (default value="less than value of the Selection Time-out")—Cannot directly adjust the default speed of the single-tap, but adjusting the default value of the Selection Time-out indirectly can adjust the single-taps minimum speed value (ie: the slowest rate a single-tap can be initiated).

Single-tap area (default value="one pixel less than the default value of the Stroke Tolerance")—A user can indirectly adjust the default area of the single-tap, by adjusting the default value of the Stroke Tolerance (eg: IF "the default value of the Stroke Tolerance=6 pixels"

THEN "the default area of the single-tap=[6 pixels–1 pixel]=5 pixels" ENDIF).

Double-tap speed (default value="0.5 seconds")—Ability to adjust the speed of a double-tap from fast to slow.

Double-tap area (default value="5 pixels")—Ability to adjust the area of double-tap from small to large.

Spell checking (default value="Enable")—Allows user to enable or disable spell checking.

Tablet Settings (default value="Non-Applicable")—Allows user the ability to adjust the IRQ, Address, etc . . . , settings.

Writing hand (default value="Right")—Left or Right writing hand.

Menu Style (default value="Right")—Left or Right menus.

Reset settings to default values (default value="Non-Applicable")—Single-click on Restore Defaults Command Button (not shown in diagrams).

Handwriting Recognition Accuracy (default value= "Balanced")—User can increase or decrease Handwriting Recognition Accuracy by using a sliding scale that moves from "Less Accurate" to "Balanced" to "More Accurate". *Note* Increasing Handwriting Recognition Accuracy, increases the interval of time required for Handwriting to be recognized. Therefore, the user must strike a balance between the desired Handwriting Recognition Accuracy and the desired interval of time required for Handwriting to be recognized.

Figure 21A:
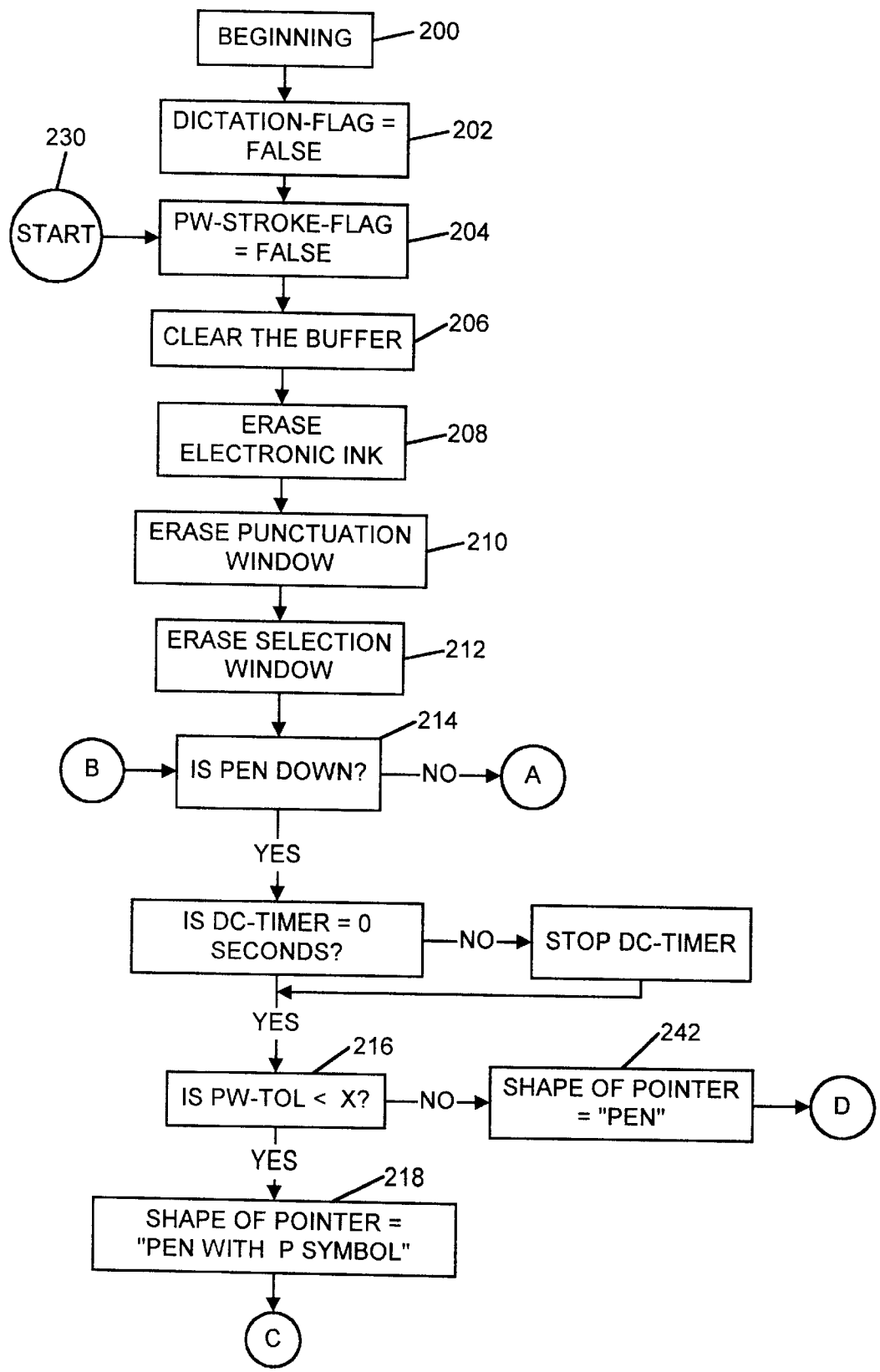
FIGS. 21a–21u are detailed flow diagrams illustrating the pen based edit correction interface method of the present invention.
Figure 21C:
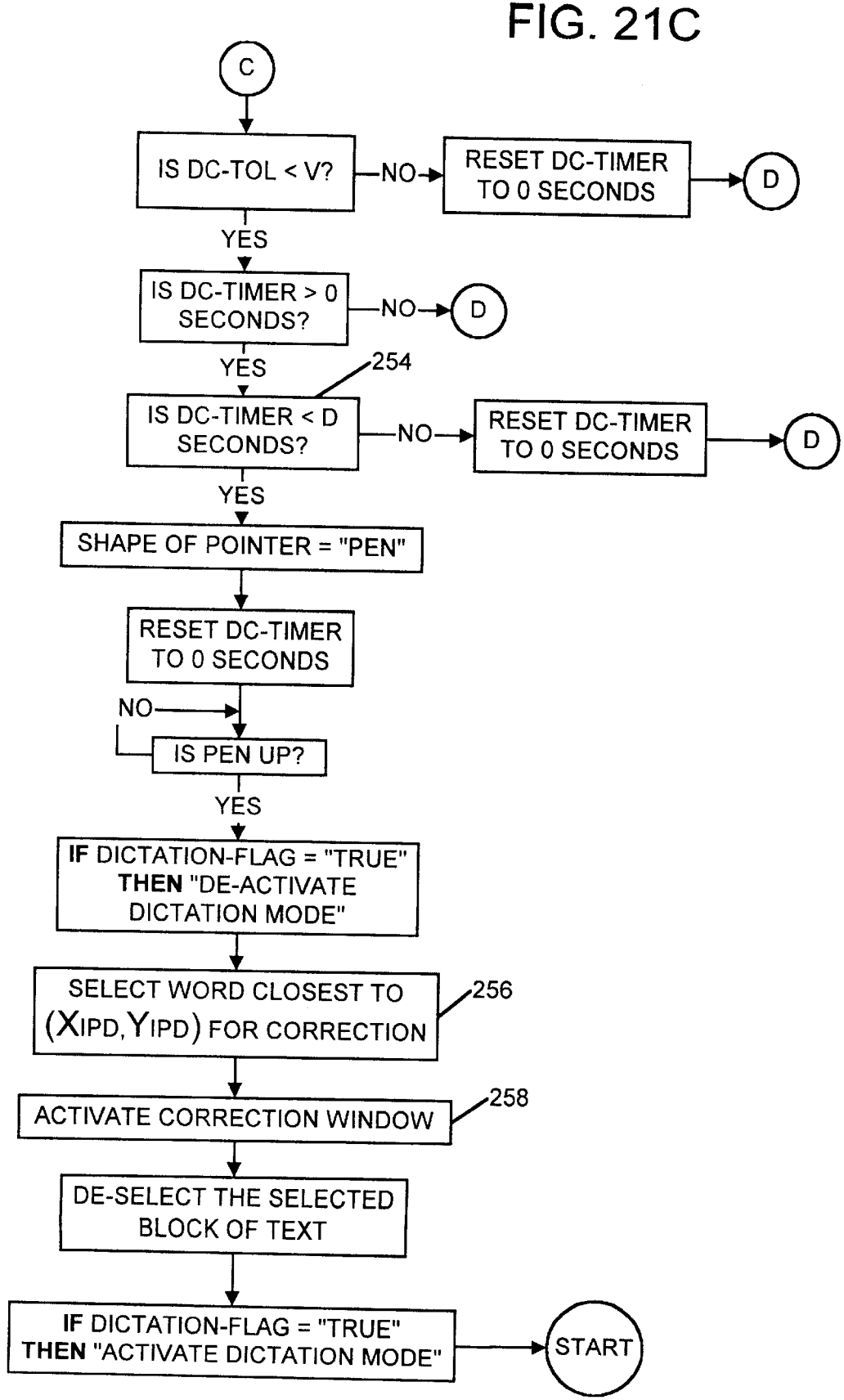
Figure 21D:
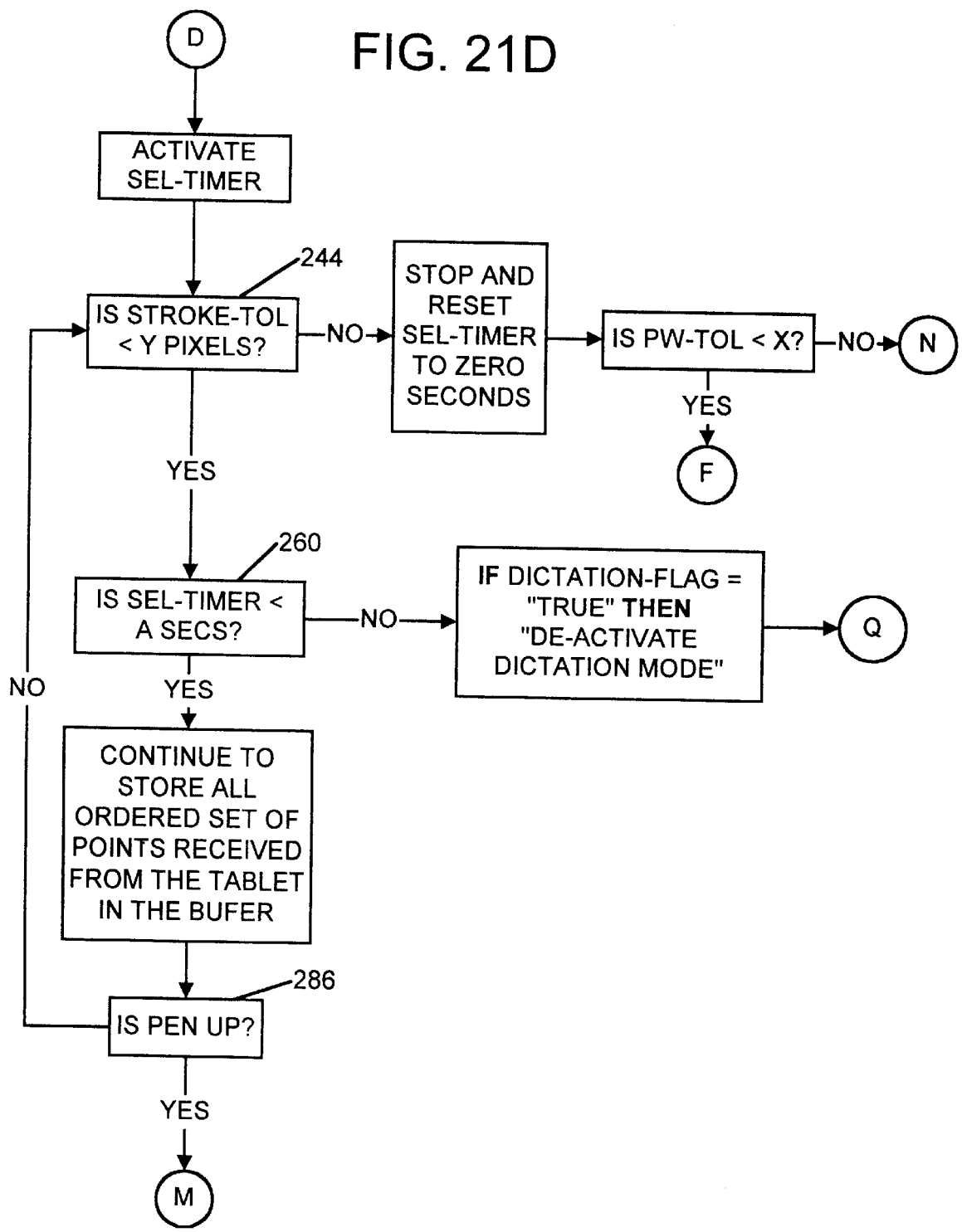
Figure 21E:
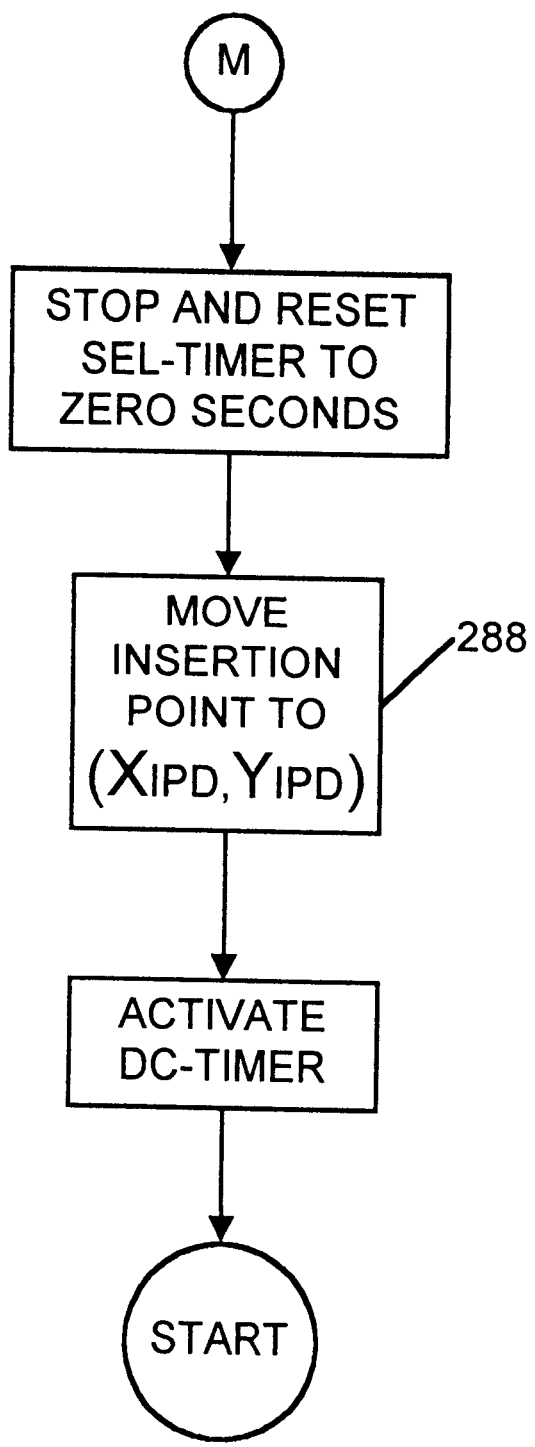
Figure 21F:
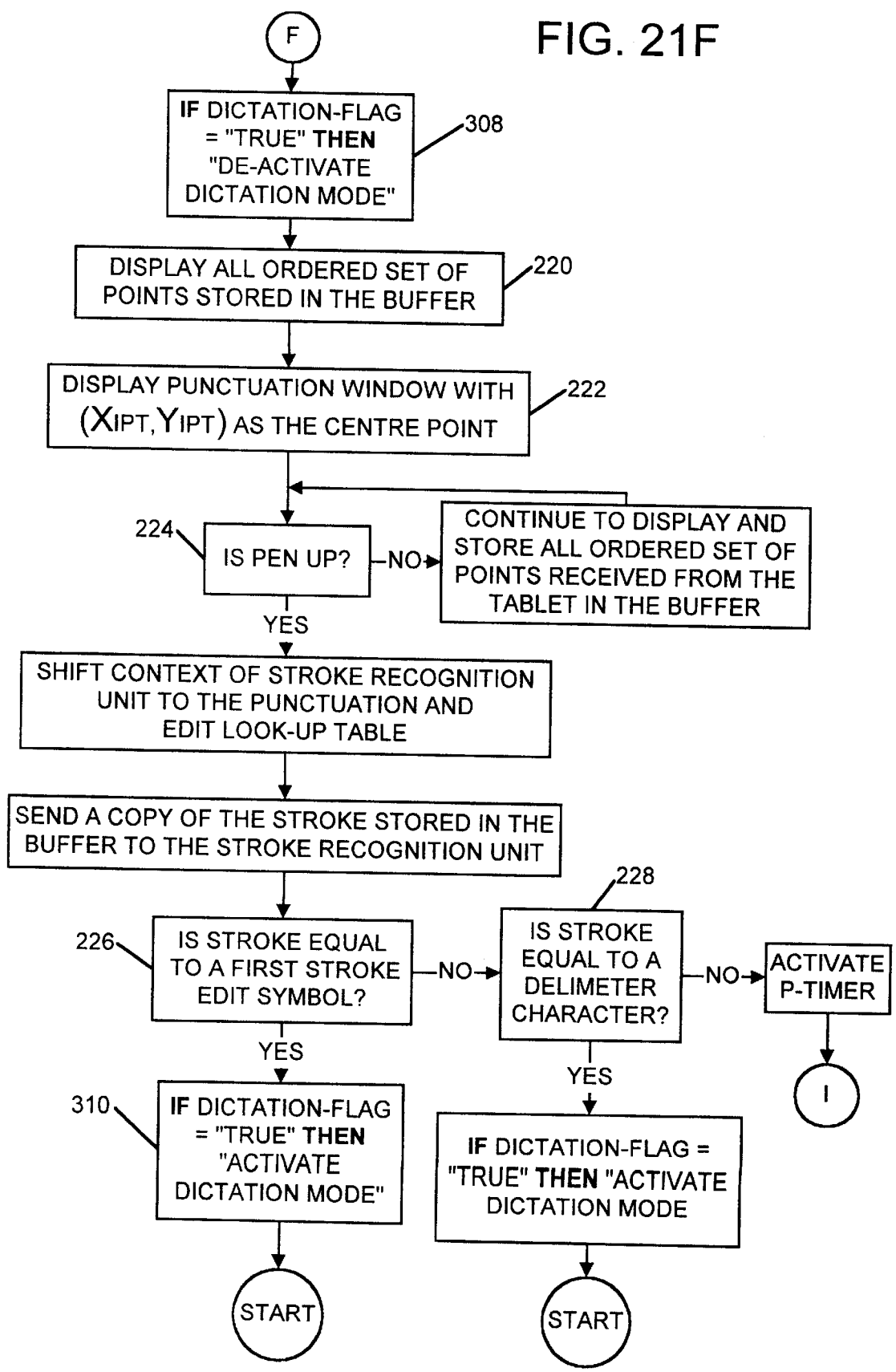
Figure 21G:
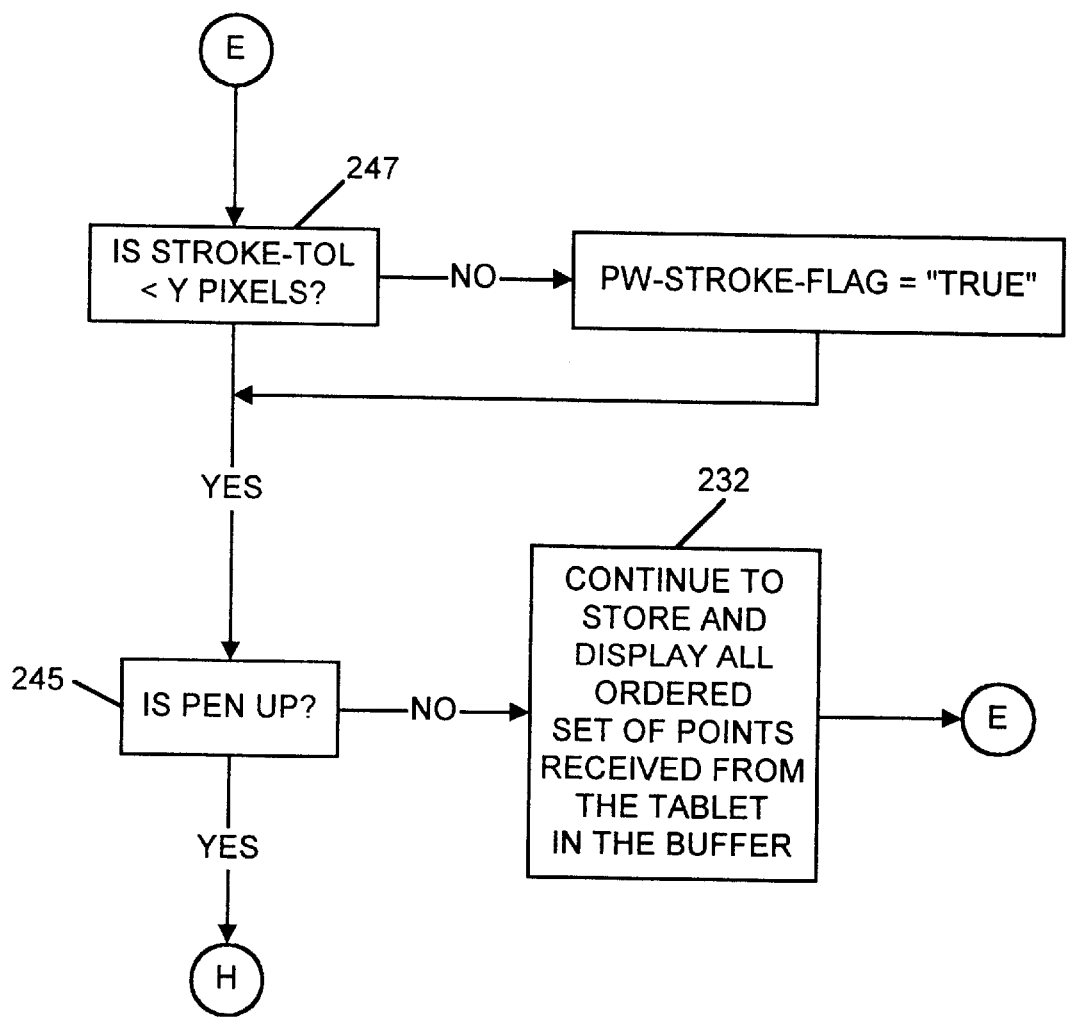
Figure 21H:
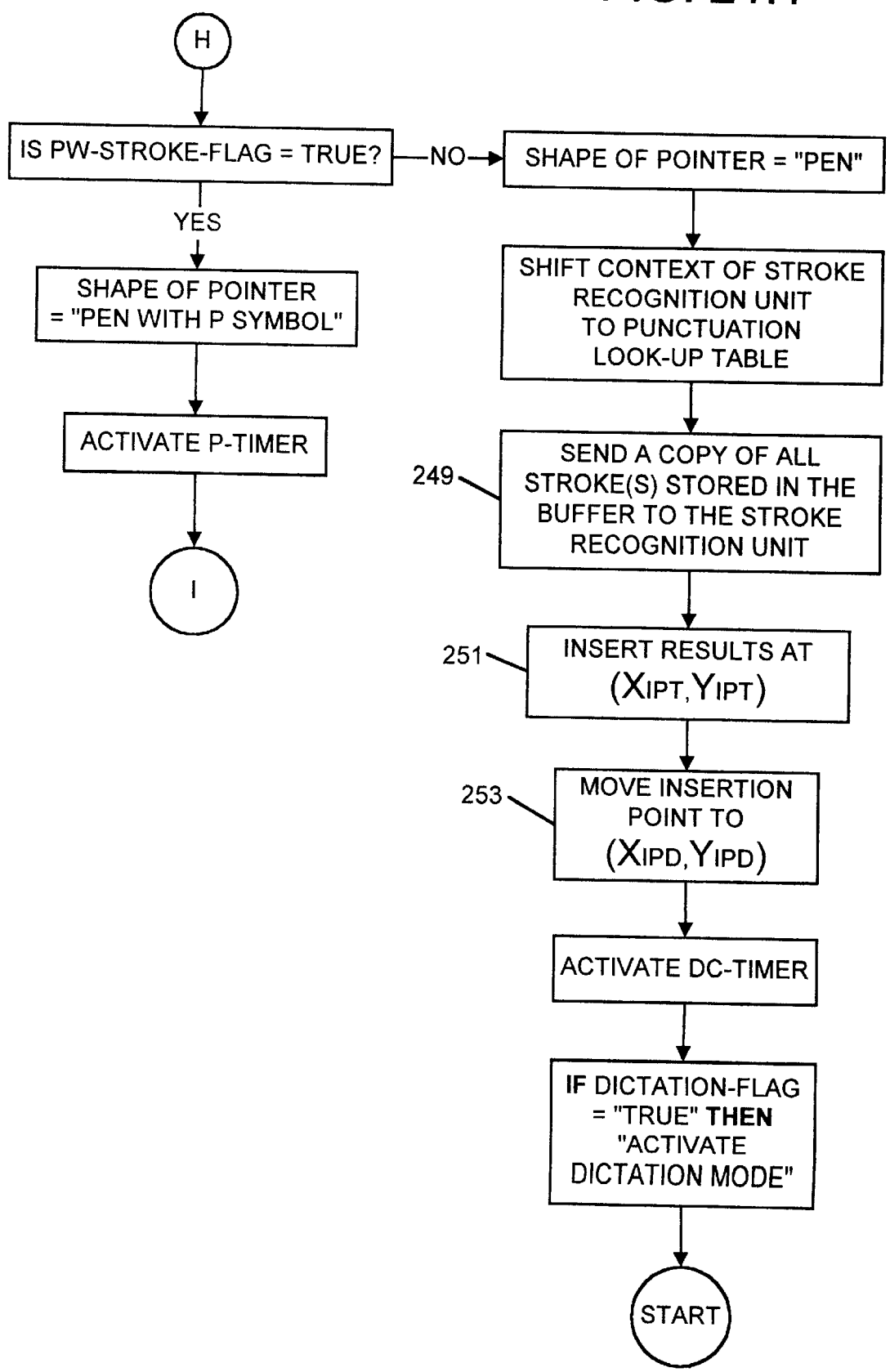
Figure 21I:
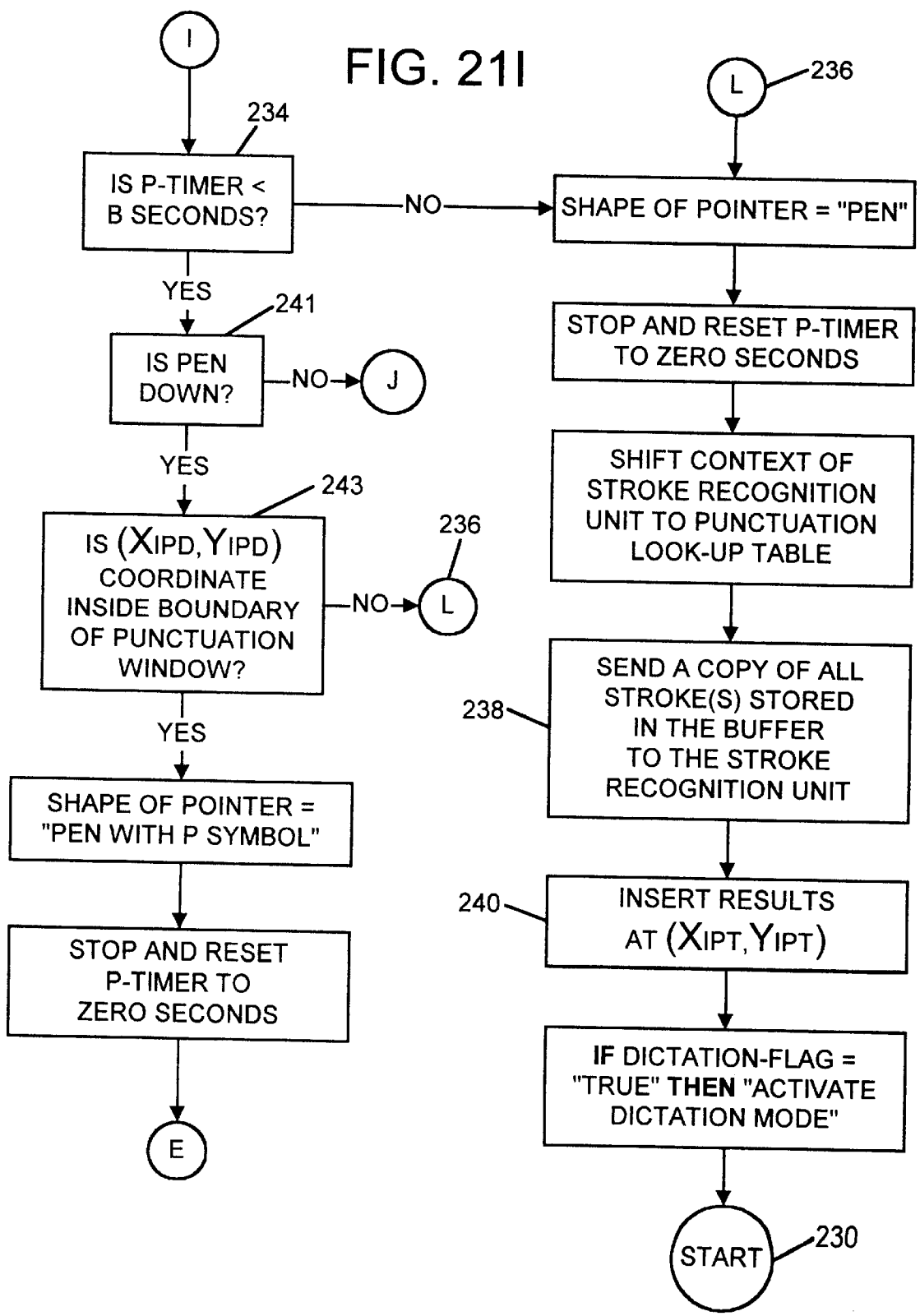
Figure 21J:
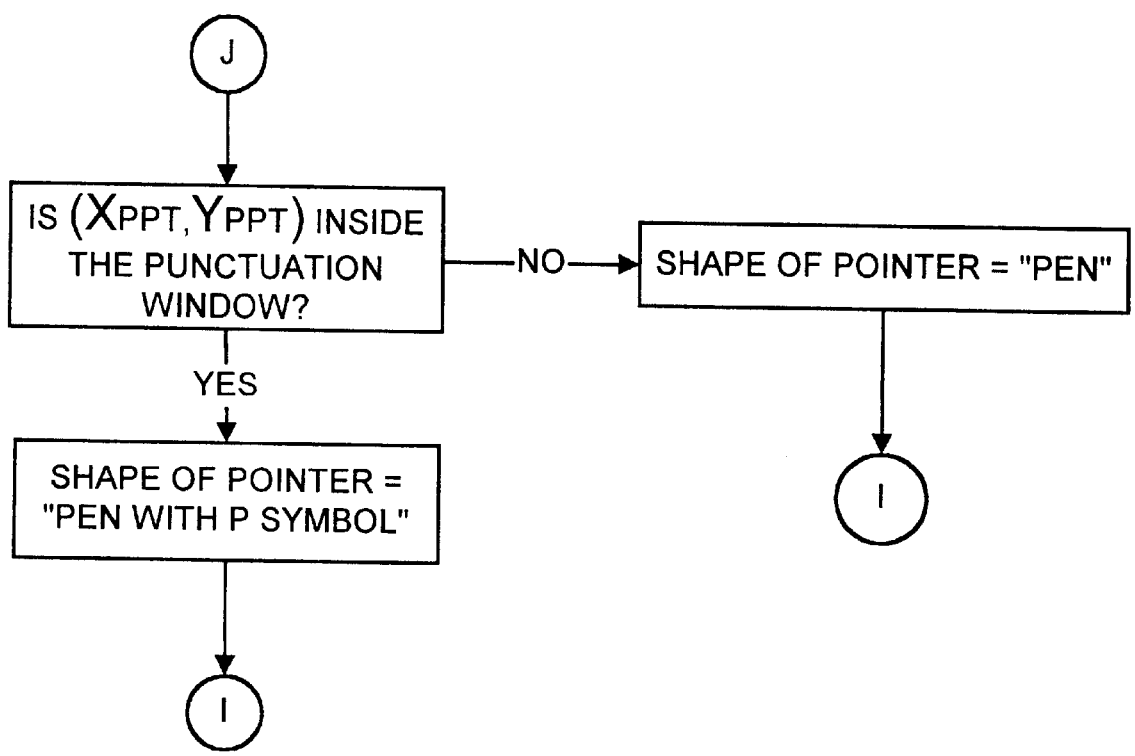
Figure 21K:
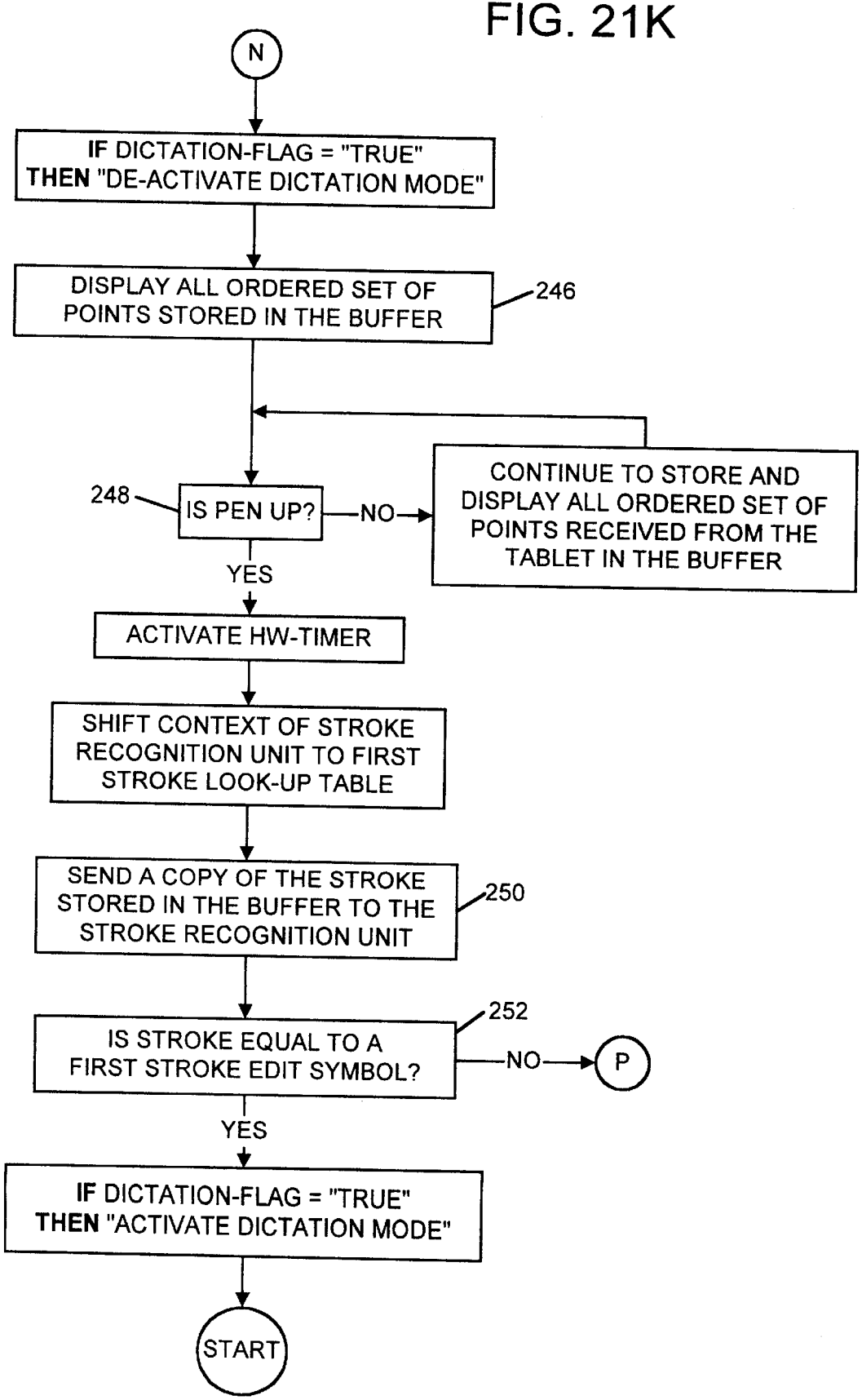
Figure 21L:
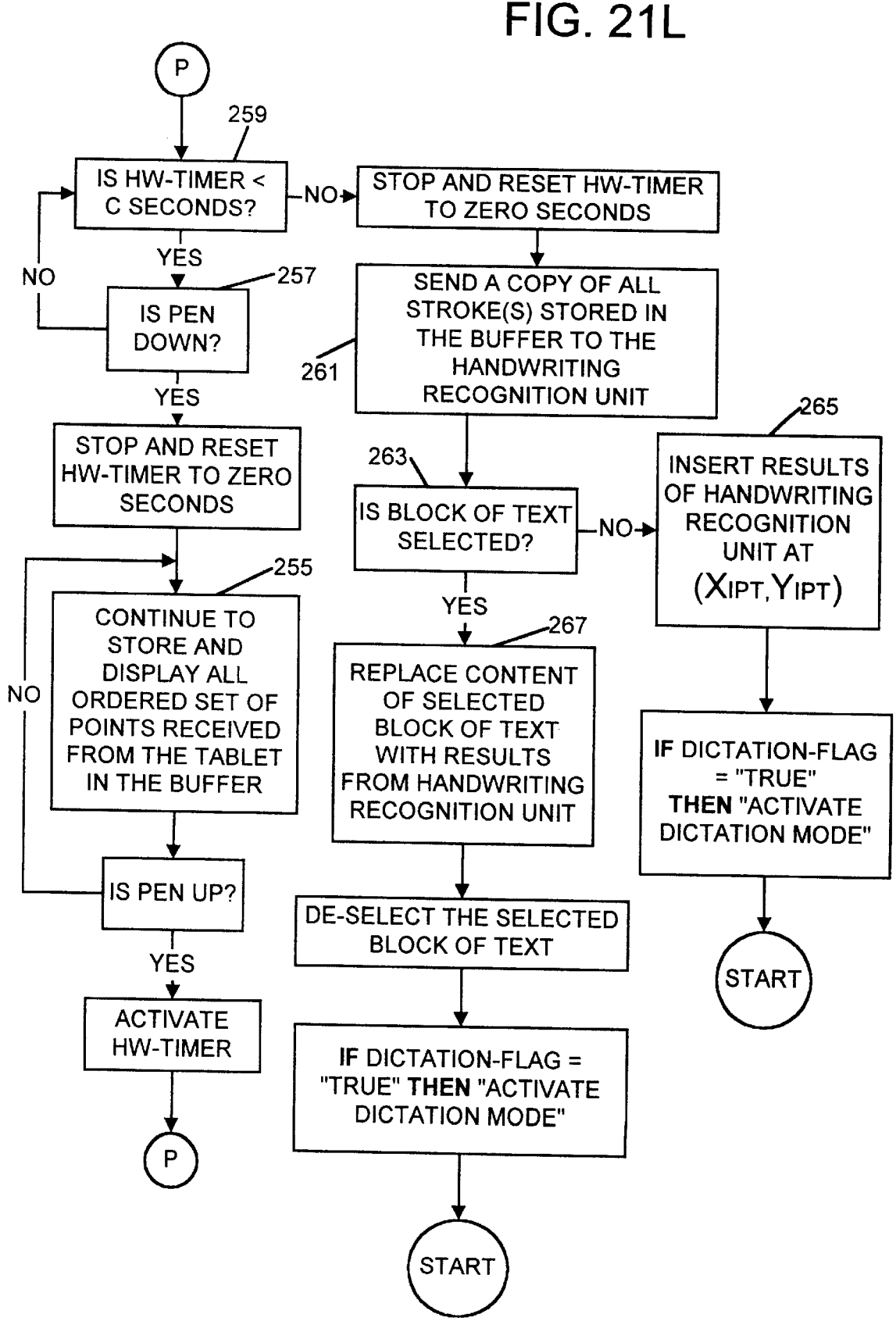
Figure 21M:
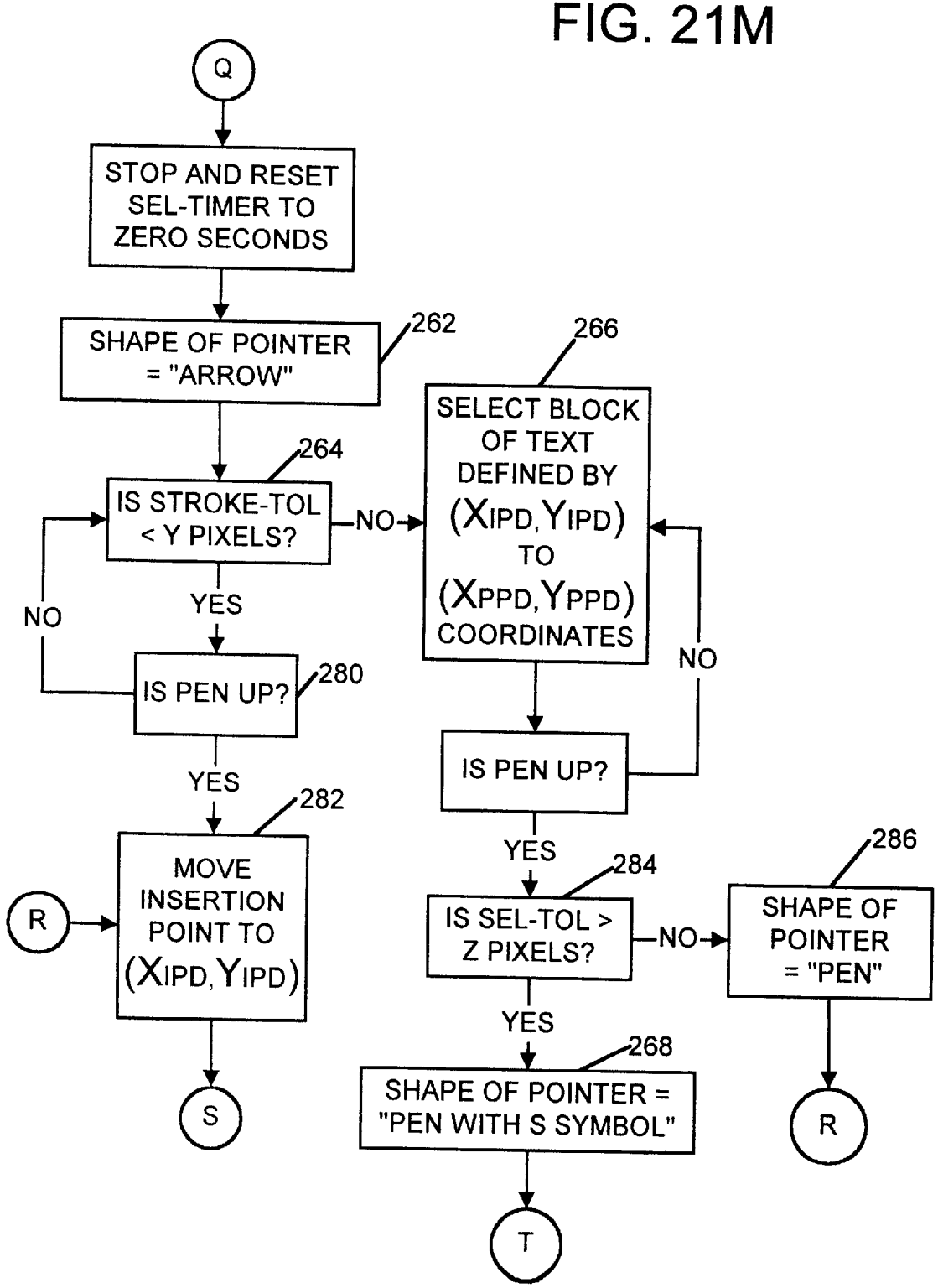
Figure 21N:
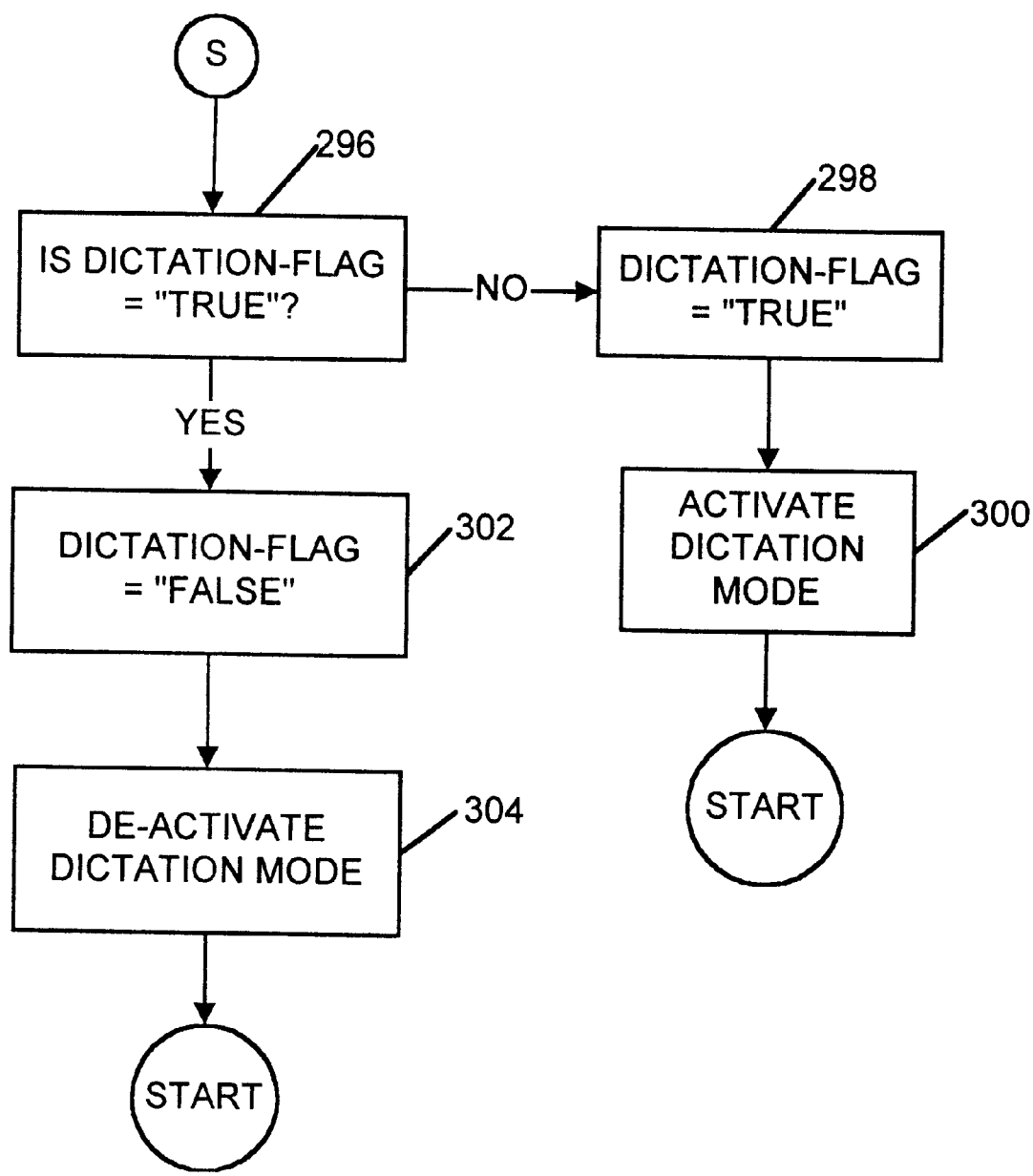
Figure 21O:
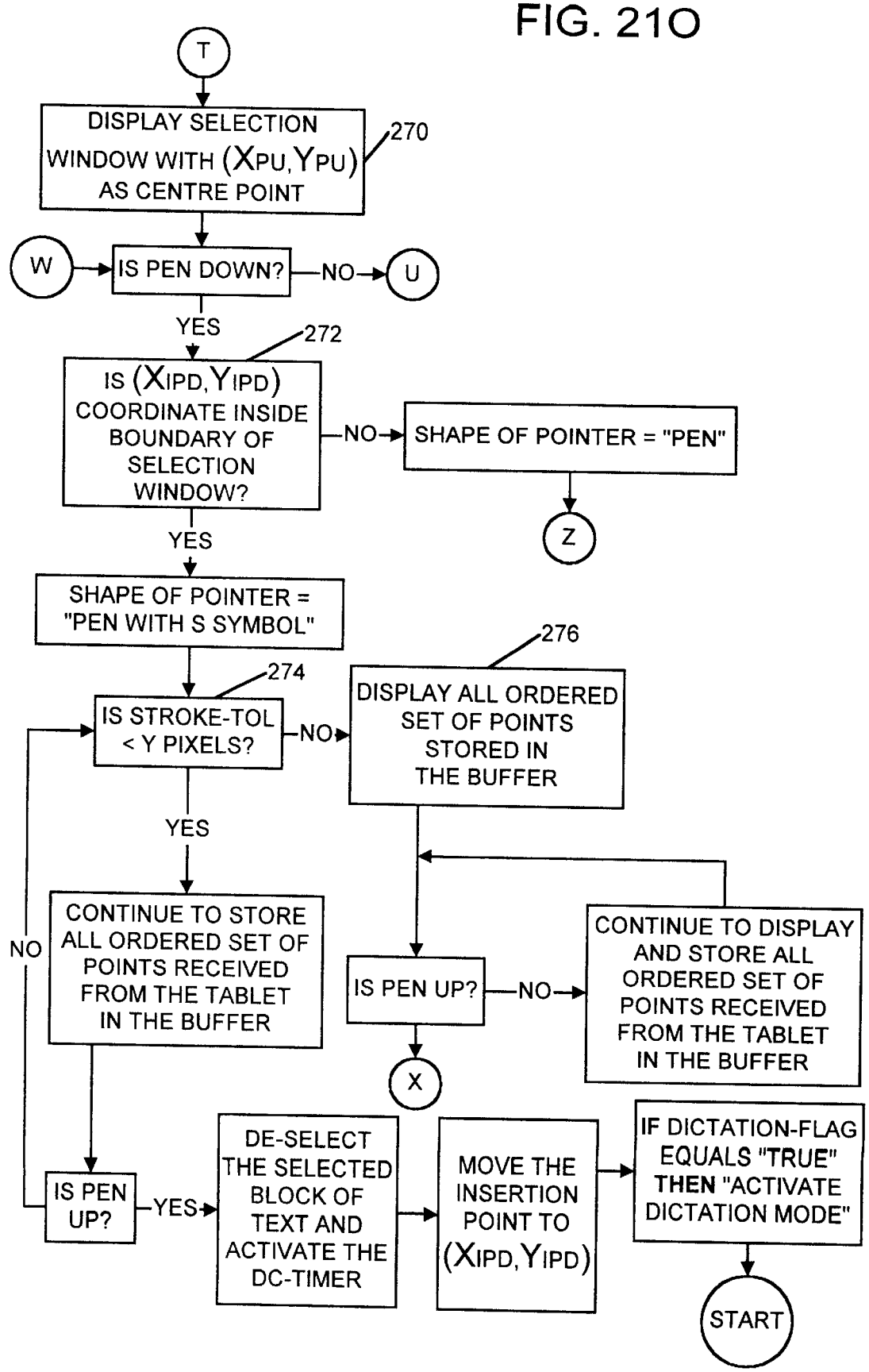
Figure 21P:
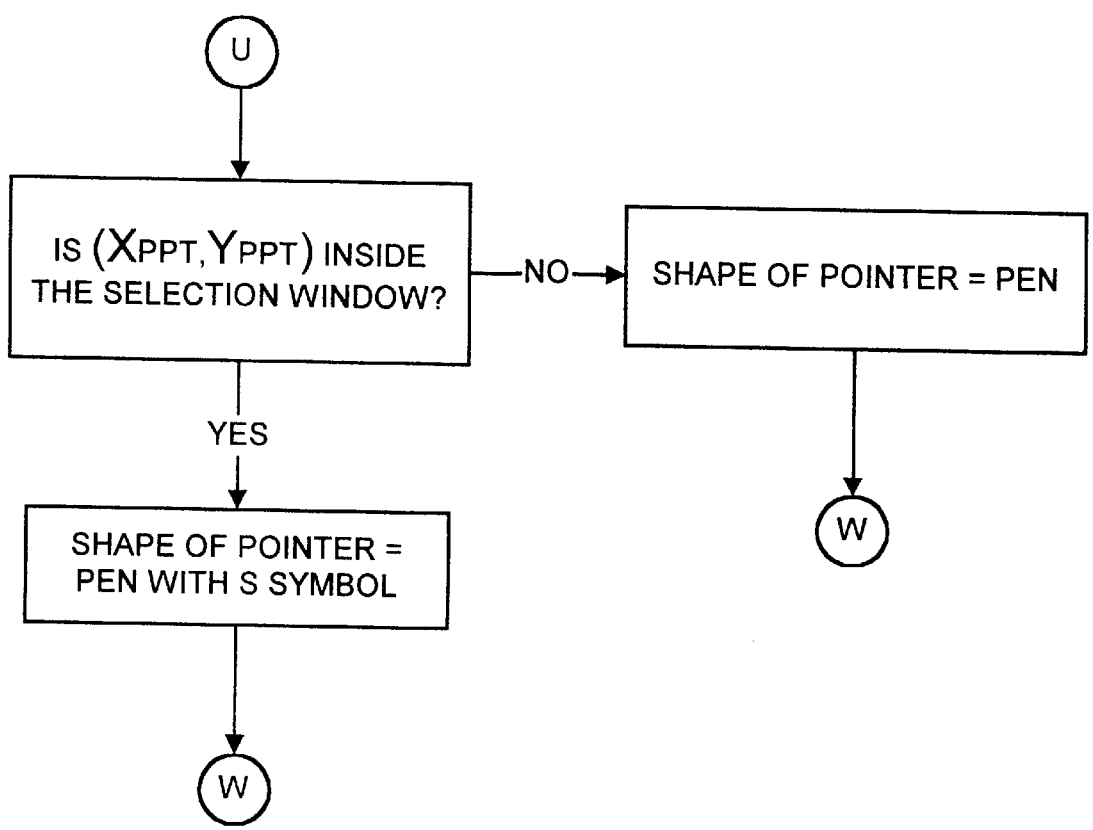
Figure 21Q:
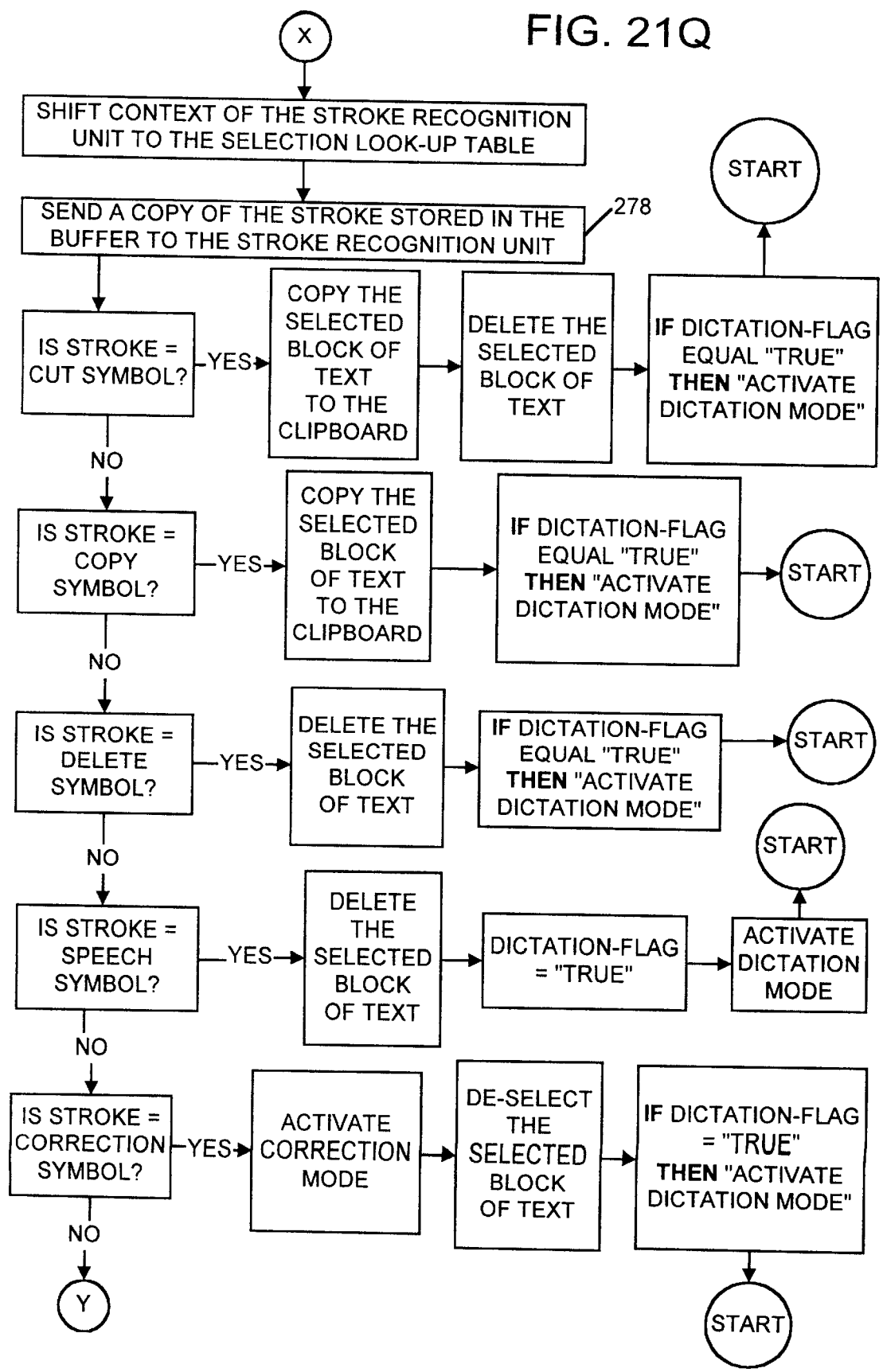
Figure 21R:
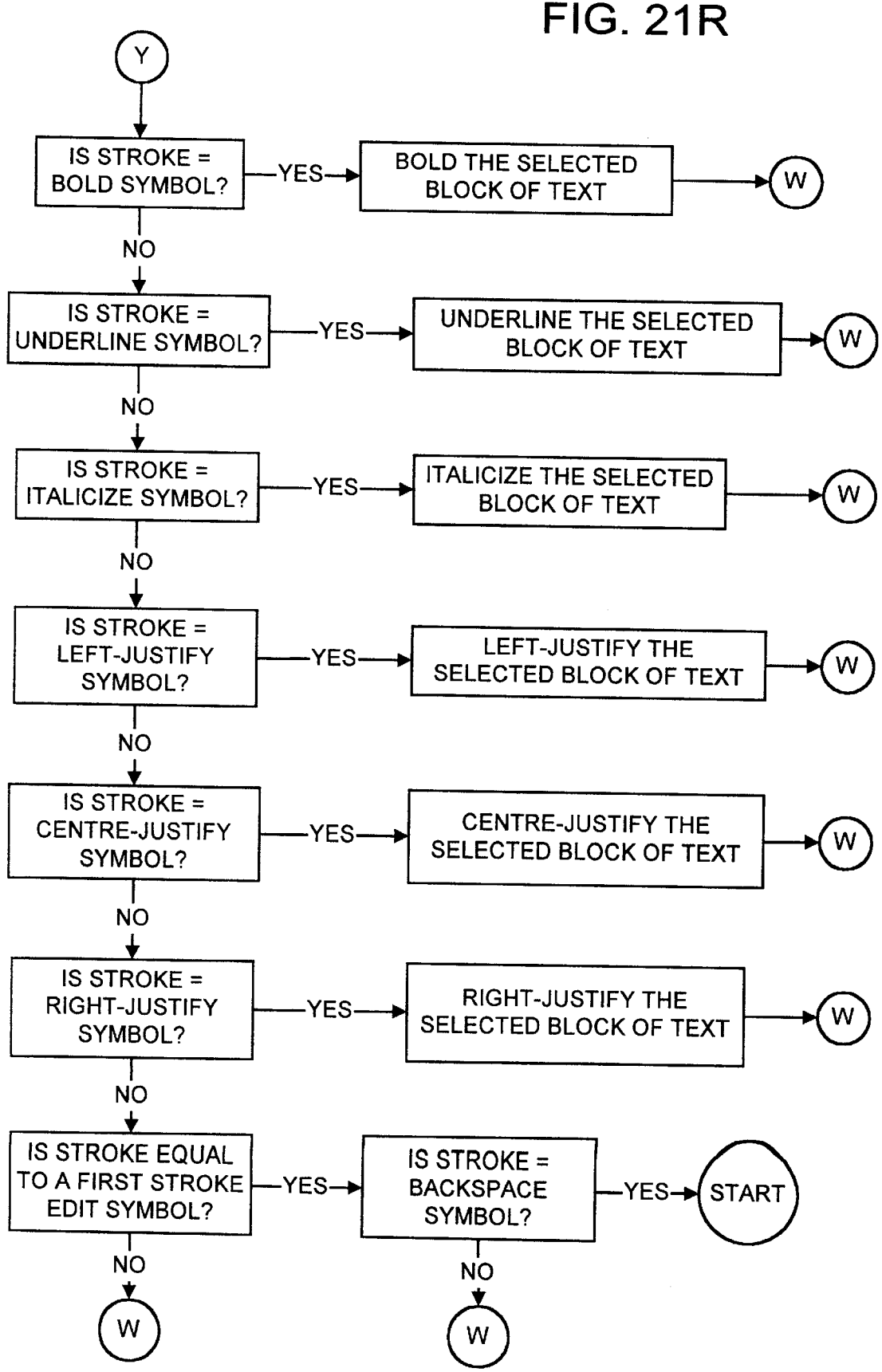
Figure 21S:
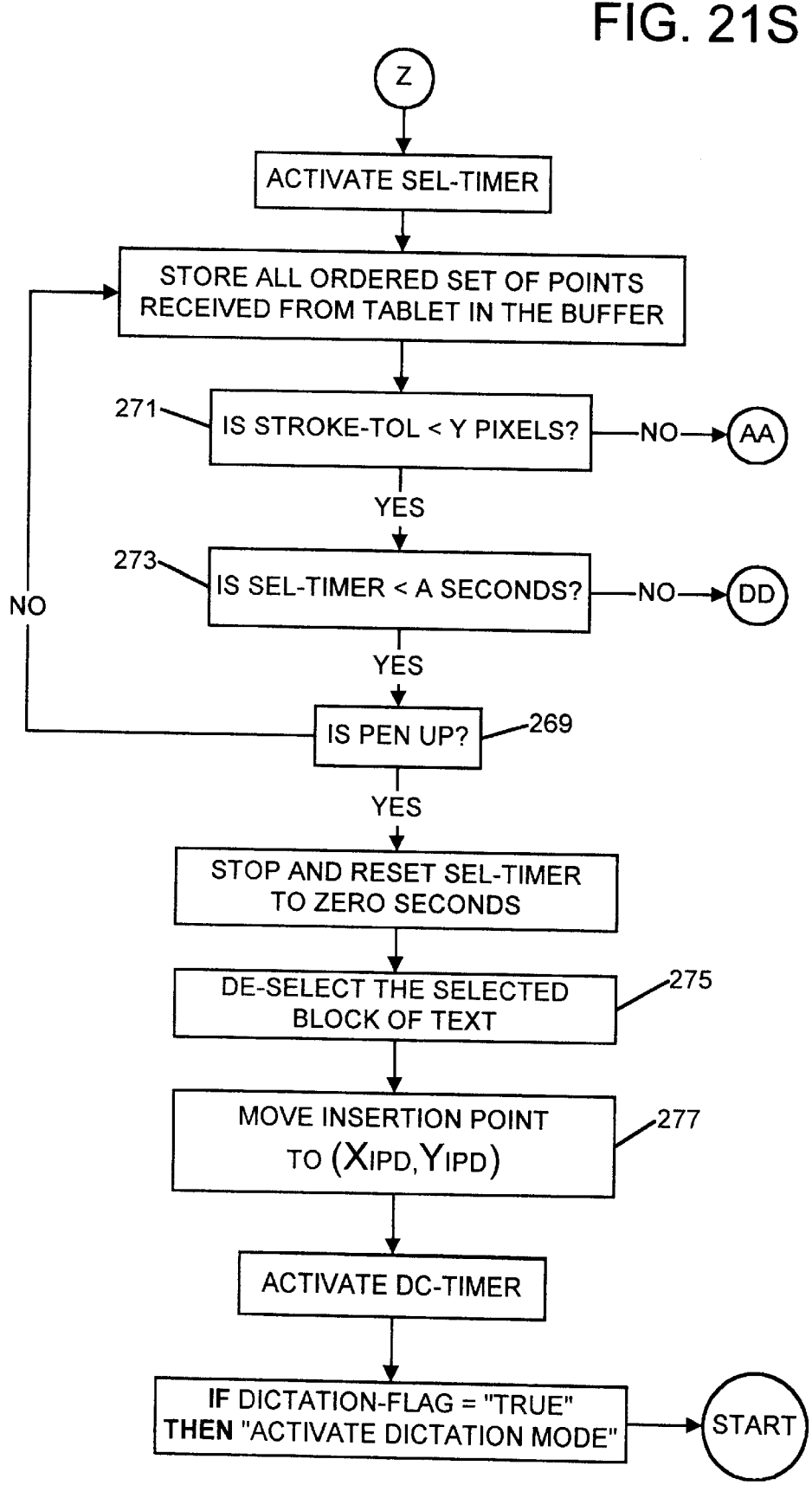
Figure 21T:
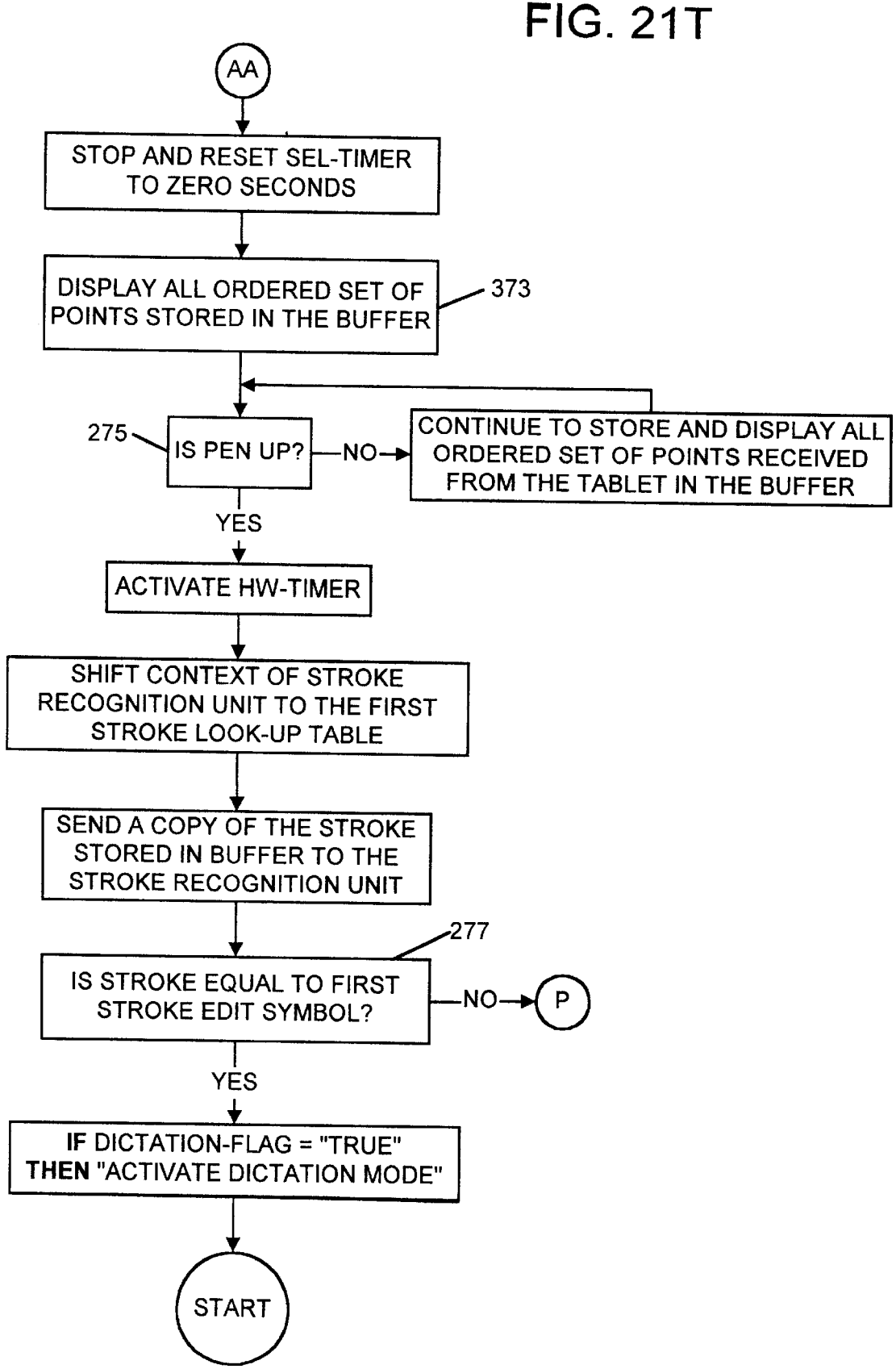
Figure 21U:
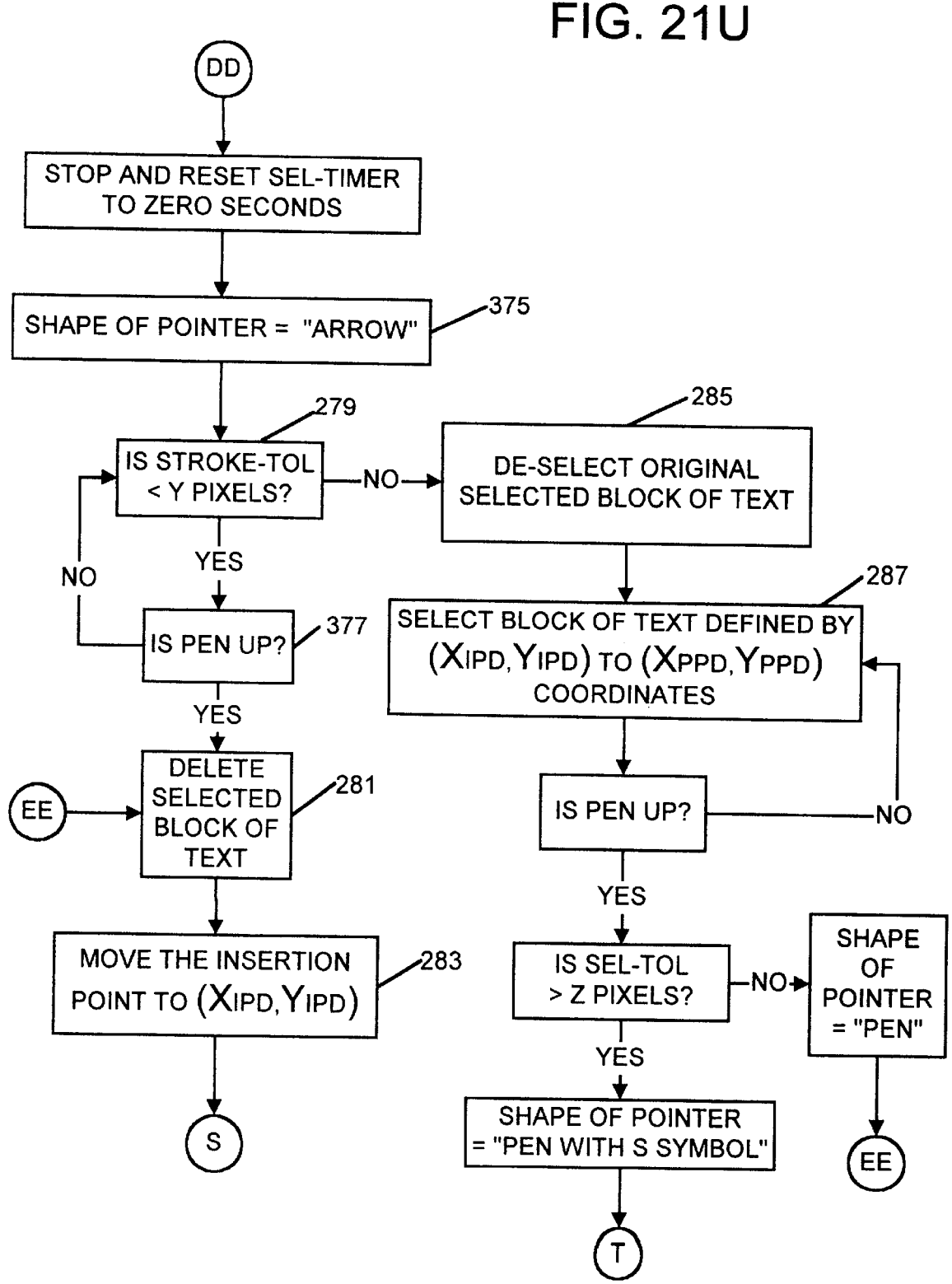
Figure 22:
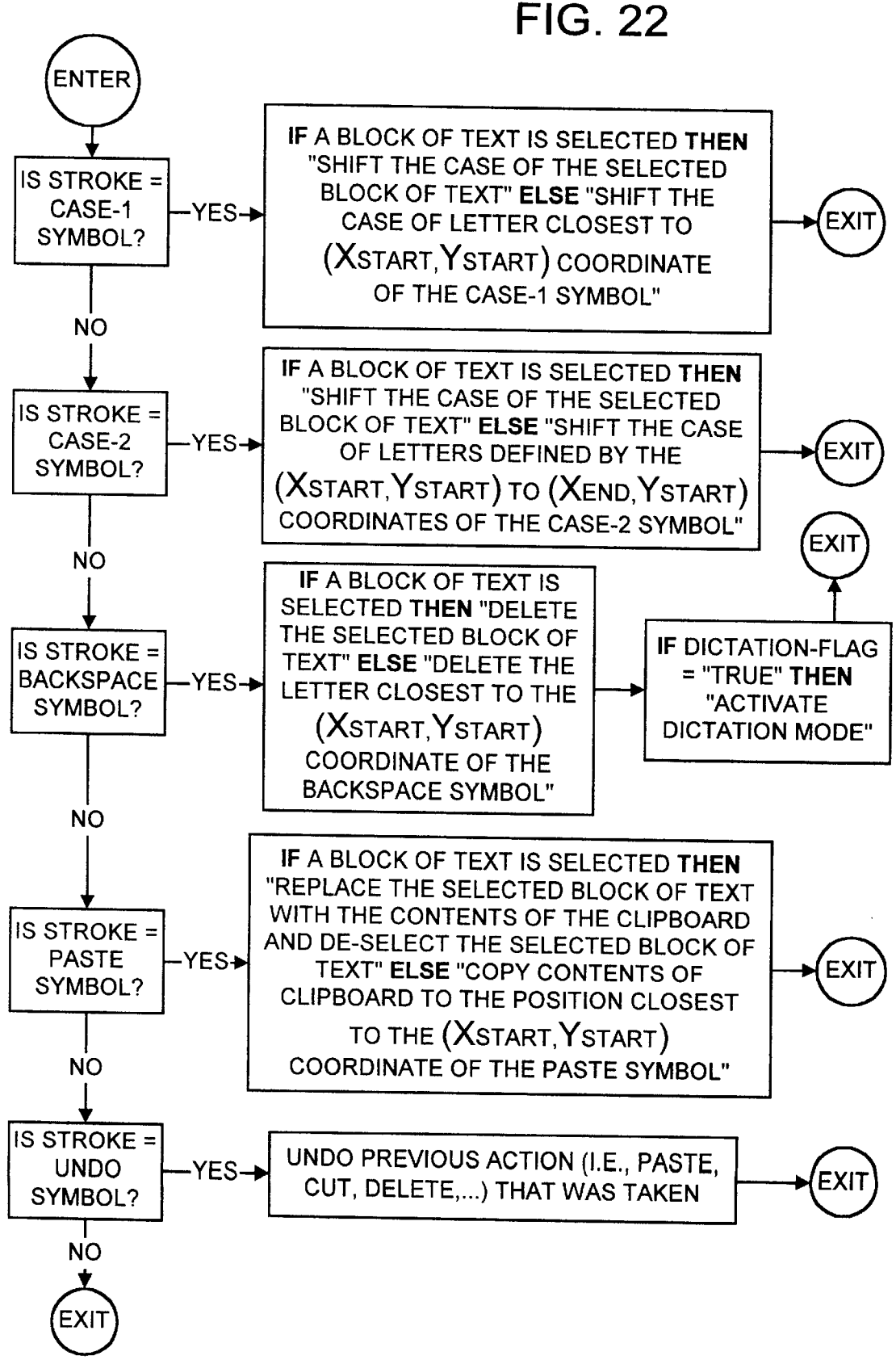
FIG. 22 is a flow diagram illustrating the first stroke analysis.
Figure 23:
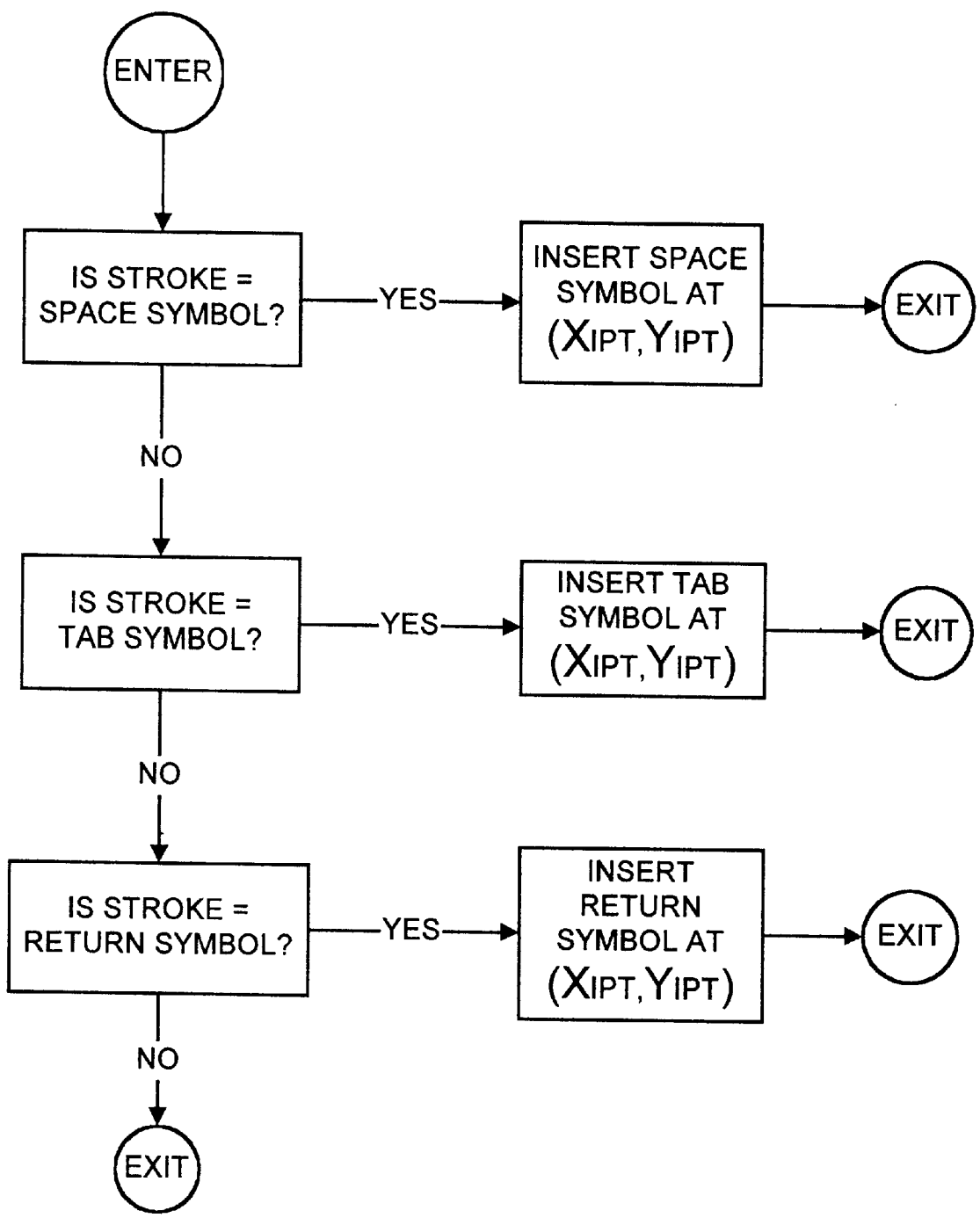
FIG. 23 is a flow diagram illustrating the delimiter analysis.

Referring to FIGS. 21a through 21u, a number of initial steps are conducted once the program begins 200, namely to set the dictation flag to false 202; to set the punctuation window stroke flag to false 204; to clear the buffer 206; to erase the electronic ink 208; to erase the punctuation window 210; and to erase the selection window 212. Thereafter if the user pens down a number of different actions may be conducted. For example the user may activate the punctuation window and insert punctuation at the position of the cursor. The user may select a block of text and replace it with text interpreted by handwriting recognition software. The user may move the cursor. The user may select a block of text and then draw an edit symbol, which when interpreted performs one of several common editing functions. Some examples of these activities will be discussed with specific reference to the flow chart shown in FIGS. 21a through 21u.

As discussed above to add punctuation the user pens down 214 within a preselected distance from the cursor, starting on FIG. 21a. That is the PW-Tol is less than a predetermined amount 216. The shape of the pointer is changed into a pen plus a superscript "p" 218 to indicate that the pen down is within the punctuation window range. If it is determined that the pen down does not indicate that it is a double click (FIG. 21c) and it is determined that there is a stroke (FIG. 21d), the stroke or ordered set of points is displayed 220 and a punctuation window is displayed with the centre point at the insertion point or the cursor point 222. Once the user pens up 224 the system determines if the stroke is a first stroke edit symbol 226 or a delimiter character 228 (FIG. 21f) and if so those functions are performed and the system returns to start 230. If the stroke is neither a first stroke edit symbol or a delimiter character the strokes or ordered sets of points are stored and displayed 232 (FIG. 21g) until there is a time out 234 or the user pens down outside the punctuation window 236 (FIG. 21i) wherein the strokes are sent to the stroke recognition unit 238 and the results are inserted at the insertion point or at the cursor 240 and the system returns to start 230. Alternatively the user can click or pen down 241 (FIG. 21i) inside the punctuation window 243 and then pen up 245 (FIG. 21g) without having broken the stroke tolerance 247 and then the strokes are sent to the stroke recognition unit 249 (FIG. 21h), the results are inserted at the insertion point 251 and the cursor or insertion point is moved to the initial pen down 253. Note that the steps taken to determine if the stroke is a first stroke edit symbol is shown in FIGS. 22a and 22b.

The user may wish to change the case of a letter or word or use one of the other first stroke edit symbol features, that is the user may wish to use the first stroke analysis feature. Accordingly the user will pen down 214 (FIG. 21a) and draw a stroke. As discussed above the user could draw one of the first stroke edit symbols within the punctuation window. Alternatively the user could draw a first stroke edit symbol not within the punctuation window. Thus the pen down 214 would not be within a predetermined distance from the cursor 216 therefore the pointer is shown as a pen 242, if the stroke is greater than the predetermined stroke tolerance 244 (FIG. 21d), before the Selection Timer is greater than a predetermined time 260 (FIG. 21d), then the stroke or ordered set of points are displayed 246 (FIG. 21k) and when the pen is up 248 the stroke is sent to the stroke recognition unit 250 to determine if it is a first stroke edit symbol 252. If the user drew a first stroke edit symbol then the system goes back to start 230.

On the other hand if the user did not write a first stroke edit symbol, the stroke is treated as handwriting and the system continues to store and display the order sets of points 255 (FIG. 21l) until there is a handwriting time out. that is until the pen is not down 257 for longer than a preselected time 259. The strokes are then sent to the handwriting recognition unit 261. If there is no block of text selected 263 the results are inserted at the initial pen down 265. Alternatively, if there is a block of text selected 263 the results replace the selected block of text 267.

Alternately the user may wish to select a word and activate the correction window. The user pens down 214 (FIG. 21a) within a preselected tolerance of the previous pen up position, where the pen down event 214 occurs within a preselected interval of time of the pen up event, wherein the word closest to the cursor is selected 256 and a correction window is activated 258 (FIG. 21c).

Alternatively a block of text may be selected wherein the user pens down (FIG. 21a) and generally keeps it in the same position that is moves it less than the stroke tolerance 244 for a predetermined amount of time 260 (FIG. 21d) until the pointer changes to an arrow 262 (FIG. 21m), Thereafter the user moves the pen beyond the minimum stroke tolerance 264 and a block of text is selected 266 that is defined by the insertion point and the present pen down point. Then the shape of the pointer changes to a pen with a superscript "s" 268 (FIG. 21m) and the selection window is displayed 270 (FIG. 21o). If the user pens down inside the selection window 272 and draws a stroke 274, the ordered set of points is displayed 276 (FIG. 21o). When the stroke is completed it is sent to the stroke recognition unit 278 (FIG. 21q) wherein it is determined if a number of different strokes where drawn as shown in FIGS. 21q and 21r. Alternatively the user could pen down outside the selection window 272. If the pen down is followed by a pen up 269 (FIG. 21s) without moving the pen more than the stroke tolerance 271 and within a predetermined period of time 273, the user has single clicked outside the selection window and the block of text is de-selected 275 and the insertion point or cursor is moved to the initial pen down point 277. However, if the user draws a stroke 271, the ordered set of points are displayed 373 (FIG. 21t) until there is a pen up 275 wherein a first stroke analysis is performed 277. If there was a first stroke edit symbol then the system returns to start 230. If there was not a first stroke edit symbol the system goes to the handwriting analysis described above. On the other hand if the user keeps the pen in place for greater than a preselected period of time 273 (FIG. 21s). the shape of the pointer changes to an arrow 375 (FIG. 21u) and if the pen is lifted 277 without writing a stroke 279 the selected block of text is deleted 281 and the insertion point or cursor is moved to the initial pen down point 283. Alternatively. if the user draws a stroke 279, the original block of text is de-selected 285 and a new block of text is selected 287.

Alternatively the user may wish to move the cursor by penning down (FIG. 21a) and generally keeps it in the same position that is moves it less than the stroke tolerance 244 for a predetermined amount of time 260 (FIG. 21d) until the pointer changes to an arrow 262 (FIG. 21m). Thereafter the user pens up 280 before moving the pen and the cursor is moved to the initial pen down point 282. Alternatively if the user moved the pen but moves the pen back within the selection tolerance 284, the pointer changes back to a pen and the cursor is moved to the initial pen down point 282. As a further alternative the user may move the cursor by single clicking, that is the user pens down 214 not within the punctuation window tolerance 216, then the shape of the pointer is changed to a pen 242, the user does not move the pen so as to break the stroke tolerance 244 (FIG. 21d) and then the user pens up 286 within the preselected time of the selection timer 260 and the cursor or insertion point is moved to the initial pen down point 288 (FIG. 21e).

Note that even before there is a pen down 214 the position of the pen relative to tablet will affect the pointer. Accordingly if the pen is not down but the pointer is within a predetermined tolerance 290 (FIG. 21b) the shape of the pointer will be a pen with a superscript "p" 292 and if it is not within a predetermined tolerance the shape of the pointer will be a pen 294.

The dictation mode is arranged as a toggle such that at the beginning the dictation flag is set at false 202 thereafter dictation mode is activated or de-activated with the same process. To activate the dictation mode the user may select a block of text that is to be replaced by the dictated text or the user may position the cursor and insert the dictated text. As described above, a block of text may be selected wherein the user pens down (FIG. 21a) and generally keeps it in the same position, that is moves it less than the stroke tolerance 244 for a predetermined amount of time 260 (FIG. 21d) until the pointer changes to an arrow 262 (FIG. 21m). Thereafter if the user does not move the pen beyond the minimum stroke tolerance 264 or if the user does move it more than the minimum stroke tolerance 264 but brings it back into range of the selection tolerance 284 the insertions point is moved to the initial pen down 282 and the dictation flag is tested 296 (FIG. 21n). If the dictation flag is not true it is changed to equal true 298 and the dictation mode is activated 300. Alternatively if the dictation flag is true 296 then the dictation flag is changed to false 302 and the dictation mode is de-activated 304. Preferably the dictation mode if on is de-activated on entering a mode and then reactivated when exiting that mode. Accordingly as shown in FIG. 21f before proceeding through the steps from the punctuation window the dictation flag is tested 308 (FIG. 21f). If the dictation flag is true before entering a mode then the dictation mode is de-activated 308 and if the dictation flag is true when exiting a mode the dictation mode is reactivated 310 before return to start 230.

The system of the present invention allows the user to train the system to recognize specialty symbols (ie: non-ASCII symbols) used in the Punctuation, Selection and Edit modes. This allows a user to improve recognition accuracy of specialty symbols used in Punctuation, Selection and Edit mode, by adding, deleting, or modifying existing models (eg: Stored handwriting samples) of these specialty symbols. In addition, the system allows a user to improve recognition accuracy of specialty words not found in the Default Dictionary (eg: peoples names, technical terms, etc . . . ), by allowing a user to add these specialty words to a User-Defined Dictionary.

The system also contains features that are commonly available with these types of systems, namely a read-me file, interactive tutorial, on-line help, install utility and uninstall utility. The read-me file contains information about hardware/software compatibility issues and last minute information that was left out of printed instruction manuals. The interactive tutorial teaches a user how to use the invention herein. On-line Help contains information related to definitions, functions, and how to use and configure Natural Input. The install utility allows the user to install the invention on the computer system. The uninstall utility allows the user to remove the invention herein from the computer system on which it was installed.

There are a number of variations that may be made while remaining within the scope of the invention. For example the method of activating the Punctuation Window 14 could be through a task bar, a menu or a single click. Similarly, the method of activating the Selection Window 24 could be through a menu or a task bar. Further, with regard to the Selection Window 24, rather than a separately defined window the selected block of text could act as a window and the user could simply write the Selection Window Edit Symbols on the highlighted text.

It will be appreciated that the above description related to embodiments by way of example only. Many variations on the invention will be obvious to those skilled in the art and such obvious variations are within the scope of the invention as described herein whether or not expressly described.

What is claimed as the invention is:

1. A correction method for use with a pen based computer system, the method comprising the steps of:
   receiving an insertion point coordinate;
   receiving an initial pen down coordinate corresponding to an initial pen down;
   receiving a present pen down coordinate corresponding to a present position of a pen;
   receiving a pen up coordinate corresponding to a pen up;
   defining an ordered set of points between and including the initial pen down coordinate and the pen up coordinate;
   determining a first time interval between the initial pen down and the pen up;
   determining a second time interval between the initial pen down and the present pen down;
   determining if the relative position of at least two of the initial pen down coordinate, the present pen down coordinate, the pen up coordinate, the first time interval, the second time interval and the ordered set of points corresponds to a set of pre-selected parameters which correspond to activaton of one or a plurality of modes; and
   activating the mode.

2. A correction method as claimed in claim 1 wherein the plurality of modes includes an input mode and a punctuation mode.

3. A correction method as claimed in claim 1 wherein the plurality of modes includes an input mode, a punctuation mode and a selection mode.

4. A correction method as claimed in claim 1 wherein the plurality of modes includes an input mode, a punctuation mode, a selection mode and an edit mode.

5. A correction method as claimed in claim 1 wherein the plurality of modes includes an input mode, a punctuation mode, a selection mode, an edit mode and a correction mode.

6. A correction method as claimed in claim 2 wherein activating the punctuation mode includes the steps of opening a punctuation window; receiving an ordered set of points corresponding to a stroke drawn starting from within the punctuation window; comparing the ordered set of points with a preselected group of characters which correspond with punctuation in an alpha-numeric system; interpreting the stroke; inserting the results of the interpretation at an insertion point; and closing the punctuation window.

7. A correction method as claimed in claim 6 wherein a plurality of ordered set of points corresponding to a plurality of strokes is received.

8. A correction method as claimed in claim 6 wherein the step of opening the punctuation window includes the steps of penning down so that a distance between the initial pen down coordinate and the insertion point coordinate is less than a pre-selected distance, the distance between the present pen down coordinate and the initial pen down coordinate is greater than a pre-selected stroke tolerance and the second time interval is less than a pre-selected time interval; and opening the punctuation window.

9. A correction method as claimed in claim 8 wherein the preselected group of characters includes thirty-two uniquely shaped characters.

10. A correction method as claimed in claim 8 further including the step of changing the appearance of the pointer to indicate that the punctuation mode has been activated.

11. A correction method as claimed in claim 10 wherein the punctuation mode pointer appearance is a pen with a "p".

12. A correction method as claimed in claim 8 wherein the punctuation window is transparent.

13. A correction method as claimed in claim 3 wherein activating the selection mode includes the steps of selecting a block of text; opening a selection window; receiving an ordered set of points corresponding to a stroke drawn starting from within the selection window; comparing the stroke with a preselected group of characters which correspond with selection window edit symbols; interpreting the stroke; performing the edit function associated with the stroke; and closing the selection window.

14. A correction method as claimed in claim 13 wherein the preselected group of characters are uni-strokes.

15. A correction method as claimed in claim 13 wherein the step of selecting a block of text includes the steps of penning down such that the distance between the initial pen down coordinate and the present pen down coordinate is less than a pre-selected stroke tolerance and the second time interval is greater than a pre-selected time period; indicating that the selection mode has been activated; highlighting the block of text between and including the pen down coordinate and the initial pen up coordinate.

16. A correction method as claimed in claim 15 wherein the step of indicating that the selection mode has been activated includes changing the appearance of the pointer.

17. A correction method as claimed in claim 16 wherein the selection mode pointer appearance is an arrow.

18. A correction method as claimed in claim 2 wherein the input mode is chosen from the group consisting of dictation and handwriting.

19. A correction method as claimed in claim 18 wherein activating the handwriting input mode includes the steps of determining if the distance between the present pen down coordinate and the initial pen down coordinate is greater than a pre-selected stroke tolerance and if the second time interval is less than a preselected time interval; comparing the ordered set of points with a first stroke group of preselected uni-stroke characters; determining if the ordered set of points is not a first stroke; storing the ordered set of points; storing a subsequent ordered set of points; interpreting the ordered set of points to define a text; and inserting the text.

20. A correction method as claimed in claim 18 wherein activating the dictation input mode includes the steps of penning down such that the distance between the initial pen down coordinate and the present pen down coordinate is less than a pre-selected stroke tolerance and the second time interval down is greater than a pre-selected time period; and the distance between the pen up coordinate and the initial pen down coordinate is less than a preselected stroke tolerance; and activating the dictation mode.

21. A correction method as claimed in claim 4 wherein the edit mode includes the steps of determining if the distance between the present pen down and the initial pen down is greater than a pre-selected stroke tolerance and the second time interval is less than a pre-selected time interval; comparing the ordered set of points with a first stroke group of preselected uni-stroke characters; determining if the ordered set of points is a first stroke which corresponds to a first stroke function; and performing the first stroke function.

22. A correction method as claimed in claim 21 wherein the first stroke function is chosen from the group consisting of a single letter case change, a multi-letter case change, a backspace, a paste and an undo.

23. A correction method as claimed in claim 22 wherein the single letter case change function includes the steps of penning down within a pre-selected distance of a letter; thereafter drawing a generally vertical line upwardly; and changing the case of the letter.

24. A correction method as claimed in claim 22 wherein the multi-letter case change function includes the steps of penning down within a pre-selected distance of the left most letter of a series of letters; thereafter drawing a generally horizontal line along the series of letters; thereafter drawing a generally vertical line upwardly; and changing the case of the series of letters.

25. A correction method as claimed in claim 5 wherein the correction mode includes the steps of selecting a block of text to be corrected; opening a correction box; performing correction functions; and closing the correction box.

26. A correction method as claimed in claim 25 wherein the step of selecting the text to be corrected includes the steps of receiving a second pen down coordinate corresponding to a second pen down; determining if the distance between the second pen down coordinate and the pen up coordinate is less than a pre-selected double click tolerance and the time interval between the second pen down and the pen up is less than a pre-selected time interval; and highlighting the word adjacent to the initial pen down.

27. A correction method as claimed in claim 25 wherein the correction box includes a bitmap of a handwritten word, an input window, a start/stop dictation command button, an alternate word list, a primary selected word, an OK command button and a CANCEL command button.

28. A correction method as claimed in claim 25 wherein the correction box includes an input window, a start/stop dictation command button, a playback speech sample command button, an OK command button and a CANCEL command button.

29. A correction method as claimed in claim 25 wherein the correction box includes a plurality of text input attribute icons, a primary word list, an alternative word list, a correction box writing window, a correction box writing cell, a correction box OK command button and a correction box CANCEL command button.

30. A correction method as claimed in claim 29 wherein the plurality of text input attribute icons are chosen from the group consisting of handwriting bitmap icon, dictionary icon, speech icon, playback icon. keyboard icon, a pop-up keyboard icon and a pop-up keyboard command button.

31. A correction method as claimed in claim 30 wherein the correction box further includes a user defined word list box command button and wherein single clicking on the user defined word list box command button activates a user defined word list box which includes a word list writing window, a clear writing window command button, a word list writing cell, an add this word to the dictionary command button, a delete this word from the dictionary command button, a modify this word in the dictionary command button, a word list OK command button and a word list CANCEL command button.

32. A correction method as claimed in claim 31 wherein the user defined word list box further includes a user defined dictionary box command button wherein single-clicking on the user defined dictionary box command button activates the user defined dictionary box which includes a dictionary name text box, a set as default dictionary command button, a user-defined dictionary window, a save dictionary command button, a delete dictionary command button, a dictionary box OK command button and a dictionary box CANCEL command button.

* * * * *